(12) United States Patent
Fields

(10) Patent No.: US 6,505,002 B2
(45) Date of Patent: Jan. 7, 2003

(54) CAMERA THAT DISPLAYS PREDOMINANT COLOR MULTI-COLOR SCENE AND/OR MULTI-COLOR CAPTURED IMAGE OF SCENE

(75) Inventor: Roger A. Fields, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/747,557

(22) Filed: Dec. 22, 2000

(65) Prior Publication Data

US 2002/0110372 A1 Aug. 15, 2002

(51) Int. Cl.[7] ............................................... G03B 17/18
(52) U.S. Cl. ........................ 396/287; 396/225; 396/296
(58) Field of Search ................................. 396/225, 287, 396/429, 296; 356/256, 709

(56) References Cited

U.S. PATENT DOCUMENTS

| | | |
|---|---|---|
| 3,572,943 A | 3/1971 | Corley |
| 3,674,364 A | 7/1972 | Korman |
| 4,478,493 A * | 10/1984 | Yokota ........................... 349/1 |
| 4,714,962 A * | 12/1987 | Levine ........................... 348/64 |
| 4,742,369 A * | 5/1988 | Ishii et al. ................... 348/232 |
| 4,779,974 A | 10/1988 | Bahnemann et al. |
| 4,887,121 A | 12/1989 | Pritchard |
| 4,945,406 A | 7/1990 | Cok |
| 5,099,268 A | 3/1992 | O'Such et al. |
| 5,119,178 A | 6/1992 | Sakata et al. |
| 5,121,155 A | 6/1992 | O'Such et al. |
| 5,164,831 A | 11/1992 | Kuchta et al. |
| 5,389,984 A | 2/1995 | Lovenheim |
| 5,452,049 A | 9/1995 | Takagi |
| 5,521,708 A * | 5/1996 | Beretta ........................ 315/151 |
| 5,609,978 A | 3/1997 | Giorgianni et al. |
| 5,659,357 A | 8/1997 | Miyano |
| 5,682,562 A | 10/1997 | Mizukoshi et al. |
| 5,710,948 A * | 1/1998 | Takagi ........................ 396/225 |
| 5,732,293 A | 3/1998 | Nonaka et al. |
| 5,805,213 A | 9/1998 | Spaulding et al. |
| 5,892,991 A | 4/1999 | Hamada et al. |
| 5,949,962 A * | 9/1999 | Suzuki et al. ................ 348/577 |
| 5,986,297 A | 11/1999 | Guidash et al. |
| 6,009,281 A | 12/1999 | Hosomizu et al. |
| 6,009,282 A | 12/1999 | Ishiguro et al. |
| 6,070,018 A * | 5/2000 | Matsushita ................... 396/225 |
| 6,172,724 B1 * | 1/2001 | Kato ............................ 349/96 |

\* cited by examiner

*Primary Examiner*—Russell Adams
*Assistant Examiner*—D. Ben Esplin
(74) *Attorney, Agent, or Firm*—Robert Luke Walker

(57) ABSTRACT

A camera and method are usable for capturing multicolor images of multicolor scenes. The camera has a color detector determining from the multicolor scene and/or a captured multicolor image of the scene, a predominant color in the captured image and/or multicolor scene. The camera also has a display showing a predominant color determined by the color detector, whereby one is alerted to color predominance.

23 Claims, 29 Drawing Sheets

CAMERA THAT DISPLAYS PREDOMINANT COLOR MULTI-COLOR SCENE AND/OR MULTI-COLOR CAPTURED IMAGE OF SCENE

CROSS REFERENCE TO RELATED APPLICATIONS

Reference is made to commonly assigned co-pending U.S. patent application Ser. No. 09/748,620 filed Dec. 22, 2000, entitled: HYBRID CAMERA FILL-FLASH, and filed in the names of Hirohiko Ina and Hisanori Hoshikawa; Ser. No. 09/747,664 filed Dec. 22, 2000, entitled: COLOR CORRECTING FLASH APPARATUS, CAMERA, AND METHOD, and filed in the name of David L. Funston; Ser. No. 09/748,668 filed Dec. 22, 2000, entitled: CAMERA HAVING VERIFICATION DISPLAY WITH VIEWER ADAPTION COMPENSATION FOR REFERENCE ILLUMINANTS AND METHOD, and filed in the names of David L. Funston and Kenneth A. Parulski; Ser. No. 09/748,668 filed Dec. 22, 2000, entitled: CAMERA HAVING VERIFICATION DISPLAY AND WHITE-COMPENSATOR AND IMAGING METHOD, and filed in the name of Kenneth A. Parulski; Ser. No. 09/748,100 filed Dec. 22, 2000, entitled: CAMERA HAVING USER INTERFACE WITH VERIFICATION DISPLAY AND COLOR CAST INDICATOR, and filed in the names of David L. Funston, Kenneth A. Parulski, and Robert Luke Walker; Ser. No. 09/748,667 filed Dec. 22, 2000, entitled: CAMERA HAVING VERIFICATION DISPLAY WITH REVERSE WHITE BALANCED VIEWER ADAPTION COMPENSATION AND METHOD, and filed in the names of Kenneth A. Parulski and David L. Funston; Ser. No. 09/748,664 filed Dec. 22, 2000, entitled: CAMERA HAVING USING INTERFACE AMBIENT SENSOR VIEWER ADAPTION COMPENSATION AND METHOD, and filed in the name of Kenneth A. Parulski; and Ser. No. 08/970,327 filed Nov. 14, 1997, and filed in the names of James R. Niederbaumer and Michael Eugene Miller.

FIELD OF THE INVENTION

The invention relates to photography and photographic equipment and more particularly relates to photography and photographic equipment and more particularly relates to a camera having a user interface including a verification display and a color cast indicator and related method.

BACKGROUND OF THE INVENTION

Some hybrid film capture-electronic capture cameras capture an electronic image when a film image is captured and show the electronic image, on a display as a verification image that indicates what was captured in the film image. It is desirable that the verification image present enough information for the user to decide whether to take corrective action, such as making another exposure of the same subject, under different conditions, to replace the earlier exposure.

The color balance of captured images is of particular interest to a photographer using a camera that provides a verification image, since many color balance problems can be readily corrected in a second exposure under different lighting conditions, such as flash illumination or outdoors. The color balance of latent photographic images depends on the spectral power distribution, that is, the color temperature, of the scene illuminant. The term "color temperature" and like terms are used herein in a sense that encompasses both actual color temperatures and correlated color temperatures. The definition of "correlated color temperature" in *The Focal Encyclopedia of Photography*, 3rd ed., Stroebel, L. and Zakia, R., ed., Focal Press, Boston, 1993, page 175, states:

"CORRELATED COLOR TEMPERATURE A value assigned to a light source that does not approximate a black body source and therefore does not possess a color temperature. The correlated color temperature is the color temperature of the blackbody source that most closely approximates the color quality of the source in question. Correlated color temperatures are determined by illuminating selected color samples with the source in question and then determining the color temperature of the blackbody source that results in the color samples appearing the most similar to a standard observer." The color balance of latent photographic images also depends on the type of film used. A film of a given type is formulated to provide a neutral response to a particular designated illuminant. A neutral response matches the spectral power distribution of the designated illuminant. For example, "daylight" film directly exposed by daylight records equal printing densities for each of the cyan, yellow, and magenta film records. A resulting photographic print, photofinished so as to maintain the neutral response, will be properly color balanced with white objects in the scene appearing as white objects in the printed image.

If a film of a given type is exposed using an illuminant that has a different color balance than the designated illuminant for that film type, then the resulting final images will have a color cast, that is, a non-neutral response in the form of a color balance shift that causes white objects in the scene to appear colored. For example, a color cast in a photographic print means that white objects in the scene are reproduced at a noticeably different correlated color temperature than that of a "white" illuminant used to illuminate the print. The color cast can be described in terms of the perceived color that replaces white. With daylight film, fluorescent exposures printed neutrally (that is, with the same printed balance as used for daylight exposures) result in images having a greenish color cast when viewed in daylight; tungsten exposures have a reddish-orange color cast.

The color balance of a final photographic image produced by photofinishing also depends upon the scene balance algorithm used to control the photographic printer or other photofinishing equipment used. Many commercially available photofinishing systems attempt to determine the color balance of photographic images before printing to allow compensation for a color cast caused by fluorescent (and tungsten) illumination. The compensation is typically only partial, because partial compensation does not unacceptably degrade highly-colored images (for example, images of bright yellow objects under daylight illumination) that are erroneously judged as having a different illuminant and selected for color compensation. A noticeable color cast is still perceived in the final images, after the partial compensation. Stating this another way, after partial compensation, white objects in the scene shown in final photofinished images are perceived as being non-white in color. This color cast can provide an artistic effect, but in most cases, the remaining color cast is objectionable to the user.

In some digital still and video cameras, this problem with color cast is not present, since the final image is produced from a saved image data set that has been subjected to white balancing. Such images have a neutral color balance when output to an appropriately configured output device. Methods for calibrating to particular devices and media are well known. Many white balancing procedures are known. For example, one method of white balancing is described in U.S. Pat. No. 5,659,357, "Auto white adjusting device", to Miyano. The result of this process is that the red (R) and blue (B) code values of the digital images captured using various illuminants are scaled by appropriate white balance correction parameters. These parameters are determined such that the white balance corrected R and B codes are approximately equal to the green (G) codes for white and neutral gray objects of the scene.

The human visual system, under common lighting conditions, adapts to illuminants having different color temperatures, in a manner that is similar to the white balancing just discussed. (The terms "visual adaptation" and "adaptation" are used herein in the sense of chromatic adaptation. Brightness adaptation is only included to the extent that brightness effects influence chromatic adaptation.) The result is that daylight, fluorescent, tungsten, and some other illuminants, in isolation, are all perceived as white illumination. As noted above, photographic film does not function in the same manner as the human visual system; and after photofinishing, pictures photographed in some lighting conditions are perceived as having a color cast. The viewer perceives the pictures, as if through a colored filter.

A photographer using a hybrid film capture-electronic capture camera, is ordinarily adapted to the ambient illumination. Thus, if a verification image captured under fluorescent illumination is presented to the user without a change in the color balance, then the verification image will match the photographer's visual adaptation. A white shirt will look white to the photographer, whether viewed directly or in the verification image. The problem with this approach is that what the photographer sees in the verification image does not look like what the photographer will see in the final printed image after photofinishing. White balancing the verification image would not help, since the film image will not balanced the same way in photofinishing. The photographer is also still adapted to the ambient illumination.

U.S. patent application Ser. No. 08/970,327, filed by Miller, M. et al., entitled, "Automatic Luminance and Contrast Adjustment for Display Device", which is commonly assigned with this application; teaches a camera which measures the ambient light level and adjusts the brightness and contrast of an image display on the camera.

It would thus be desirable to provide a camera and method providing an indication of the color cast of a captured image to a photographer along with a verification image.

SUMMARY OF THE INVENTION

The invention is defined by the claims. The invention, in its broader aspects, provides a camera and method usable for capturing multicolor images of multicolor scenes. The camera has a color detector determining from the multicolor scene and/or a captured multicolor image of the scene, a predominant color in the captured image and/or multicolor scene. The camera also has a display showing a predominant color determined by the color detector, whereby one is alerted to color predominance. for use in capturing images of scenes illuminated by ambient light. The camera has a body and an electronic imager disposed in the body. The electronic imager captures an ambient light image as a multicolor electronic image. A color detector is disposed in the body. The color detector measures the ambient light to provide a color value. A user interface disposed on the outside of said body, shows the electronic image and an indication of the color value. The indication is independent of the color balance of the electronic image.

It is an advantageous effect of at least some of the embodiments of the invention that a camera and method provide an indication of the color cast of a captured image to a photographer along with a verification image.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
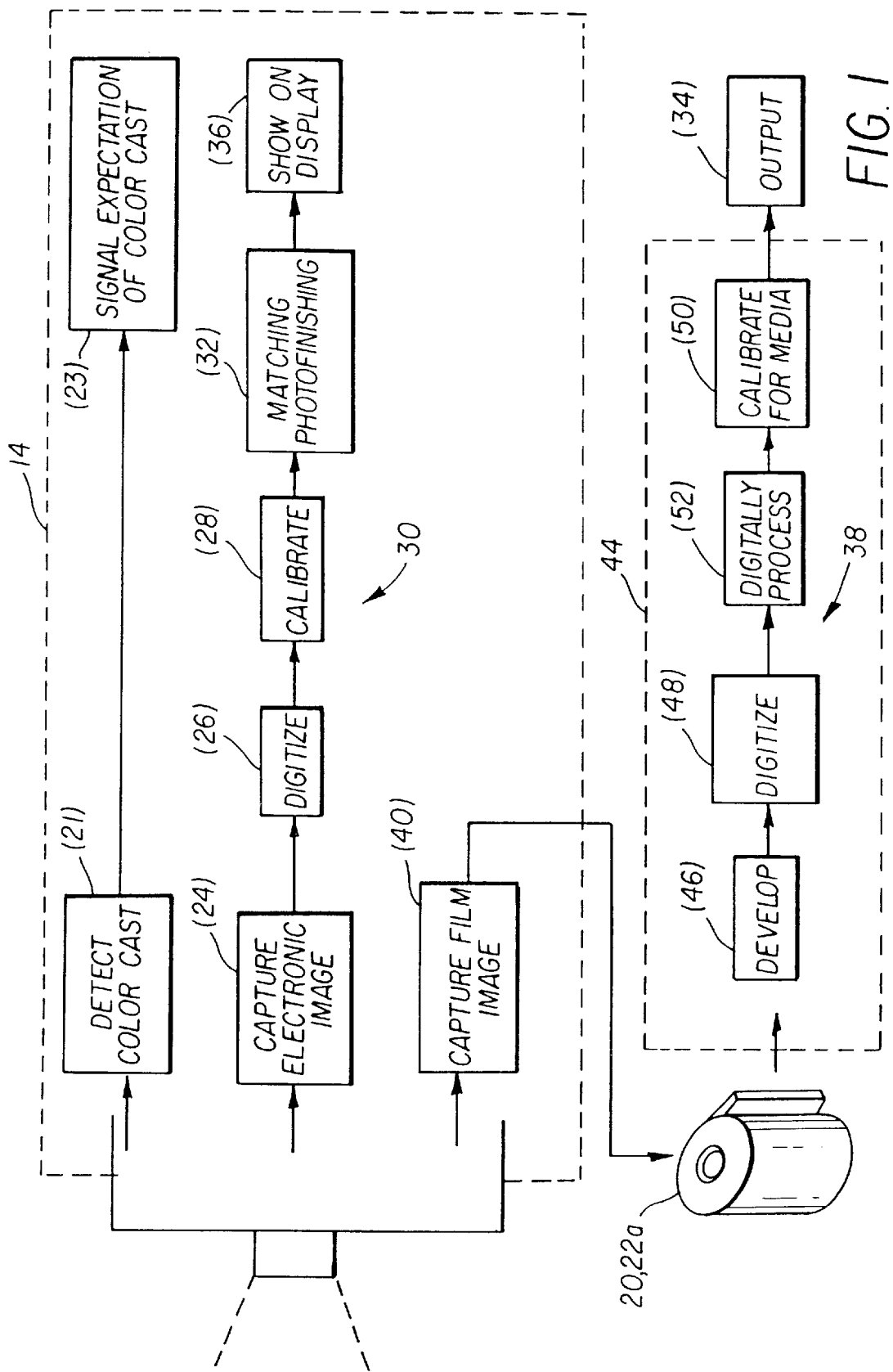
FIG. 1 is a diagrammatical view of an embodiment of the system.

In the system 10, when a photographer trips a shutter release 12 of a camera 14, a photographic subject is photographed using a verification image capture unit 16 and an archival image capture unit 18. The verification image capture unit 16 captures an electronic image of a subject image (a light image of the scene). The electronic image is digitally processed to provide a verification image which can then be shown on a display 20 mounted on the camera 14. The archival image capture unit 18 captures a second image that is utilized after photofinishing. The camera 14 signals to the photographer, at the same time the verification image is provided, whether the archival image provided by photofinishing is expected to have an acceptable color balance or an unacceptable color cast. The signaling is based on a measurement of the color value of ambient light.

The term "color value" used herein refers to a set of properties which defines a particular color stimulus in one or more multiple color systems. The stimulus has a particular continuous or discontinuous range in the system or systems. This range can be specifically mentioned, as in "a range of color values" or can be omitted, as in "a color value", without a change in the scope of the terms. Each of the color systems has a known set of multiple reference color stimuli and a reference detector or observer having known responsivities. Thus, a particular color stimulus has a corresponding set of defining reference color stimulus values for each color system. To reduce required calculations, it is very highly preferred that the color systems are each trichromatic and, thus, that the defining reference color stimulus values are tristimulus values. The color system or systems, in which a color value defines a particular color stimulus, can be based upon a human visual standard, such as a CE standard observer; but are not limited to a human visual standard. Correlated color temperatures are color values. A color value can include a calibration, for a color system that is not based upon a human visual standard, to account for human visual metamerism. Such a calibration can also be provided separately from color values. The relevant color system or systems for a particular use of the term "color value" is defined by the context. For example, an average color value for a display is an average of red, green, and blue (RGB) intensities and likewise a chromaticity, that is, an average of chromaticity coordinates for a particular human standard. For convenience, color value is generally discussed herein in relation to embodiments in which visual metamerism is not problematic and color value is the same as chromaticity. Specific terminology related to chromaticity has been avoided. For example, the term "color detector" is used to broadly define a color measuring or assessing device, instead of the term "colorimeter"; since a "calorimeter" measures chromaticities. Archival capture media is color balanced for a particular color value corresponding to a designated illuminant. The color value can be expressed as the correlated color temperature of the designated illuminant.

The archival image capture unit 18 holds an archival image capture media 22 that is color balanced for a particular illuminant, here referred to as a "designated illuminant". An example of such media 22 is photographic film color balanced for daylight. If the ambient lighting for archival image capture matches the designated illuminant, the color balance shown in the verification image matches what will be seen in a final archival image, such as a photographic print. The match to the designated illuminant does not have to be exact in some cases. For example, daylight type film typically is also color balanced for electronic flash. If ambient lighting for the archival image capture is a light source that has a different correlated color temperature than the designated illuminant, referred to here as a "non-designated illuminant"; the light reflected by the photographic subject and captured in the archival image will have a color balance that is offset relative to the designated illuminant. The designated and non-designated illuminants are collectively referred to herein as "reference illuminants". This offset is also referred to herein as a "color cast". A reference illuminant is referred to herein as being "adaptive" if the human visual system can, by adaptation, see the reference illuminant as being white.

Adaptive reference illuminants lie within a limited color gamut and illuminant power defined by the human cone response. A photographer who is adapted to an adaptive reference illuminant sees that illuminant as white and does not perceive the color cast. For example, if an archival image capture media 22 is color film balanced for daylight as a designated illuminant, then fluorescent and tungsten lighting are adaptive non-designated illuminants for that media. This can be contrasted with illuminants that can be referred to as "non-adaptive illuminants", such as a non-actinic darkroom light, which is always perceived as being red in color and diffuse starlight, which activates only the human rod response and is always perceived as being white. Such light sources include photographic daylight having a correlated color temperature of 5500 degrees K, tungsten (100 Watt bulb) having a correlated color temperature of 2900 degrees K, fluorescent (WF) having a correlated color temperature of 3500 degrees K, fluorescent (WWF) having a correlated color temperature of 3000 degrees K, and fluorescent (CWF) having a correlated color temperature of 4500 degrees K. For convenience, the invention is generally discussed herein in relation to an archival capture media which has daylight as a designated illuminant, and, thus, fluorescent lighting and tungsten lighting as non-designated illuminants. This description is not limiting and like considerations apply to other embodiments.

Figure 3:
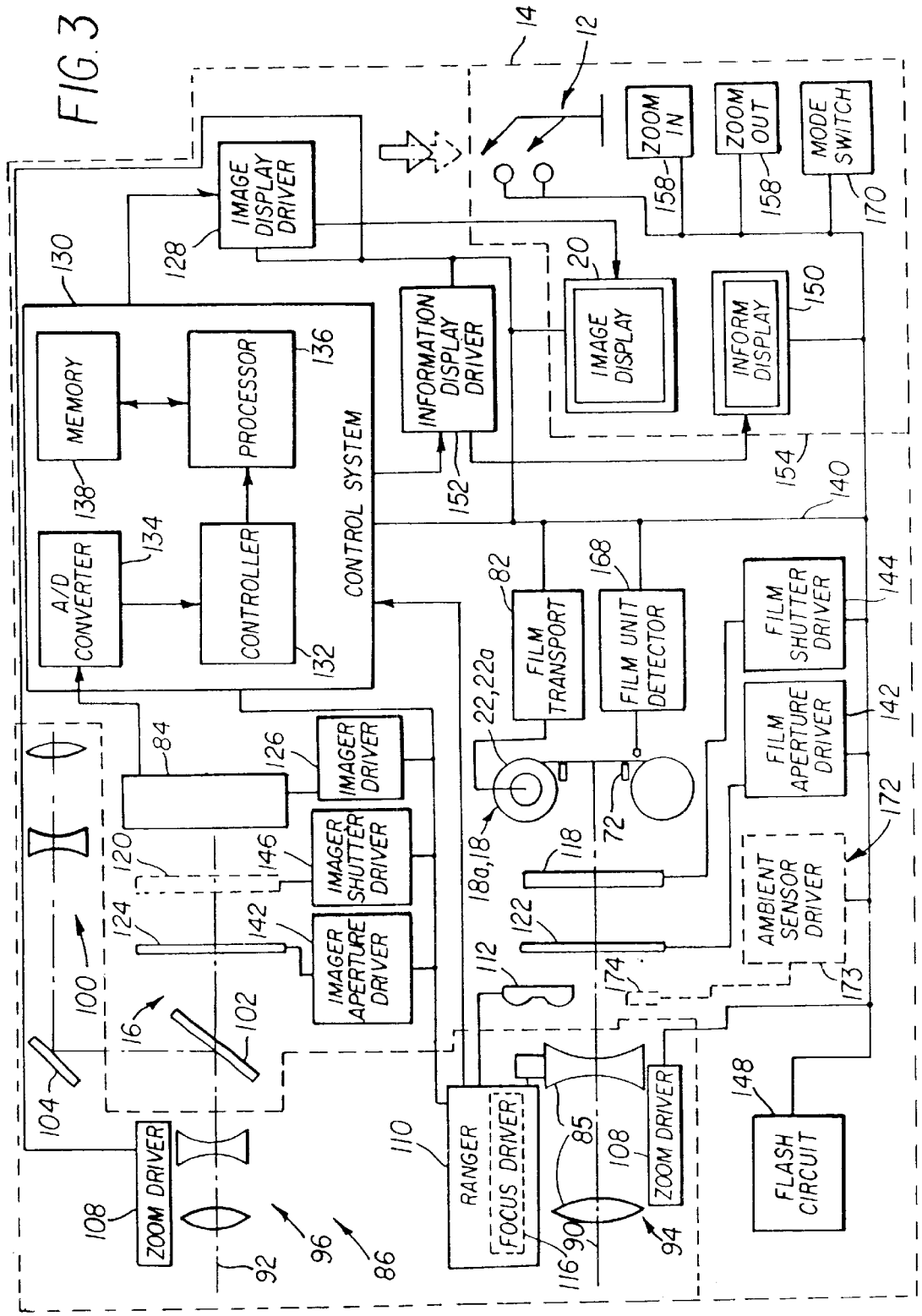
FIG. 3 is a schematic diagram of an embodiment of the camera.
Figure 4:
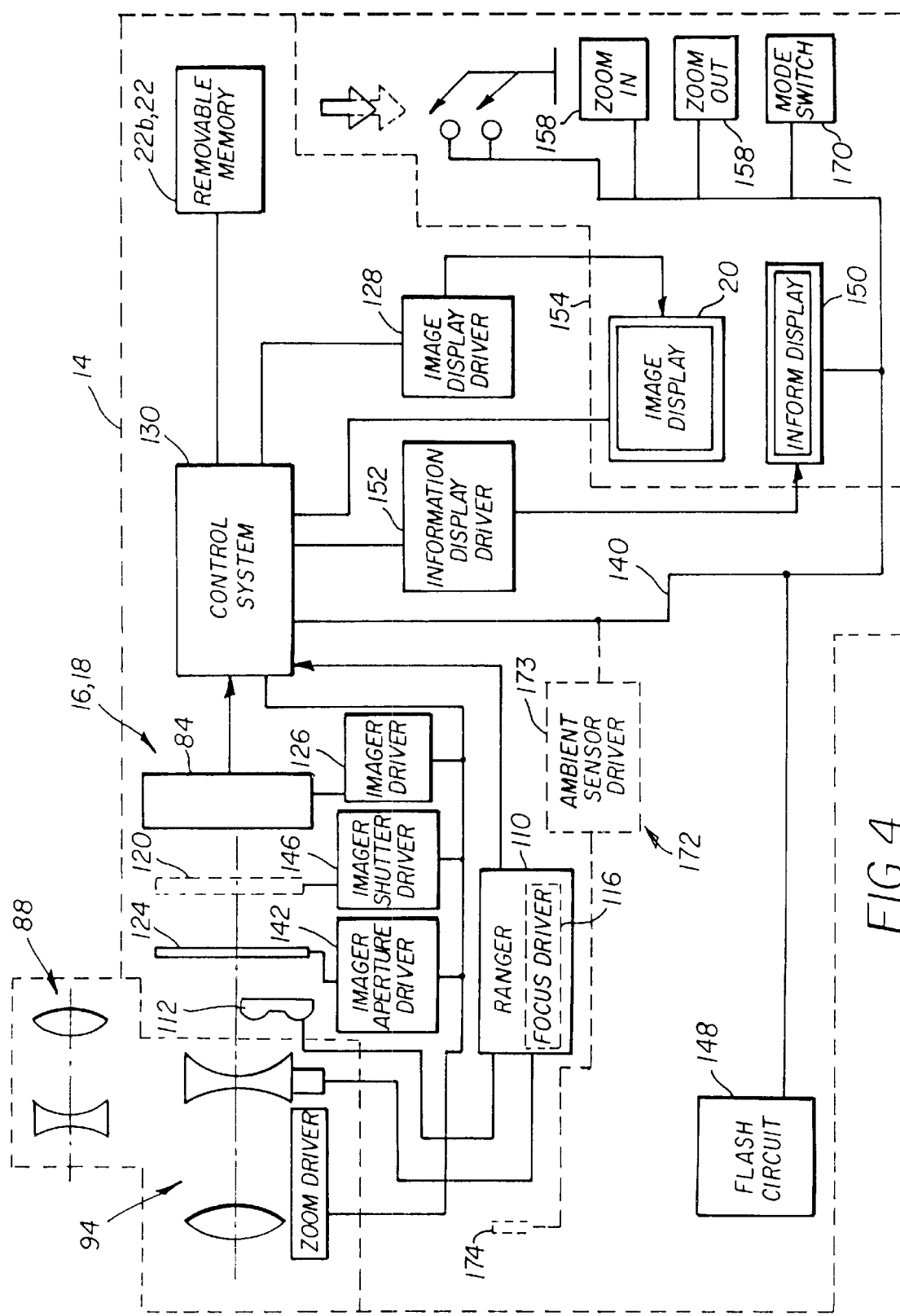
FIG. 4 is a schematic diagram of another embodiment of the camera.

Referring now to FIGS. 1 and 3–4, the archival image capture unit 18 is generally described herein in terms of a photographic film capture unit 18a using photographic film 22a as a capture media. The verification image capture unit 16 is an electronic capture unit. The designated illuminant for photographic film 22a is a function of the chemistry of the image forming layers.

Figure 2:
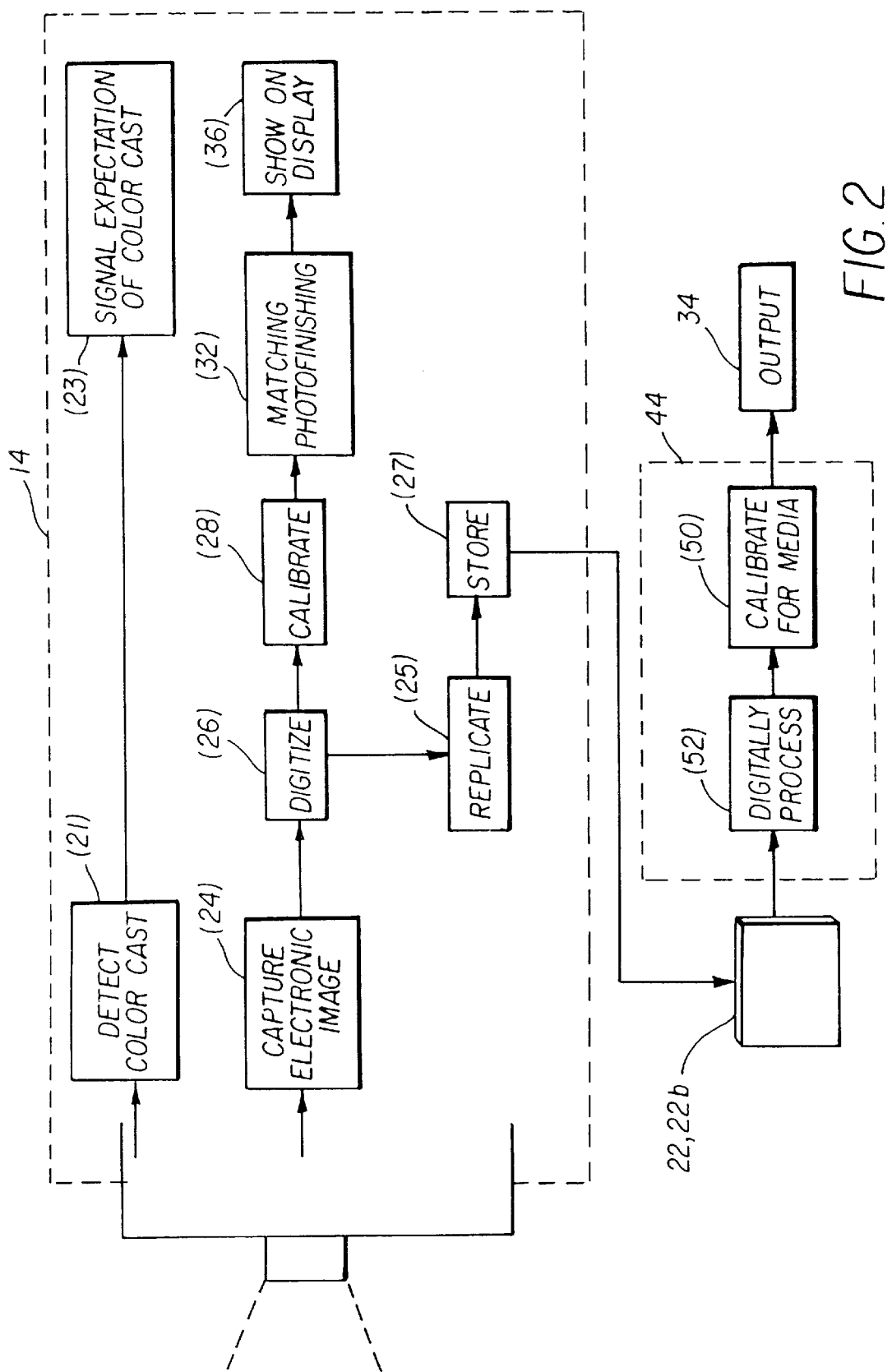
FIG. 2 is a diagrammatical view of another embodiment of the system.
Figure 5:
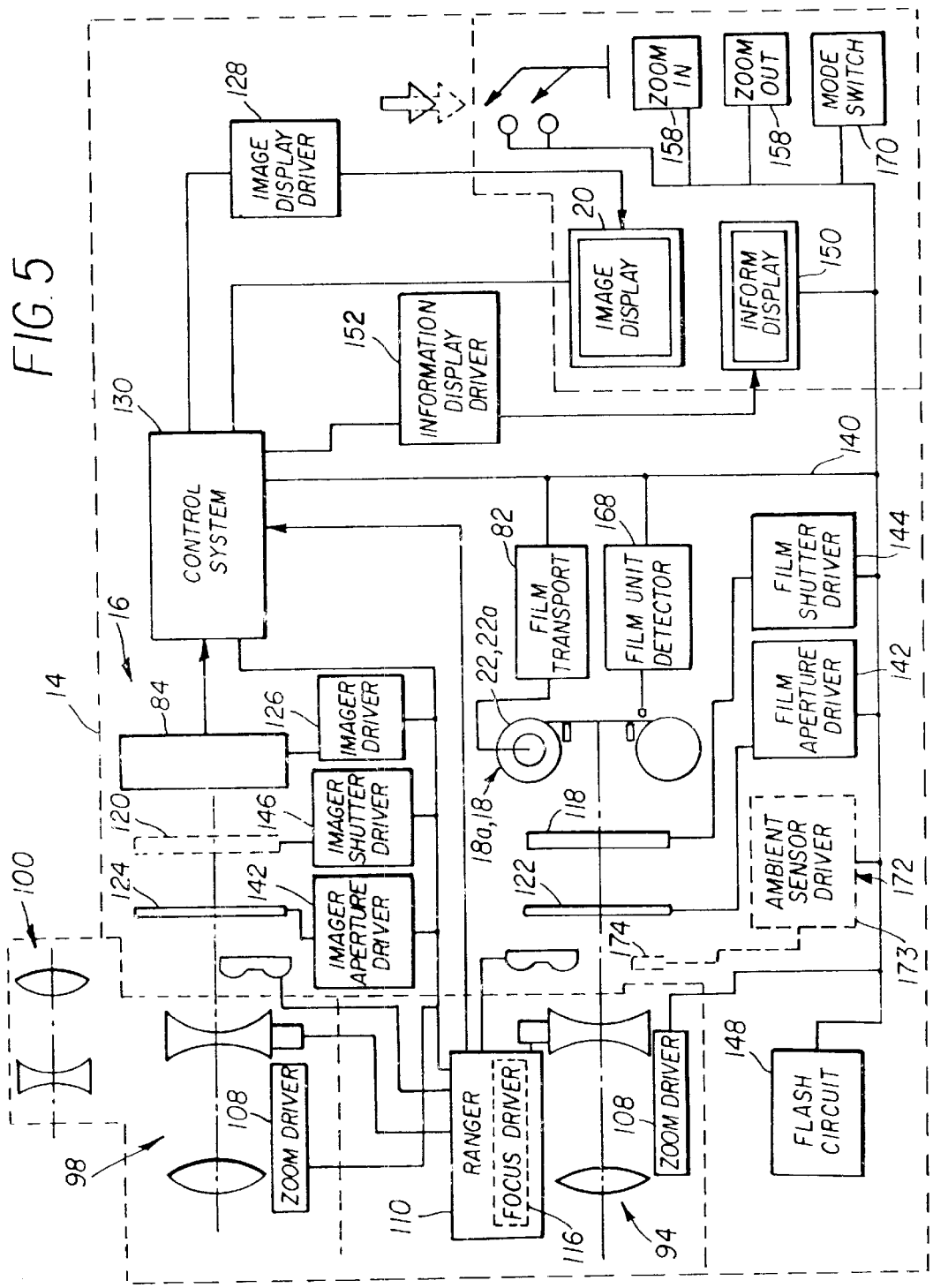
FIG. 5 is a schematic diagram of another embodiment of the camera.

Referring to FIGS. 2 and 5, the archival image capture unit 18 can, alternatively, capture the archival image electronically and store the image in digital form. In this latter case, the "capture media" is digital storage media 22, such as electronic or magnetic memory. With these fully electronic capture cameras, the archival images are transferred in digital form for photofinishing. The transfer can be on physical media or as a transmitted electronic signal. Two electronic capture units can be present in the camera 14 (not shown) or a single electronic capture unit can be used as both the verification image capture unit 16 and the archival image capture unit 18. In this case, one of the archival and verification images is derived from the other. The archival image capture unit, whatever the technology, has a storage media 22 that has a designated illuminant. Archival images are visualized from latent images or from stored electronic images by photofinishing equipment that treats the images as having been exposed under the designated illuminant. The resulting final archival images exhibit color casts if the images were exposed under non-designated illuminants.

Referring again to FIGS. 1–2, the archival image and electronic image follow different routes, over different time periods, to provide a final archival image, and a final verification image, in the form of the visible display image. Along with the archival and verification images, the camera 14 detects (21) whether the scene illumination has a color cast and signals (23) an expectation of the color cast expected in the archival image.

In the route 30 followed by the electronic image, after capture (24), the electronic image is digitized (26) to provide a digital image. The electronic image is calibrated (28) to accommodate differences in input and output properties of the components of the electronic imaging chain 30 and is matched (32) to the characteristics of the photofinishing output 34. The resulting verification image is then shown (36) on the display 20. Detailed features can vary. For example, as discussed below, the electronic image is typically stored (not shown in FIG. 1) one or more times between capture (24) and display (36).

Turning now to the route 38 of the film image, shown in FIG. 1, following capture (40) and any additional exposures, the film 22a (illustrated as a film cartridge) is removed from the camera 14. The film 22a is received by a photofinishing unit (indicated by dashed line 44) and is developed (46) and, with a digital photofinishing unit, is scanned and digitized (48) to provide a digitized image. Non-image information provided on or with the film 22b, such as magnetic codes indicating the number of images to be printed, is read and utilized (not illustrated). The digitized image is digitally processed (52) As with the digital image, the digitized image is subjected to (50) a calibration transform to accommodate the types of input and output media used and other input and output parameters. The resulting calibrated digitized image can be printed or otherwise finalized to provide hard copy or other output. The photofinishing unit 44 can also be optical rather than digital, in which case, the developed film image is printed without digitizing or calibrating the digitized image. For convenience, discussion here is predominantly limited to digital photofinishing units. Within the limitations of the equipment, like considerations apply to optical photofinishing units.

The route of the archival digital image, shown in FIG. 2, is like that of the archival film image, but uses digital memory 22b (illustrated as a removable memory card) instead of film 22a and lacks chemical development. In the embodiment shown in FIG. 2, the camera 14 has a single electronic capture unit 16 and the electronic image is replicated (25). One of the resulting two images is displayed (36) the other is stored (27) and transferred for photofinishing.

The digital image matching in the camera 14 to the photofinishing channel can include a variety of characteristics. Some characteristics of the archival image can be matched without knowledge of the characteristics of the photofinishing channel at the time of image capture. Other characteristics, such as partial correction of color cast, require knowledge of photofinishing parameters such as subject failure suppression boundaries. Still other characteristics require both knowledge of photofinishing parameters and communication of additional exposure related information from the camera 14. Within these limitations, digital image matching to the photofinishing channel can be provided, as desired. It is preferred that the verification image be modified to reduce the color cast of the displayed verification image so as to match, in the perception of the photographer, the color cast of the final archival image after photofinishing within the limits of accuracy discussed here.

Cameras 14 are shown in FIGS. 3–7. For convenience, the cameras 14 are generally discussed in reference to the embodiment shown in FIGS. 3 and 6–7. Like considerations apply to the cameras 14 shown in the other Figures and to the cameras 14 generally.

Figure 6:
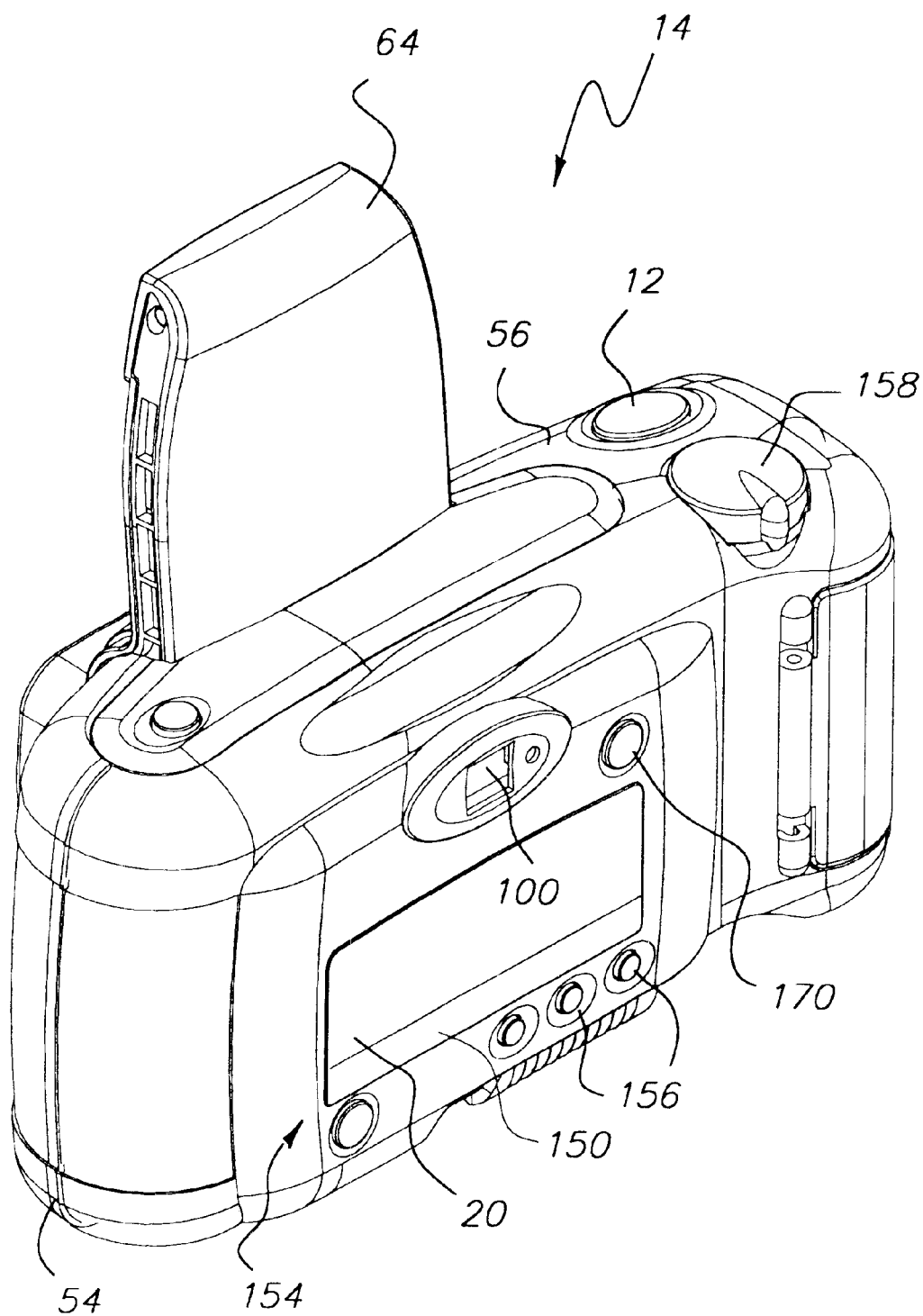
FIG. 6 is a rear perspective view of the camera of FIG. 3.
Figure 7:
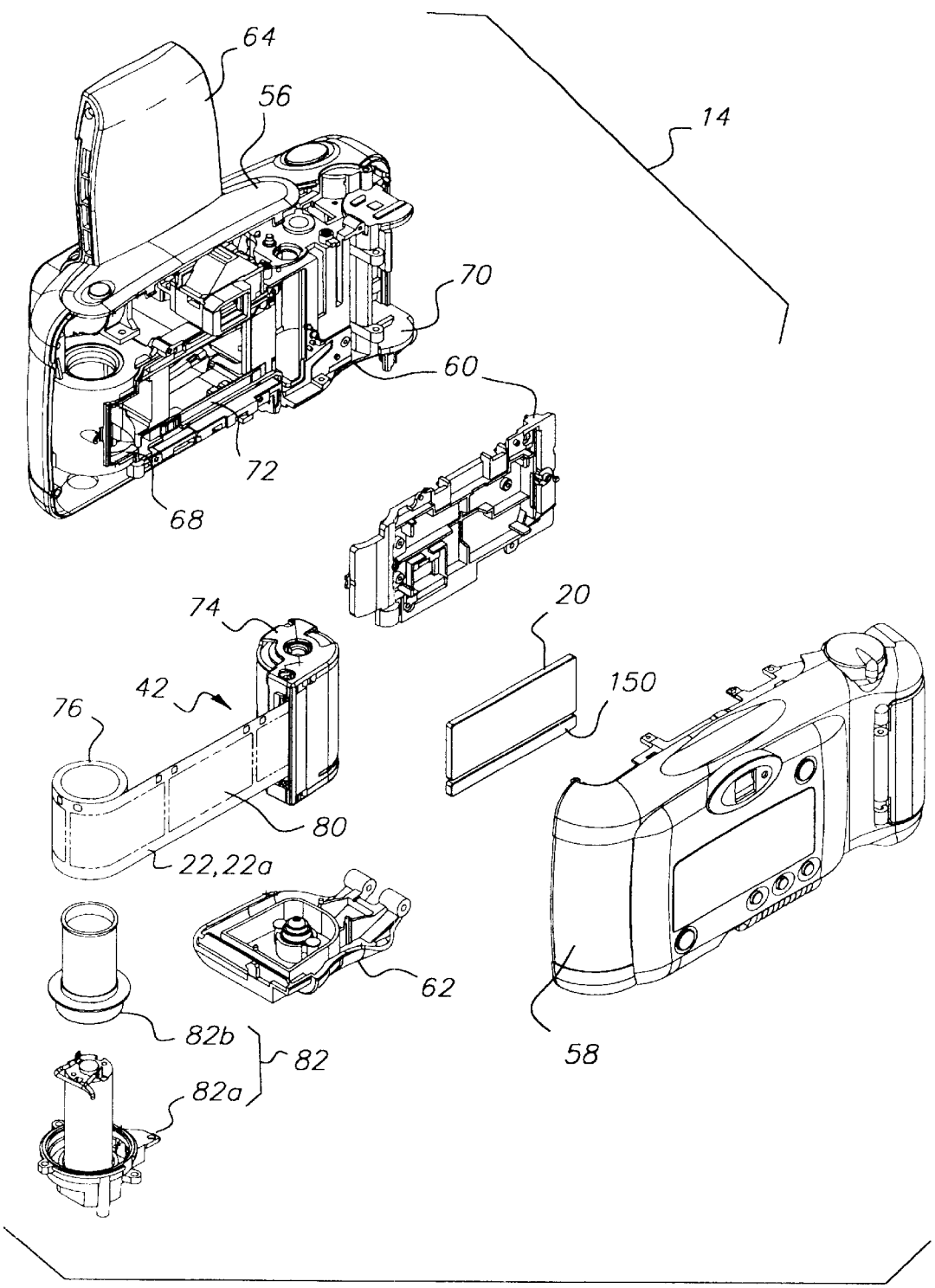
FIG. 7 is a partially exploded view of the camera of FIG. 3.

Referring to FIGS. 3, 6, and 7, the camera 14, in this embodiment, has a body 54 that holds a film latent image capture unit 18a and an electronic capture unit 16. The body 54 provides structural support and protection for other components. The body 54 of the camera 14 can be varied to meet requirements of a particular use and style considerations. It is convenient if the body 54 has front and rear covers 56,58 joined together over a chassis 60. Many of the components of the camera 14 can be mounted to the chassis 60. A film door 62 and a flip-up flash unit 64 are pivotably joined to the covers 56,58 and chassis 60.

The archival image capture unit 18 mounted in the body 54 is a film capture unit 18a. The film capture unit 18a has a film holder 66 that holds a film unit 42 during use. The configuration of the film holder 66 is a function of the type of film unit 42 used. The camera 14 shown in the Figures is film reloadable and uses an Advanced Photo System ("APS") film cartridge. The camera 14 has IX–DX code reader (not shown) to determine the film type and a magnetic writer (not shown) to write data on the film 22a indicating how many prints of each film frame to produce. This is not limiting. For example, other types of one or two chamber film cartridge, and roll film; and suitable cameras, can also be used.

The film holder 66 includes a pair of film chambers 68,70 and an exposure frame 72 (sometimes referred to as an "intermediate section") between the film chambers 68,70. The film unit 42 has a canister 74 disposed in one of the chambers. A filmstrip 22a is wound around a spool held by the canister 74. During use, the filmstrip 22a extends across the exposure frame 72 and is wound into a film roll 76 in the other chamber. The exposure frame 72 has an opening 78 through which a light image exposes a frame 80 of the film 22a at each picture taking event.

The filmstrip 22a is moved across the exposure frame 72 by a film transport 82. The film transport 82, as illustrated in FIG. 7, includes an electric motor 82a located within a supply spool 82b, but other types of motorized transport mechanisms and manual transports can also be used. Latent image exposure can be on film advance or on rewind.

The electronic image capture unit 16 has an electronic array imager 84 that is mounted in the body 54 and is configured so as to capture the same scene as is captured in the latent image on film. The type of imager 84 used may vary, but it is highly preferred that the imager 84 be one of the several solid-state imagers available. One highly popular type of solid-state imager commonly used is the charge coupled device ("CCD"). Of the several CCD types available, two allow easy electronic shuttering and thereby are preferable in this use. The first of these, the frame transfer CCD, allows charge generation due to photoactivity and then shifts all of the image charge into a light shielded, non-photosensitive area. This area is then clocked out to provide a sampled electronic image. The second type, the interline transfer CCD, also performs shuttering by shifting the charge, but shifts charge to an area above or below each image line so that there are as many storage areas as there are imaging lines. The storage lines are then shifted out in an appropriate manner. Each of these CCD imagers has both advantages and disadvantages, but all will work in this application. A typical CCD has separate components that act as clock drivers, analog signal processor 136 (ASP) and A/D converter. It is also possible to use an electronic image sensor manufactured with CMOS technology. This type of imager is attractive for use, since it is manufactured easily in a readily available solid-state process and lends itself to use with a single power supply. In addition, the process allows peripheral circuitry to be integrated onto the same semiconductor die. For example, a CMOS sensor can include clock drivers, analog signal processor 136 and A/D converter components integrated on a single IC. A third type of sensor which can be used is a charge injection device (CID). This sensor differs from the others mentioned in that the charge is not shifted out of the device to be read. Reading is accomplished by shifting charge within the pixel. This allows a nondestructive read of any pixel in the array. If the device is externally shuttered, the array can be read repeatedly without destroying the image. Shuttering can be accomplished by external shutter or, without an external shutter, by injecting the charge into the substrate for recombination.

The electronic image capture unit 16 captures a three-color image. It is highly preferred that a single imager 84 be used along with a three-color filter, however, multiple monochromatic imagers and filters can be used. Suitable three-color filters are well known to those of skill in the art, and, in some cases are incorporated with the imager 84 to provide an integral component.

Referring now primarily to FIG. 3, the camera 14 has a optical system 86 of one or more lenses mounted in the body 54. The optical system is illustrated by a dashed line and several groups of lens elements 85. It will be understood that this is illustrative, not limiting. The optical system 86 directs light to the exposure frame 72 and to the electronic array imager 84. The optical system 86 also preferably directs light through a viewfinder 88 to the user, as shown in FIG. 3. The imager 84 is spaced from the exposure frame 72, thus, the optical system 86 directs light along the first path (indicated by a dotted line 90) to the exposure frame 72 and along a second path (indicated by a dotted line 92) to the electronic array imager 84. Both paths 90,92 converge at a position in front of the camera 14, at the plane of the subject image. In FIG. 3, the optical system 86 has first and second paths 90,92 that are in convergence at the subject image and extend to a taking lens unit 94 and a combined lens unit 96 that includes both an imager lens unit 98 and a viewfinder lens unit 100. The combined lens unit 96 has a partially transmissive mirror 102 that subdivides the second light path 92 between an imager subpath 92a to the imager 84 and a viewfinder subpath 92b that is redirected by a fully reflective mirror 104 and transmitted through an eyepiece 106 to the photographer.

The optical system 86 can be varied. A viewfinder lens unit and an imager lens unit can be fully separate, as shown in FIG. 5, or a combined lens unit can includes both a taking lens unit and an imager lens unit (not shown). Other alternative optical systems can also be provided.

Referring again to the embodiment shown in FIG. 3, the taking lens unit 94 is a motorized zoom lens in which a mobile element or elements are driven, relative to a stationary element or elements, by a zoom driver 108. The combined lens unit 96 also has a mobile element or elements, driven, relative to a stationary element or elements, by a zoom driver 108. The different zoom drivers 108 are coupled so as to zoom to the same extent, either mechanically (not shown) or by a controller 132 signaling the zoom drivers 108 to move the zoom elements of the units over the same or comparable ranges of focal lengths at the same time. The controller 132 can take the form of an appropriately configured microcomputer, such as an embedded microprocessor having RAM for data manipulation and general program execution.

The taking lens unit 94 of the embodiment of FIG. 3 is also autofocusing. An autofocusing system 110 has a sensor 112 that sends a signal to a ranger 114, which then operates a focus driver 116 to move one or more focusable elements (not separately illustrated) of the taking lens unit 94. The autofocus can be passive or active or a combination of the two.

The taking lens unit 94 can be simple, such as having a single focal length and manual focusing or a fixed focus, but this is not preferred. One or both of the viewfinder lens unit 100 and imager lens unit 98 can have a fixed focal length or one or both can zoom between different focal lengths. Digital zooming (enlargement of a digital image equivalent to optical zooming) can also be used instead of or in combination with optical zooming for the imager 84. The imager 84 and display 20 can be used as a viewfinder prior to image capture in place of or in combination with the optical viewfinder 88, as is commonly done with digital still cameras. This approach is not currently preferred, since battery usage is greatly increased.

Although the camera 14 can be used in other manners, the archival image is intended to provide the basis of the photofinished final image desired by the user and the verification image is intended to provide a check on the results that will be later provided in the final image. The verification image thus does not have to have the same quality as the archival image. As a result, with the camera 14 of FIG. 3, the imager 84 and the portion of the optical system 86 directing light to the imager 84 can be made smaller, simpler, and lighter. For example, the taking lens unit 94 can be focusable and the imager lens unit 98 can have a fixed focus or can focus over a different range or between a smaller number of focus positions.

A film shutter 118 shutters the light path 90 to the exposure frame 72. An imager shutter 120 shutters the light path 92 to the imager 84. Diaphragms/aperture plates 122, 124 can also be provided in both of the paths 90,94. Each of the shutters 118,120 is switchable between an open state and a closed state. The term "shutter" is used in a broad sense to refer to physical and/or logical elements that provide the function of allowing the passage of light along a light path to a filmstrip or imager for image capture and disallowing that passage at other times. "Shutter" is thus inclusive of, but not limited to, mechanical and electromechanical shutters of all types. "Shutter" is not inclusive of film transports and like mechanisms that simply move film or an imager in and out of the light path. "Shutter" is inclusive of computer software and hardware features of electronic array imagers that allow an imaging operation to be started and stopped under control of the camera controller 132.

In currently preferred embodiments, the film shutter 118 is mechanical or electromechanical and the imager shutter 120 is mechanical or electronic. The imager shutter 120 is illustrated by dashed lines to indicate both the position of a mechanical imager shutter 120 and the function of an electronic shutter. When using a CCD, electronic shuttering of the imager 84 can be provided by shifting the accumulated charge under a light shielded provides at a non-photosensitive region. This may be a full frame as in a frame transfer device CCD or a horizontal line in an interline transfer device CCD. Suitable devices and procedures are well known to those of skill in the art. When using a CID, the charge on each pixel is injected into a substrate at the beginning of the exposure. At the end of the exposure, the charge in each pixel is read. The difficulty encountered here is that the first pixel read has less exposure time than the last pixel read. The amount of differece is the time required to read the entire array. This may or may not be significant depending upon the total exposure time and the maximum time needed to read the entire array. CMOS imagers are commonly shuttered by a method called a rolling shutter. CMOS imagers using this method are not preferred, since this shutters each individual line to a common shutter time, but the exposure time for each line begins sequentially. This means that even with a short exposure time, moving objects will be distored. Given horizontal motion, vertical features will image diagonally due to the temporal differences in the line-by-line exposure. Another method for shuttering CMOS imagers is described in U.S. Pat. No. 5,986,297. In this method, called single frame capture mode, all pixels are allowed to integrate charge during exposure time. At the end of the exposure time, all pixels are simultaneously transferred to the floating diffusion of the device. At this position sequential read out by lines is possible.

The imager 84 receives a light image (the subject image) and converts the light image to an analog electrical signal, an electronic image that is also referred to here as the initial verification image. (For convenience, the electronic image is generally discussed herein in the singular.) The electronic imager 84 is operated by the imager driver 126. The electronic image is ultimately transmitted to the image display 20, which is operated by an image display driver 128. Between the imager 84 and the image display 20 is a control system 130.

The control system 130 controls other components of the camera 10 and performs processing related to the electronic image. The control system 130 shown in FIG. 3 includes a controller 132, an A/D converter 134, an image processor 136, and memory 138. Suitable components for the control system are known to those of skill in the art. Modifications of the control system 130 are practical, such as those described elsewhere herein. "Memory" refers to one or more suitably sized logical units of physical memory provided in semiconductor memory or magnetic memory, or the like. For example, the memory 138 can be an internal memory, such as a Flash EPROM memory, or alternately a removable memory, such as a Compact Flash card, or a combination of both. The controller 132 and image processor 136 can be controlled by software stored in the same physical memory that is used for image storage, but it is preferred that the processor 136 and controller 132 are controlled by firmware stored in dedicated memory, for example, in a ROM or EPROM firmware memory.

The initial electronic image is amplified and converted by an analog to digital (A/D) converter-amplifier 134 to a digital electronic image, which is then processed in the image processor 136 and stored in an image memory 138b. Signal lines, illustrated as a data bus 140, electronically connect the imager 84, controller 132, processor 136, the image display 20, and other electronic components.

The controller 132 includes a timing generator that supplies control signals for all electronic components in timing relationship. Calibration values for the individual camera 14 are stored in a calibration memory 138a, such as an EEPROM, and supplied to the controller 132. The controller 132 operates the drivers and memories, including the zoom drivers 108, focus driver 116, aperture drivers 142, and film and imager shutter drivers 144,146. The controller 132 connects to a flash circuit 148 that mediates flash functions. It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared in some embodiments.

The electronic verification images are accessed by the processor 136 and modified, as necessary, to meet predetermined output requirements, such as calibration to the display 20 used, and are output to the display 20. For example, the electronic image can be processed to provide color and tone correction and edge enhancement. The display 20 is driven by the image display driver 128 and, using the output of the processor 136, produces a display image that is viewed by the user. The controller 132 facilitates the transfers of the electronic image between the electronic components and provides other control functions, as necessary.

The control system 130 also provides digital processing that calibrates the verification image to the display 20. The calibrating can include conversion of the electronic image to accommodate differences in characteristics of the different components. For example, a transform can be provided that modifies each image to accommodate the different capabilities in terms of gray scale, color gamut, and white point of the display 20 and imager 84 and other components of the electronic capture unit 16. The calibration relates to component characteristics and thus is invariant from image to image. The electronic image can also be modified in the same manner as in other digital cameras to enhance images. For example, the verification image can be processed by the image processor 136 to provide interpolation and edge enhancement. A limitation here is that the verification image exists to verify the archival image. Enhancements that improve or do not change the resemblance to the archival image are acceptable. Enhancements that decrease that resemblance are not acceptable. If the archival image is an electronic image, then comparable enhancements can be provided for both verification and archival images. A single electronic image can be calibrated before replication of a verification image, if desired. Digital processing of an electronic archival image can include modifications related to file transfer, such as, JPEG compression, and file formatting.

The calibrated digital image is further calibrated to match output characteristics of the selected photofinishing channel to provide a matched digital image. Photofinishing related adjustments assume foreknowledge of the photofinishing procedures that will be followed for a particular unit of capture media. This foreknowledge can be made available by limiting photofinishing options for a particular capture media unit or by standardizing all available photofinishing or by requiring the user to select a photofinishing choice, for example by entering a character on a control pad or setting a switch. This designation can then direct the usage of particular photofinishing options and can provide for a direct or indirect indication of the effect of a particular option in the verification image. The application of a designation on a capture media unit could be provided by a number of means known to those in the art, such as application of a magnetic or optical code. Difference adjustments can be applied anywhere in the electronic imaging chain within the camera. Where the difference adjustments are applied in a particular embodiment is largely a matter of convenience and the constraints imposed by other features of the camera. For example, photofinishing difference adjustments can be provided in a look-up table that is keyed to a selection of a photofinishing choice by the user. The controller alters the color value in accordance with the selected adjustment.

The controller 132 can be provided as a single component or as multiple components of equivalent function in distributed locations. The same considerations apply to the processor 136 and other components. Likewise, components illustrated as separate units herein may be conveniently combined or shared in some embodiments.

Different types of image display 20 can be used. For example, the display 20 can be a liquid crystal display ("LCD"), a cathode ray tube display, or an organic electroluminescent display ("OELD"; also referred to as an organic light emitting display, "OLED"). It is also preferred that the image display 20 is operated on demand by actuation of a switch (not separately illustrated) and that the image display 20 is turned off by a timer or by initial depression of the shutter release 12. The timer can be provided as a function of the controller 132. The display 20 is preferably mounted on the back or top of the body 54, so as to be readily viewable by the photographer immediately following a picture taking. One or more information displays 150 can be provided on the body 54, to present camera 14 information to the photographer, such as exposures remaining, battery state, printing format (such as C, H, or P), flash state, and the like. The information display 150 is operated by an information display driver 152. Instead of an information display 150, this information can also be provided on the image display 20 as a superimposition on the image or alternately instead of the image (not illustrated).

The image display 20, as shown in FIG. 6, is mounted to the back of the body 54. An information display 150 is mounted to the body 54 adjacent the image display 20 so that the two displays form part of a single user interface 154 that can be viewed by the photographer in a single glance. The image display 20, and an information display 150, can be mounted instead or additionally so as to be viewable through the viewfinder 88 as a virtual display (not shown). The image display 20 can also be used instead of or in addition to an optical viewfinder 88.

It is preferred that the imager 84 captures and the image display 20 shows substantially the same geometric extent of the subject image as the latent image, since the photographer can verify only what is shown in the display 20. For this reason it is preferred that the display 20 show from 85–100 percent of the latent image, or more preferably from 95–100 percent of the latent image.

Referring now particularly to FIG. 3, the user interface 154 of the camera 14 has user controls 156 including "zoom in" and "zoom out" buttons 158 that control the zooming of the lens units, and the shutter release 12. The shutter release 12 operates both shutters 118,120. To take a picture, the shutter release 12 is actuated by the user and trips from a set state to an intermediate state, and then to a released state. The shutter release 12 is typically actuated by pushing, and, for convenience the shutter release 12 is generally described herein in relation to a shutter button that is initially depressed through a "first stroke" (indicated in FIG. 3 by a solid lined arrow 160), to actuate a first switch 162 and alter the shutter release 12 from the set state to the intermediate state and is further depressed through a "second stroke" (indicated in FIG. 3 by a dashed lined arrow 164), to actuate a second switch 166 and alter the shutter release 12 from the intermediate state to the released state. Like other two stroke shutter releases well known in the art, the first stroke actuates automatic setting of exposure parameters, such as autofocus, autoexposure, and flash unit readying; and the second stroke actuates image capture.

Referring now to FIG. 3, when the shutter release 12 is pressed to the first stroke, the taking lens unit 94 and combined lens unit 96 are each autofocused to a detected subject distance based on subject distance data sent by the autoranging unit 114 ("ranger" in FIG. 3) to the controller 132. The controller 132 also receives data indicating what focal length the zoom lens units are set at from one or both of the zoom drivers 108 or a zoom sensor (not shown). The camera 14 also detects the film speed of the film cartridge 42 loaded into the camera 14 using a film unit detector 168 and relays this information to the controller 132. The camera 14 obtains scene brightness (Bv) from components, discussed below, that function as a light meter. The scene brightness and other exposure parameters are provided to an algorithm in the controller 132, which determines a focused distance, shutter speeds, apertures, and optionally a gain setting for amplification of the analog signal provided by the imager 84. Appropriate signals for these values are sent to the focus driver 116, film and imager aperture drivers 142, and film and imager shutter drivers 144,146 via a motor driver interface (not shown) of the controller 132. The gain setting is sent to the A/D converter-amplifier 134.

In the camera 14 shown in FIG. 3, the captured film image provides the archival image. In an alternative embodiment shown in FIG. 4, the archival image is an electronic image and the capture media is removable memory 22b. The type of removable memory used and the manner of information storage, such as optical or magnetic or electronic, is not critical. For example, the removable memory can be a floppy disc, a CD, a DVD, a tape cassette, or flash memory card or stick. In this embodiment, an electronic image is captured and then replicated. The first electronic image is used as the verification image; the second electronic image is stored on the capture media to provide the archival image. The system 10, as shown in FIG. 2, is otherwise like the system 10 as earlier described, with the exception that photofinishing does not include chemical development and digitization. With a fully electronic camera 14, the verifying image can be a sampled, low resolution subset of the archival image or a second lower resolution electronic array imager (not illustrated) can be used. The low resolution subset of the archival image can be provided using the method described in commonly-assigned U.S. Pat. No. 5,164,831 "ELECTRONIC STILL CAMERA PROVIDING MULTI- FORMAT STORAGE OF FULL AND REDUCED RESOLUTION IMAGES" to Kuchta, et. al., the disclosure of which is herein incorporated by reference.

The camera 14 shown in FIG. 5 allows use of either the film capture unit 18a or the electronic capture unit 16 as the archival capture unit, at the selection of the photographer or on the basis of available storage space in one or another capture media 22 or on some other basis. For example, the mode switch 170 can provide alternative film capture and electronic capture modes. The camera 14 otherwise operates in the same manner as the earlier described embodiments.

The camera 14 assesses an ambient illumination level and an ambient light color value corresponding to the color temperature of the scene illuminant using the imager 84 or a separate detector 172 (indicated by dashed lines in the figures) or both. FIGS. 2–5 illustrate cameras 14 having an electronic imaging unit 16 including an imager 84, and an ambient detector 172 (indicated by dashed lines as being an optional feature). The detector 172 has an ambient detector driver 173 that operates a single sensor 174 or multiple sensors (not shown). The term "sensor" is inclusive of an array of sensors. Sensors are referred to here as being "single" or "multiple" based on whether the ambient light detection separately measures light received from different parts of the ambient area. A "single sensor" may have separate photodetectors for different colors. The ambient light detector or sensors can receive light from the optical system 86 or can be illuminated external to the optical system 86.

The imager 84 can be used to determine color balance and the ambient detector 172 to determine scene brightness. (The imager 84 could be used for brightness and the ambient detector 172 for color balance, but this is not as advantageous.) Alternatively, either the imager 84 or the ambient detector 172 can be used to sense both values. The camera 14 can also be configured to change selectively change usage of the imager 84 and detector 172 with different user requirements, such as unusual lighting conditions.

Each approach has advantages and disadvantages. Use of the imager 84 reduces the complexity of the camera 14 in terms of number of parts, but increases complexity of the digital processing required for captured images. The imager 84 is shielded from direct illumination by overhead illuminants providing the ambient lighting. A detector 172 having a sensor or sensors receiving light from the optical system 86 has this same advantage. A separate detector 172 has the advantage of simpler digital processing and can divide up some functions. For example, a detector 172 can have a first ambient light detector to determine scene brightness for calculating exposure settings, prior to exposure and a second sensor to determine color value at the time of exposure (not shown). Use of the imager reduces the number of parts in the camera 14. Information processing procedures for scene brightness and color balance can be combined for more efficient operations. This combination has the shortcoming of increasing the digital processing burden when only partial information is required, such as when exposure settings are needed prior to image exposure.

Figure 21:
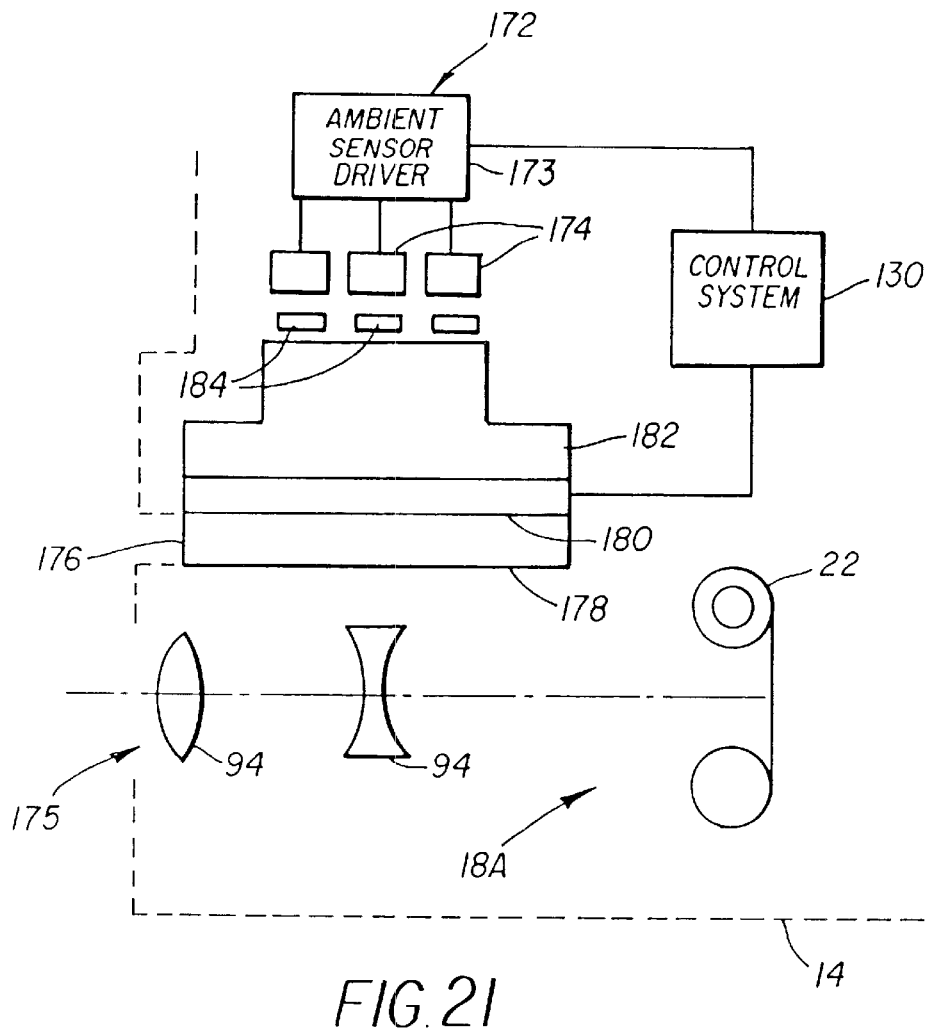
FIG. 21 is a partial diagrammatical view of an embodiment of the camera showing details of an ambient light detector that is separate from the imager.

An example, of a suitable ambient detector that can be used to provide one or both of scene illumination and color value and is separate from the electronic image capture unit 16, is disclosed in U.S. Pat. No. 4,887,121, and is illustrated in FIG. 21. The detector 172 faces the same direction as the lens opening 175 of the taking lens unit 94 of the camera 14. The detector 172 receives light through a window 176 directed toward the scene image to be captured by the taking lens unit 94. Ambient light enters the window 176 and is directed by a first light pipe 178 to a liquid crystal mask 180. A second light pipe 182 receives light transmitted through the liquid crystal mask 180 and directs that light to a series of differently colored filters 184 (preferably red, green, and blue). A photodetector 186 located on the other side of each of the filters 184 is connected to the control system 130. The liquid crystal mask 180 is controlled by the control system 130 to transmit light uniformly to all of the photodetectors 186 for color measurement. The liquid crystal mask 180 provides a grid (not shown) that can be partially blocked in different manners to provide exposure measurements in different patterns.

The electronic capture unit 16 can be used instead of a separate detector 172, to obtain scene brightness and color balance values. In this approach, captured electronic image data is sampled and scene parameters are determined from that data. If autoexposure functions, such as automatic setting of shutter speeds and diaphragm settings, are to be used during that image capture, the electronic capture unit 16 needs to obtain an ambient illumination level prior to an image capture. This can be done by providing an evaluate mode and a capture mode for the electronic capture unit 16. In the evaluate mode, the electronic capture unit 16 captures a continuing sequence of electronic images. These images are captured, seratim, as long as the shutter release 12 is actuated through the first stroke and is maintained in that position. The electronic images could be saved to memory, but are ordinarily discarded, one after another, when the replacement electronic image is captured to reduce memory usage. The verification image is normally derived from one of this continuing series of electronic images, that is concurrent, within the limits of the camera shutters, with the archival image capture. In other words, the verification image is provided by the last of the series of electronic images captured prior to and concurrent with a picture taking event. Alternatively, one or more members of the sequence of evaluation images can be used, in place of or with the final electronic image, to provide photometric data for the exposure process as well as providing the data needed for color cast detection. The term "verification image" used herein, is inclusive of the images provided by either alternative; but, for convenience, the verification image is generally described herein as being derived from a final electronic image. The term "evaluation images" is used herein to identify the members of the series of electronic images that precede the capture of archival image and do not contribute or contribute only in part, to the verification image.

The evaluation images can be provided to the image display 20 for use by the photographer, prior to picture taking, in composing the picture. The evaluation images can be provided with or without a color cast signal. The provision of a color cast signal has the advantage that the photographer is given more information ahead of time and can better decide how to proceed. On the other hand, this increases energy demands and may provide information that is of little immediate use to the photographer while the photographer is occupied composing the picture. It is currently preferred that the camera 14 not display the evaluation images, since the use of the display 20 for this purpose greatly increases battery drain and an optical viewfinder 88 can provide an equivalent function with minimal battery drain.

For illumination levels, the electronic capture unit 16 is calibrated during assembly, to provide a measure of illumination levels, using a known illumination level and imager gain. The controller 132 can process the data presented in an evaluation image using the same kinds of light metering algorithms as are used for multiple spot light meters. The procedure is repeated for each succeeding evaluation image. Individual pixels or groups of pixels take the place of the individual sensors used in the multiple spot light meters. For example, the controller 132 can determine a peak illumination intensity for the image by comparing pixel to pixel until a maximum is found. Similarly, the controller 132 can determine an overall intensity that is an arithmetic average of all of the pixels of the image. Many of the metering algorithms provide an average or integrated value over only a portion of the imager 84 array. Another approach is to evaluate multiple areas and weigh the areas differently to provide an overall value. For example, in a center weighted system, center pixels are weighted more than peripheral pixels. The camera 14 can provide manual switching between different approaches, such as center weighted and spot metering. The camera 14 can alternatively, automatically choose a metering approach based on an evaluation of scene content. For example, an image having a broad horizontal bright area at the top can be interpreted as sky and given a particular weight relative to the remainder of the image.

Under moderate lighting conditions the imager 84 can provide light metering and color balance determination from a single evaluation image. More extreme lighting conditions can be accommodated by use of more than one member of a series of evaluation electronic images while varying exposure parameters until an acceptable electronic image has been captured. The manner in which the parameters are varied is not critical. The following approach is convenient. When an unknown scene is to be measured, the imager 84 is set to an intermediate gain and the image area of interest is sampled. If the pixels measure above some upper threshold value ($T_H$) such as 220, an assumption is made that the gain is too high and a second measurement is made with a gain of one-half of the initial measurement (1 stop less). (The values for $T_H$ and $T_L$ given here are by way of example and are based on 8 bits per pixel or a maximum numeric value of 255.) If the second measurement is one-half of the previous measurement, it is assumed that the measurement is accurate and representative. If the second measurement is still above $T_H$, the process is repeated until a measurement is obtained that has a value that is one-half that of the preceding measurement. If the initial measurement results in a value less than a low threshold ($T_L$) such as 45, the gain is doubled and a second measurement made. If the resultant measurement is twice the first measurement, it is assumed that the measurement is accurate and representative. If this is not the case, then the gain is doubled again and the measurement is repeated in the same manner as for the high threshold. Exposure parameters, such as aperture settings and shutter speeds can be varied in the same manner, separately or in combination with changes in gain. In limiting cases, such as full darkness, the electronic image capture unit 16 is unable to capture an acceptable image. In these cases, the evaluator can provide a failure signal to the user interface 154 to inform the user that the camera 14 cannot provide appropriate light metering and color balancing under the existing conditions. Appropriate algorithms and features for these approaches are well known to those of skill in the art.

After the controller 132 receives the scene brightness value, the controller 132 compares scene brightness to a flash trip point. If the light level is lower than the flash trip point, then the controller 132 enables full illumination by the flash unit 64, unless the user manually turned the flash off.

Figure 28:
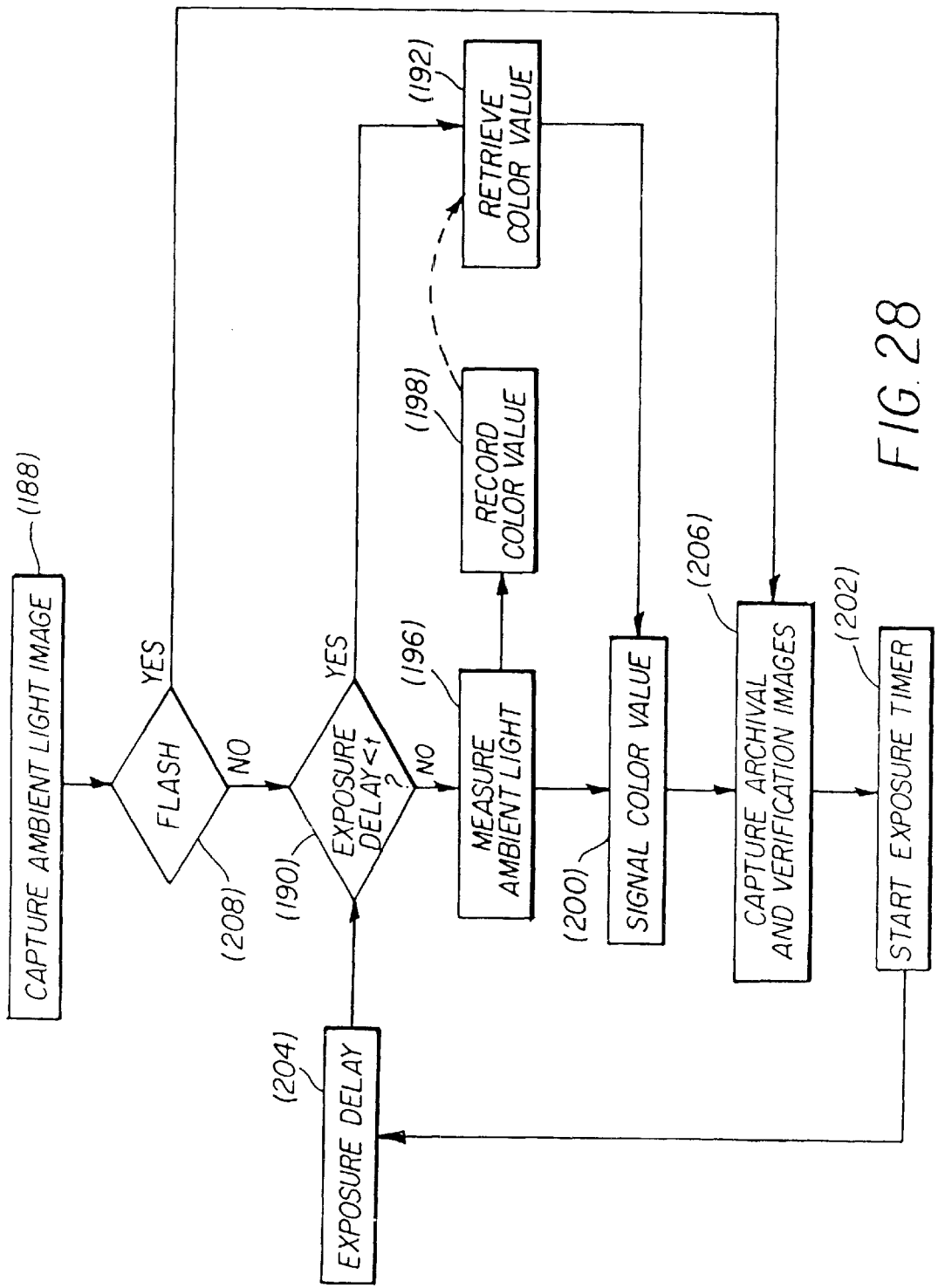
FIG. 28 is a flow chart of a secondary approaches for color cast signaling.

The cameras 14 can determine ambient illumination level and ambient light color value for every capture event. Alternatively, to save digital processing, the camera 14 can check for a recent exposure before measuring the ambient light or before performing all of the processing. Referring to FIG. 28, after a first stroke (188) actuates the first switch 162, if the camera 14 finds (190) a time delay following an earlier exposure that is less than a predetermined value, the camera 14 retrieves (192) previously stored color value. If the time elapsed is more than the predetermined value, then the camera measures (196) the ambient light and records (198) the resulting color value. The retrieved or assessed color value is transmitted (200) to the controller. The archival and verification images are captured (206) and a timer is started (202) to provide the time elapse (204) for the next exposure. The same procedure can be followed for the illumination level or for both the color value and the illumination level. The approach assumes that the ambient lighting will not change appreciably over a small elapsed time. Suitable elapsed time periods will depend upon camera usage, with longer times presenting a greater risk of error and shorter times increasing the processing burden on the camera during a series of exposures. For ordinary use, an elapsed time of less than a minute is preferred. The elapsed time timer is reset whenever the camera 14 is turned off.

Another secondary approach, also illustrated in FIG. 28, is to disable (208) color signaling when a flash is used. Flash units 64 provide an illuminant that approximates daylight and can be treated as providing daylight in most embodiments disclosed herein for color cast signaling purposes. This approach can be used with the elapsed time secondary approach just discussed, as shown in FIG. 28. Color signalling can, optionally, also be disabled (not shown) when scene luminance is very high, on an assumption that a very high illumination level is due to the camera being exposed to daylight illumination outdoors. These secondary approaches can be implemented by software or firmware in the control system (not separately illustrated) and can be combined into the other embodiments earlier discussed in any manner. The secondary approaches can also be modified, for example, by providing for the taking of color value and light level measurements every time and skipping only digital processing steps when the elapsed time warrants or flash is used.

The camera 14 provides a signal that the archival image is expected to have a color cast. The signal can be either illustrative or non-illustrative. With an illustrative signal the camera 14 shows at least an approximation of the effect of the color cast directly in the verification image. With a non-illustrative signal, the camera 14 presents only an indication 360 that the archival image will exhibit a color cast. The effect of the color cast on the archival image corresponding to the verification image is left to the photographer's imagination.

Illustrative Signalling

Referring now particularly to FIGS. 3–20, in cameras 14 that provide an illustrative signal, the electronic image is modified so that the photographer can directly see the expected color cast or an approximation of that color cast; the electronic verification image provided by the camera 14 can be immediately used by the photographer to determine whether a picture captured will provide an archival image after photofinishing that has acceptable color balance as well as acceptable composition and other characteristics. Human visual adaptation is overcome by showing a verification image that has been modified, responsive to ambient light where the picture was taken, to increase the color cast sufficiently to be perceivable despite the photographer's adaptation to that ambient light. This modification, also referred to herein as, "chromatic adaptation inverse compensation", is opposite in effect from white balancing, since the modification is an increase in color cast relative to the initial verification image (and relative to the expected photofinished archival image). The resulting displayed verification image does not actually have the color balance that will be seen in the final archival image, but to the visually adapted photographer the verification image appears to have the color balance or an approximation of the color balance of the final archival image. The photographer can thus determine if a color cast will be present in the final archival image, and if so, can decide if remedial action should be taken, such as repeating the shot using a camera flash.

The image display 20, in these embodiments, provides a color image that is of sufficient quality to allow the photographer to distinguish a color cast relative to reflected light from a designated illuminant and a compensated color cast relative to reflected light from an expected adaptive, non-designated illuminant. Acceptable image displays provide emissive light directly or by means of a backlight. The light has a white point that can be varied to provide the range of chromatic adaptive inverse compensation provided by the camera 14. Unacceptable image displays have a more limited white point range, or use reflective ambient light for illumination.

Figure 8:
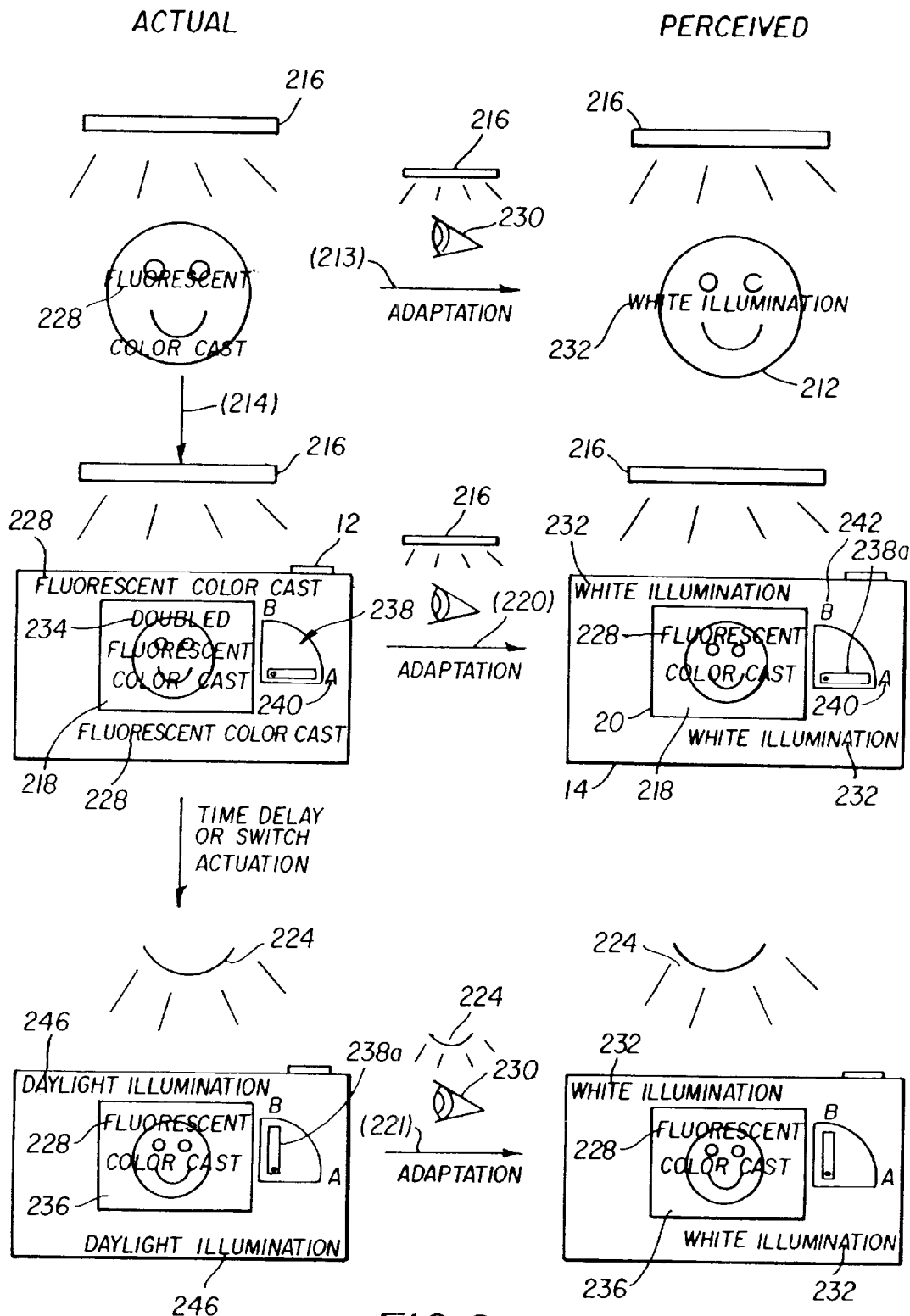
FIG. 8 is a diagram of the operation of an embodiment of the camera which provides an illustrative color cast signal.

Referring to FIG. 8, illustrative signalling is illustrated by two columns which show actual illumination ("ACTUAL") and what is seen by the photographer ("PERCEIVED"). For simplicity, the discussion herein is limited to the photographer, that is, the person using the camera 14. The same considerations apply to other persons viewing the verification image. The columns, in FIG. 8, are connected by arrows 210 indicating the adaptation of the photographer's visual system to the indicated ambient light. A subject 212 is viewed (213) photographed (214) in ambient lighting. The ambient light is adaptive non-designated illumination emitted by a fluorescent lamp 216 and reflected from the subject. The verification image 218 provided on the image display 20 of the camera 14 is then viewed (220) in the same ambient lighting and also viewed (221) after a time delay or other actuation (222) in daylight (indicated by a sun symbol 224). The designated illuminant for the archival capture media (not separately illustrated in FIG. 8) is daylight.

At the time the picture is taken, the subject 212 is illuminated by the fluorescent illumination. In the ACTUAL column, reflected light from the photographed subject 212 is symbolized by the term "FLUORESCENT COLOR CAST" 228 indicating the color balance of the fluorescent illuminant. The photographer's visual system, symbolized by an eye 230, is subject to adaptation and sees the adaptive non-designated illumination reflected from the subject 212 as being white. In the PERCEIVED column, this is symbolized by the term "WHITE ILLUMINATION" 232.

After the photograph of the subject 212 is taken, an immediate verification image 218 appears on the display 20 on the camera 14. (The embodiment of the camera 14 shown in this figure provides a verification image that has double the color cast detected in the ambient lighting. This embodiment was selected for simplicity in this discussion. Other embodiments operate in a comparable manner.) The camera 14 has remained in the same ambient light in which the archival image was captured. The photographer remains adapted to the ambient adaptive non-designated illumination and sees light reflected off the back 226 of the camera 14 as being white illumination. In the ACTUAL column, reflected light from the back 226 of the camera 14 used is symbolized by the term "FLUORESCENT COLOR CAST" 228 indicating the color balance of the fluorescent illuminant. In the PERCEIVED column, reflected light from the back 226 of the camera 14 used is symbolized by the term "WHITE ILLUMINATION" 232 indicating the color balance seen by the photographer.

Referring again to the ACTUAL column, the display 20 shows an immediate verification image 218 that has been modified to compensate for the photographer's adaptation to the ambient illumination. This is symbolized by the term "DOUBLED FLUORESCENT COLOR CAST" 234. Referring to the PERCEIVED column, the photographer sees "WHITE ILLUMINATION" on the back of the camera and, in the display 20, what will be the color cast after photofinishing. (Indicated by "FLUORESCENT COLOR CAST" 228 in the PERCEIVED column.) The color cast that is lost to view by the visual adaptation of the photographer is restored by the compensation. What the photographer sees is not exact, but is close enough for the photographer to accurately determine whether the captured film image is acceptable.

In addition to the immediate verification image, the camera 14 can also provide a "delayed verification image" 236, in which the color cast is presented without compensation. The camera 14 replaces the immediate verification image with the delayed verification image when a switch 238 is actuated, following a time delay or by the intercession of the user (indicated by arrow (222) in FIG. 8). The delayed verification image 236 does not compensate for the non-designated illuminant present during image capture. The change from the immediate verification image to the delayed verification image is based upon an assumption that, in most cases the user will change locations and enter different ambient light conditions following an image capture event. Since the new lighting conditions are unknown, the best accommodation is a presumption that the designated illuminant (daylight in FIG. 8) will be the dominant light source and that the user will be adapted to that source.

The switch 238 is illustrated by an arm 238a that has an immediate verification image position, indicated by "A" 240; and a delayed verification image position, indicated by "B" 242. The switch can include a mechanical timer. The arm 238a is movable manually between the two positions 240,242 or moves from position "A" 240 to position "B" 242 automatically following image exposure, under the action of the mechanical timer 244. (Not shown are fixed switch contacts aligned with "A" and "B" and a movable switch contact that moves with the arm between the two fixed contacts.) The arm 238a can be reset to position "A" 240 manually or automatically when the next image is captured. A digital circuit providing the same functions, can conveniently replace the switch shown.

In FIG. 8, following the time delay or switch actuation, the camera 14 is illuminated by daylight 224. The photographer is adapted to the ambient daylight illumination. The photographer sees the daylight illumination ("DAYLIGHT ILLUMINATION" 246 in ACTUAL column) reflected off the back of the camera 14 as being white illumination ("WHITE ILLUMINATION" 232 in PERCEIVED column). The display 20 shows a delayed verification image 248, that is, a non-compensated electronic image that has a color cast ("FLUORESCENT COLOR CAST" 228 in ACTUAL column) relative to daylight illumination. The photographer perceives the color cast ("FLUORESCENT COLOR CAST" 228 in PERCEIVED column). The photographer is again able to determine, from the verification image whether the captured archival image will be acceptable after photofinishing.

In the embodiment just described, the verification image capture unit 16 has a first mode, in which an immediate verification image 218 is prepared and displayed, and a second mode, in which a delayed verification image 248 is prepared and displayed.

Figure 9:
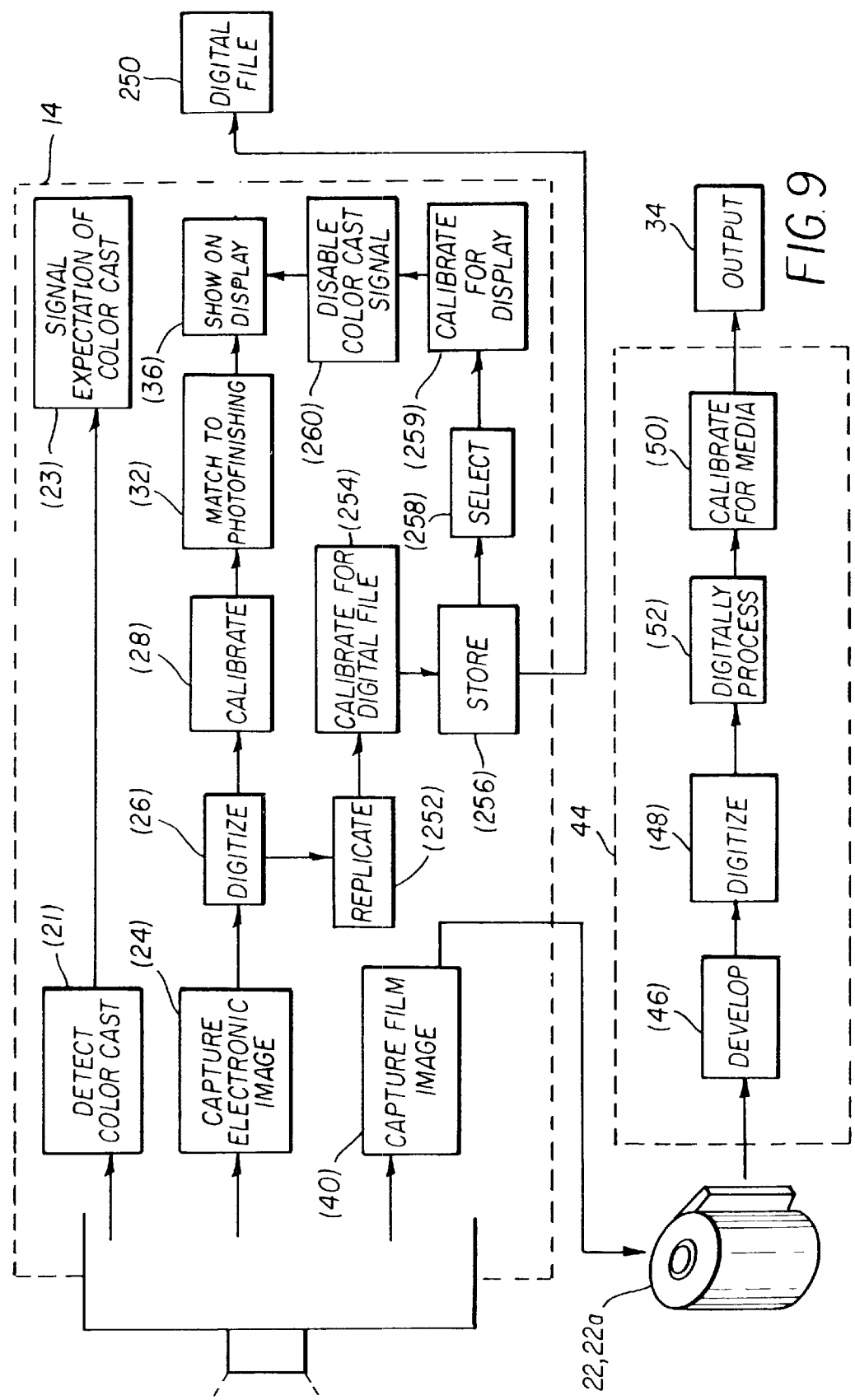
FIG. 9 shows a modification of the camera in the same diagrammatical view as FIG. 3.
Figure 10:
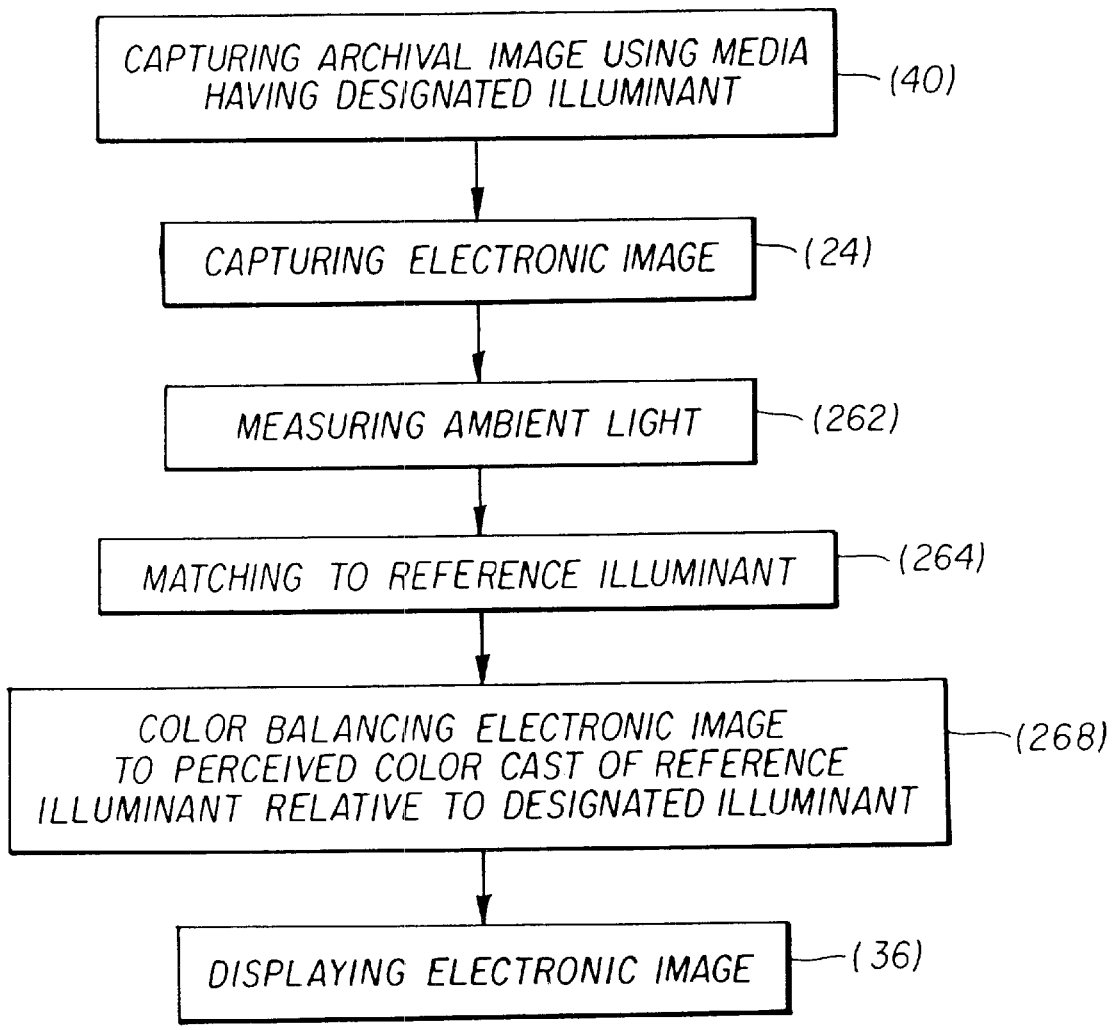
FIG. 10 is a diagrammatical view of an embodiment of the image capture method.
Figure 11:
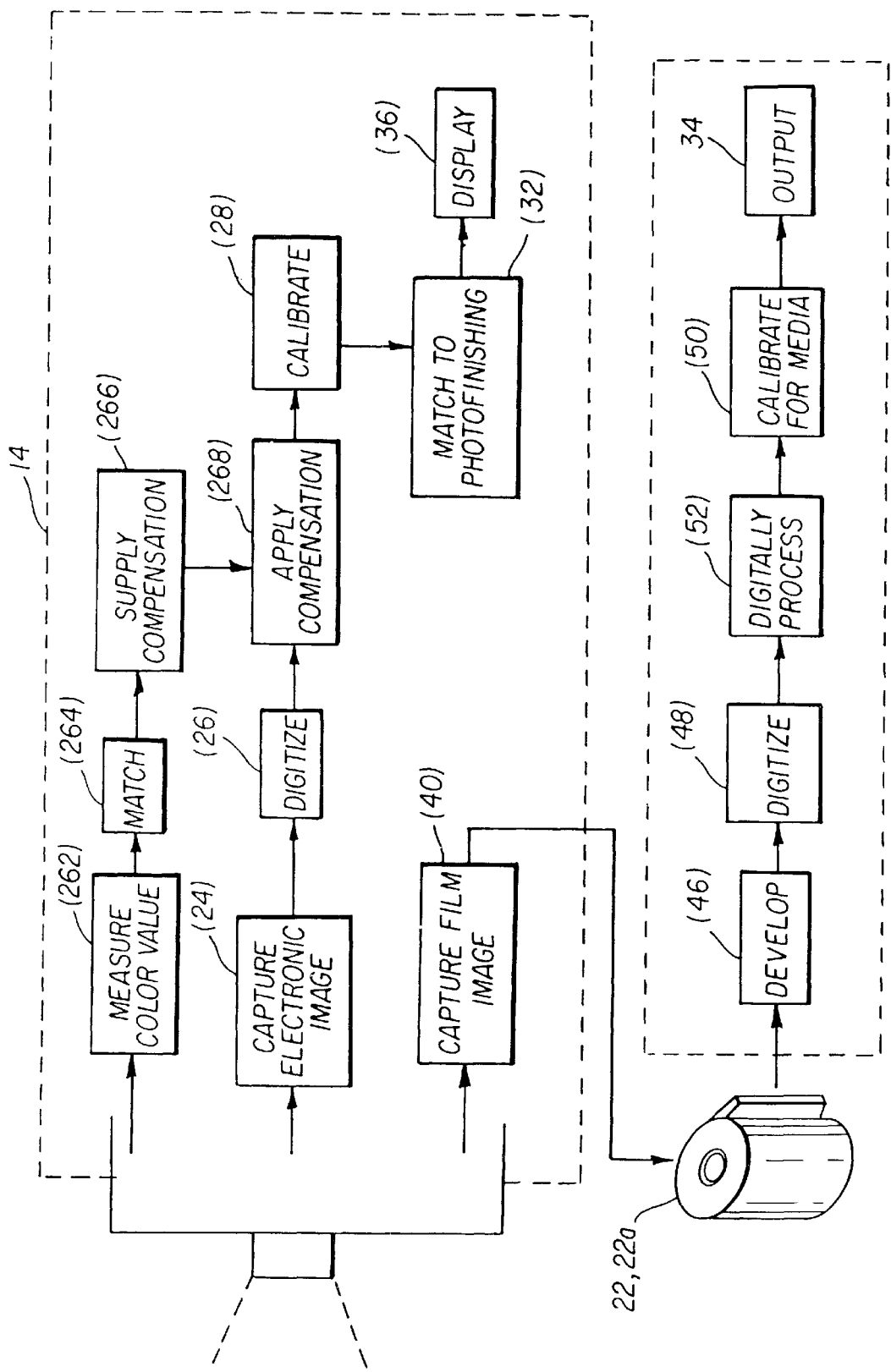
FIG. 11 shows another modification of the camera in the same diagrammatical view as FIG. 3.

In the embodiment shown in FIG. 9, the electronic image capture unit 16 also has a third mode, in which a digital transfer image 250 is prepared and displayed. The digital transfer image 250 is not used for verification purposes. The digital transfer image 250 begins with capture (24) of an initial electronic image. The electronic image is digitized (26) and replicated (252). One of the copies is handled as an immediate verification image 218 (not illustrated on FIG. 9) as previously described. The other copy is calibrated (254) for use as a digital file. This copy is not calibrated to match output characteristics of photofinishing. The resulting digital transfer image 250 is stored (256) in memory as a digital file and can be retrieved from memory and used in the same manner as other digital image files.

Since the digital transfer image is balanced for output as a digital file rather than for use as a verification image, the digital transfer image can be modified to optimize the appearance of the digital transfer image independent of a corresponding archival image. For example, the control system 130 of the camera 14 can include a white balance control (not separately illustrated) that is operatively connected to the image processor 136 and controller 132. This white balance control modifies the color balance of the electronic image to a predetermined standard, such as daylight.

The digital transfer image can be shown on the display 20 and can be digitally transmitted from the memory through an output port (not shown) directly or across a network to another digital device or storage medium for use as digital image or for photofinishing. The digital transfer image can also be physically transferred on removable memory. The image memory can include one or more of permanent memory, volatile or non-volatile, and temporary memory such as DRAM buffer memory.

The camera 14 can include a mode switch 170 that allows the user to selectively display the digital transfer image rather than a verification image. (The mode switch 170 can provide one function of multiple functions as desired. The detailed features of the mode switch are not critical and can be varied. For example, for multiple functions, a convenient mode switch (not shown) has a digital keypad.

Once the user has selected (258) to display the digital transfer image 250, the image 250 is retrieved from storage and is calibrated (259) to the image display 20 and is displayed (36). As a part of this process, the color cast signal is disabled (260). With illustrative signalling, the disabling is accomplished by omitting modification of the electronic image to show the color cast in the ambient lighting and, optionally, removing any color cast by white balancing.

Illustrative Signalling: Compensating for Matched Reference Illuminant

Referring now to FIGS. 10–13, in some embodiments of the above-described cameras 14, a color cast in the ambient illumination is shown directly in the verification image by modifying the verification image to the color balance of one of a group of predetermined reference illuminants selected on the basis of a measured ambient light color value. In the method and system of FIGS. 10–11, an ambient light image is captured (40) using archival media 22 having a designated illuminant. The ambient light image is also captured (24) as an electronic image in a camera 14. The color value of the ambient light is measured (262) and matched (264) to one of a group of predetermined reference illuminants to provide an assigned illuminant. The reference illuminants include the designated illuminant and one or more non-designated illuminants. Each reference illuminant has an associated compensation. Following matching (264), the compensation associated with the assigned illuminant is supplied (266) to the control system 130 and the compensation is applied (268).

The compensation can be applied to the earlier captured electronic image, in which case the image is stored in memory and is modified by an image processor. The compensation can also be applied to a next captured electronic image, in which case the modification is applied prior to storage of the electronic image in memory. (See, for example, FIGS. 15–16) The compensation can be a modification of the capture process. In this case, an image processor is not used for the image modification. (See discussion below of FIGS. 13–14) As a matter of convenience, the invention is generally discussed herein in relation to modification of a stored electronic image, but it will be understood that like considerations apply to modification of the image at capture.

The electronic image is calibrated (28) to accommodate differences in input and output properties of the components of the electronic imaging chain and is matched (32) to the characteristics of the photofinishing output 34. The resulting verification image is then shown (36) on the display 20.

The verification image 218, shown on the display 20, is color balanced to the perceived color cast of the reference illuminant relative to the designated illuminant. In other words, the electronic image is modified so as to show what a designated illuminant adapted photographer would perceive on viewing the imaged scene lighted by the particular reference illuminant. The color image shown on the display 20 allows the photographer to distinguish if there is a color cast on the verification image despite continuing ambient illumination from an adaptive, non-designated illuminant.

If the reference illuminant used is a non-designated illuminant, then the electronic image is modified, in actual terms, so as to have a color cast relative to the designated illuminant and also as to the non-designated illuminant used. The resulting color cast is perceivable by the photographer despite visual adaptation to the particular non-designated illuminant. If the reference illuminant used is the designated illuminant, there is no color cast and the verification image is not changed by the color balancing.

The compensation of the verification image can be provided, with great accuracy, for a wide variety of illuminants and combinations of illuminants; however, for ordinary use this is unnecessary. The verification image only needs sufficient accuracy, in hue and intensity, for the photographer to be able to decide whether to take remedial action. A color cast in the verification image can differ from the color cast in the final archival image, but it is preferable that the color casts shown in the verification image approximate the color casts that will be present in the photofinished archival image. It is also preferred that different color casts be shown in the verification image for different non-designated illuminants. It is also highly preferred that each color cast shown in the verification image be assigned to a particular reference illuminant so as to more closely match the color cast produced by that illuminant in the archival image than the color cast produced by a different illuminant. For example, if daylight is a designated illuminant, then it is preferred that the color cast shown in the verification image be orange for a tungsten illuminant and green for a fluorescent illuminant, rather than both the same or green for tungsten and orange for fluorescent.

The extent of the color cast compensation provided in the verification image is minimally enough to allow the photograph to perceive a color cast relative to the photographer's adapted color perception. It is preferred that the photographer see the expected result of photofinishing. Perfect accuracy is not possible, but a good approximation for different lighting conditions can be provided by balancing the color cast the photographer perceives to the archival image actually obtained when the ambient lighting has the correlated color temperature of the particular non-designated illuminant. With a limited number of designated illuminants the values for necessary color changes can be easily determined experimentally using well known color-matching techniques. Alternatively, such values can be obtained from the reverse of white-balance vectors, as later described herein.

The number of different illuminants and combinations of illuminants compensated for depends upon the expected use of the camera 14. If the camera 14 is limited to daylight films (films having daylight as a designated illuminant) and ordinary consumer picture taking, compensation for a small number of illuminants is very acceptable. For most use, illuminants are limited to daylight, tungsten, and fluorescent. Fluorescent lighting is not a constant color temperature, but varies dependent upon the phosphors used in the tube. A number of different mixtures are commonly used and each has a characteristic color temperature, but none of the temperatures approach photographic daylight (correlated color temperature 5500° K). Tungsten lighting also varies similarly.

In some embodiments, a camera 14 is provided with a single value for each of daylight, tungsten, and fluorescent illumination. For example, fluorescent illumination at a correlated color temperature of 4500 degrees Kelvin can be used for all fluorescent lamp illumination, without degrading the ability of the photographer to perceive a fluorescent color cast in the immediate verification image.

Figure 12:
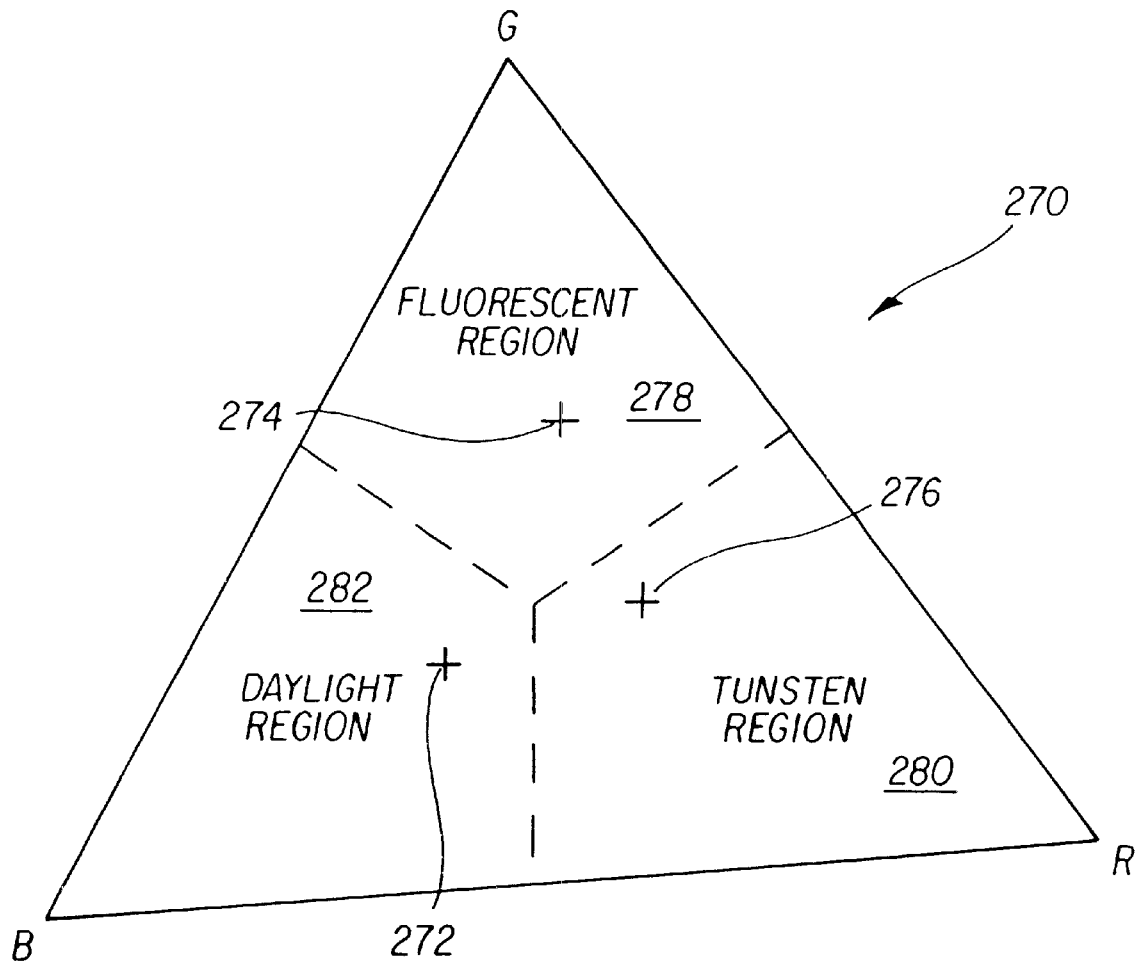
FIG. 12 is a diagram of the look-up table of the camera of FIG. 11 illustrated as an RGB color space diagram.

In a particular example, the camera 14 is used with daylight film and there are two adaptive non-daylight illuminants. A look-up table 270 for this camera 14 is illustrated in FIG. 12 in the form of an RGB color space diagram. In the diagram, relative intensities of red ("R"), green ("G"), and blue ("B") signals are plotted linearly, with each color varying between one hundred percent at the indicated apex and zero at the opposite side. Three points on the diagram 270 indicate a designated illuminant 272 and two non-designated illuminants 274,276. The designated illuminant 272 is daylight at a correlated color temperature of 5500 degrees Kelvin. One non-designated illuminant 274 is defined as fluorescent illumination at a correlated color temperature of 4500 degrees Kelvin. The other non-designated illuminant 276 is defined as tungsten illumination at a correlated color temperature of 2900 degrees Kelvin. The look-up table 270, as shown in the diagram is divided into a fluorescent region 278, a tungsten region 280, and a daylight region 282. All light sources detected as being predominantly fluorescent, that is, having relative RGB values defining a point in the fluorescent region 278, are treated the same, as fluorescent at a correlated color temperature of 4500 degrees Kelvin. All light sources that are predominantly tungsten, that is, having relative RGB values in the tungsten region 280, are treated the same, as tungsten at a correlated color temperature of 2900 degrees Kelvin. The remaining light sources, measured color values that do not provide a match to fluorescent or tungsten and have relative RGB values in the daylight region 282, are treated the same, as daylight at a correlated color temperature of 5500 degrees Kelvin. This embodiment, thus, does not exactly match the verification image to the color cast of the final photofinished image, but is relatively simple and easy to implement and is practical for ordinary use. The verification images produced approximate the color cast of the final image after photofinishing. The photographer knows enough to reasonably decide whether to make a second exposure to remedy the earlier color balance problem.

Fluorescent and tungsten lamps are available at a number of different correlated color temperatures and many types are standardized so as to provide uniform results. The camera 14 and method can be modified from what is described in detail here so as closely match as many different adaptive non-daylight illuminants as desired. For most use, the designated illuminant is daylight at a correlated color temperature of 6500 degrees Kelvin. Alternative designated illuminants can be provided, such as tungsten at a correlated color temperature of 2900 degrees Kelvin, to accommodate other types of film.

Color evaluation is performed by the color detector 172 (indicated by a dashed line in FIG. 13), which has a driver 173 that can be provided in a separate circuit or as a part of the controller 132. The color detector 172 assesses a color value of the ambient illumination. The color detector 172 is used, with a look-up table 270, to categorize or classify the scene illuminant as matching to a color temperature range assigned to one of a set of predefined reference illuminants. The color detector 172 and look-up table 270 together provide an illuminant discriminator 286. The illuminant discriminator 286 provides a "difference adjustment" to the control system 130 of the camera 14, which then modifies the electronic image at some stage of the electronic imaging chain within the camera 14. If the reference illuminant assigned is a non-designated illuminant, then the difference adjustment results in a change in the color balance of the electronic image that imparts a color cast relative to both the designated illuminant and the assigned illuminant. If daylight is the designated illuminant, then the change in the color balance is a color temperature reduction relative to the original electronic image. If the reference illuminant assigned is the designated illuminant for the archival media, then the difference adjustment results in no change in the color balance of the electronic image. The cameras 14 can be set up, in this and other embodiments to not perform processing operations that do not change the image or change the image only slightly. In this case, color balancing can be skipped when the designated illuminant is the reference illuminant. Likewise, color values that are matched to the designated illuminant can be color balanced to the designated illuminant or color matching can be skipped. The latter is preferred, since digital processing is reduced and the verification image remains at the same color balance as the scene image and the photographers adaptation.

There are a number of different ways a color detector 172 can determine the color temperature of a scene illuminant from a digital image of the scene. Different ways are going to reach the same conclusion in some cases, but may come to different conclusions as to the illuminant being used in other cases. The "gray world" approach says that in any given scene, if all of the colors are averaged together, the result will be gray, or devoid of chrominance. Departures from gray indicate a color cast. In a color detector of this type, the color determination can be made by arithmetically averaging together values for all the red, green, and blue pixels and comparing that result to ranges of values in the look-up table 270. The averaged color values for the scene are also sometimes referred to herein as a single "color temperature" of the scene. The dimensioned or dimensionless units chosen for color value are not critical, as long as the same system of units are used throughout the process or appropriate conversions are made as required. For example, the color value can be expressed as a correlated color temperature in degrees Kelvin or as a named illuminant that is characterized by such a color temperature, or as a gain adjustment for each of three color channels.

The gray world theory holds up very well on some scenes, but fails badly on others. An image of a white sandy beach with bright blue sky and ocean, for instance, will not average to gray. Likewise, an indoor scene with blue walls will not average to gray. These kinds of problem scenes can be dealt with by adding to the color determination steps directed to recognition of specific problem conditions. Due to these shortcomings, a color detector 172 that uses the gray world approach is acceptable, but not preferred.

In an alternative "brightest objects" approach, it is assumed that the brightest objects in any scene, i.e., those with the highest luminance, are those most likely to be color neutral objects that reflect the scene illuminant. Pixels from the brightest objects are arithmetically averaged and compared to values in the look-up table 270. The brightest objects may be located by examining pixel values within the scene. A variety of different procedures can be used to determine which pixels to average. For example, the pixels can be a brightest percentage, such as five percent of the total number of pixels; or can be all the pixels that depart from an overall scene brightness by more than some percentage, such as all pixels having a brightness that is more than double the average brightness; or can be some combination, such as double average brightness pixels, but no more than five percent of the total pixels. In a particular embodiment, the pixels are combined into groups (paxels) by a pixel accumulator. An example of a typical paxel is a 36 by 24 block of pixels. The pixel accumulator averages the logarithmically quantized RGB digital values to provide an array of RGB paxel values for respective paxels.

When the above pixel measurements are made, if the pixel values are very high, the electronic imaging unit may be saturated. In this case, the gain of the electronic imaging unit is reduced and the scene is imaged again. The procedure is repeated until the values show a decrease proportional to the reduction in gain. This can be done in a variety of ways. In a particular embodiment having 8 bit pixels, when the brightest pixels have a value of 240, the gain is lowered by two and the scene is again imaged. The same pixels are examined again. If the value has decreased, this indicates that the imager 84 has not saturated and that the pixel data is valid. Once red (R), green (G), and blue (B) paxel values have been obtained and the pixel data has been determined to be valid, ratios of red value to blue value and green value to blue value can be calculated. These ratios correspond to a color value that is compared to the ranges in the look-up table 270.

Figure 13:
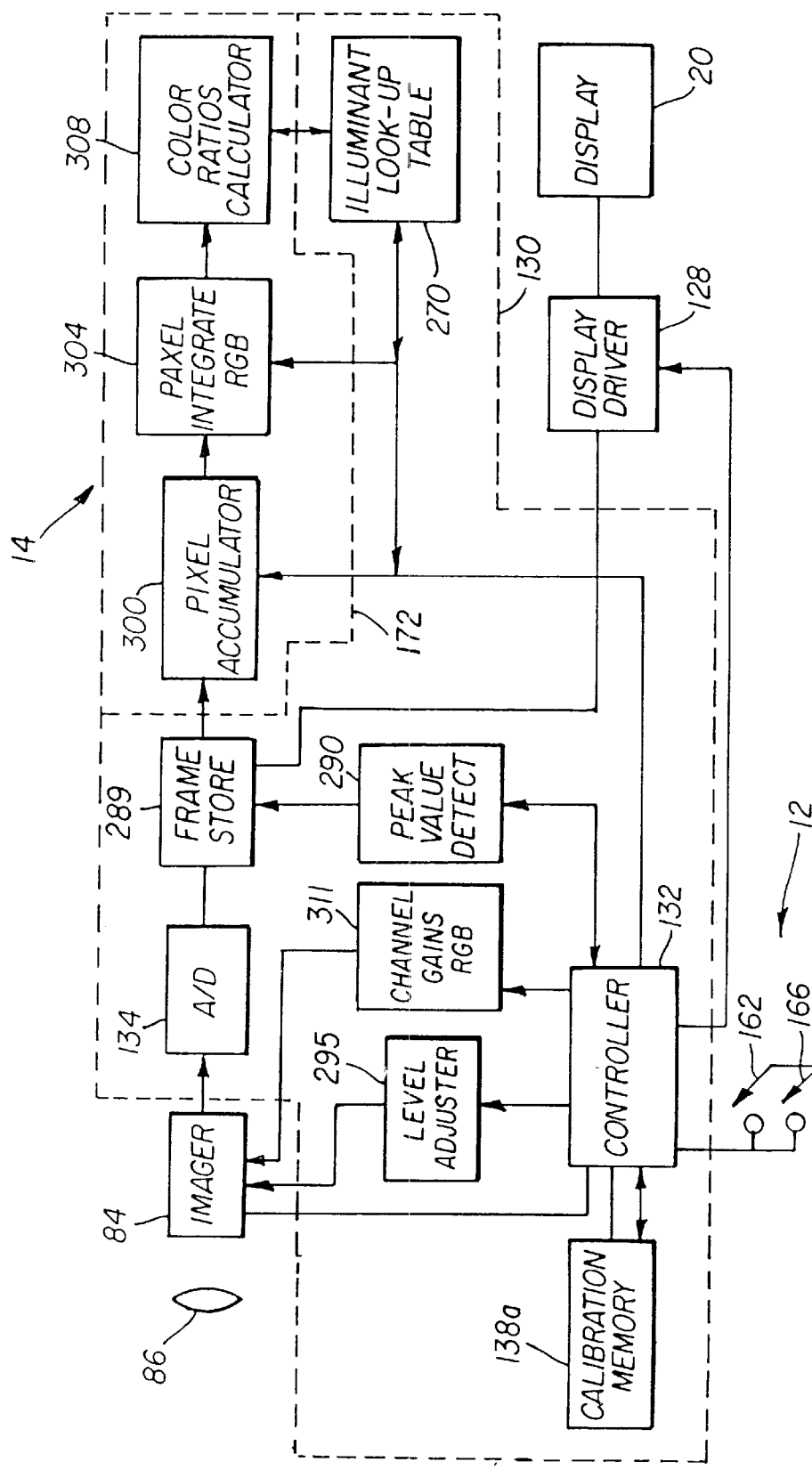
FIG. 13 is a simplified schematic diagram of the camera of FIG. 11.
Figure 14:
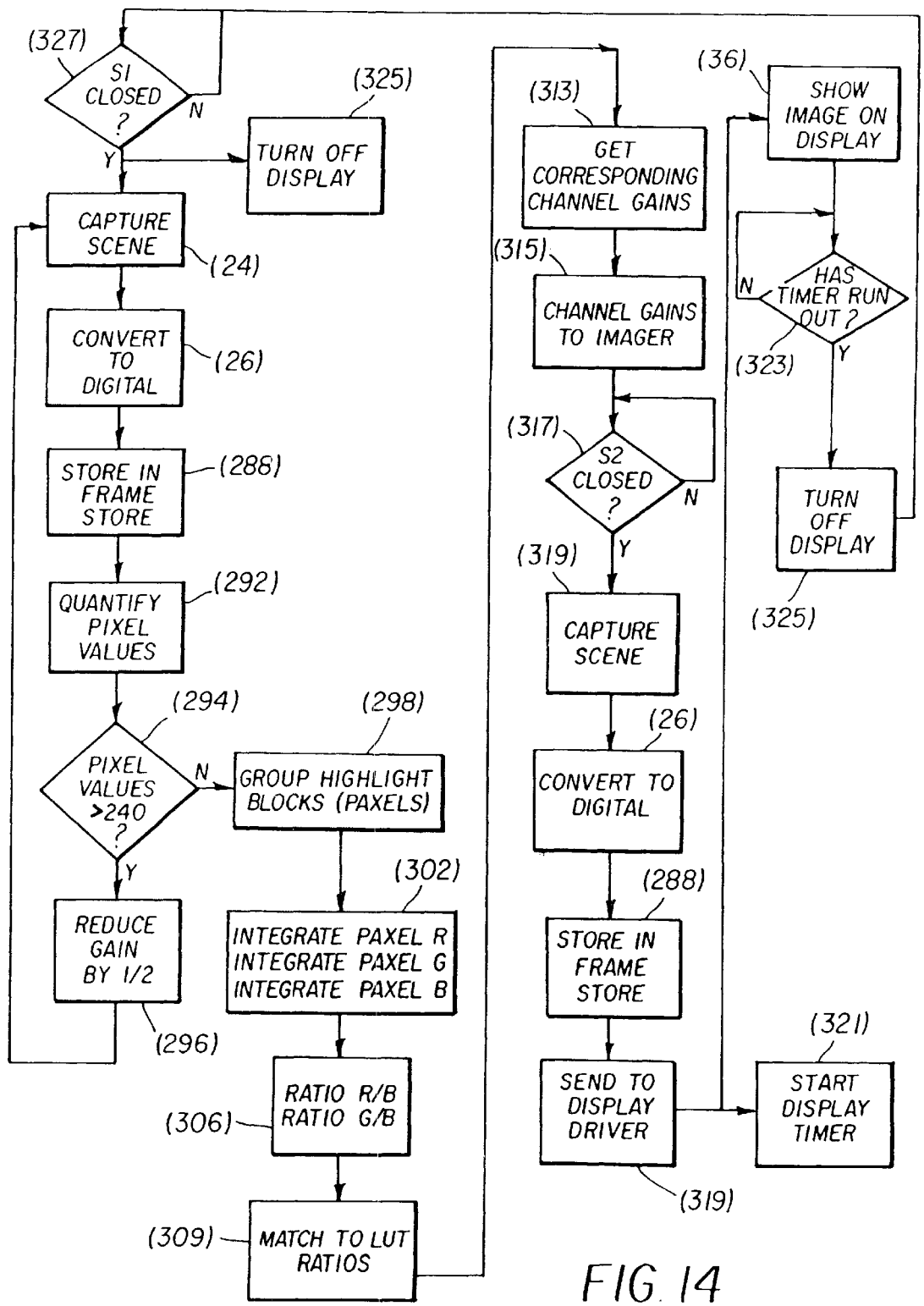
FIG. 14 is a flow chart of the operation of the camera of FIG. 11.
Figure 15:
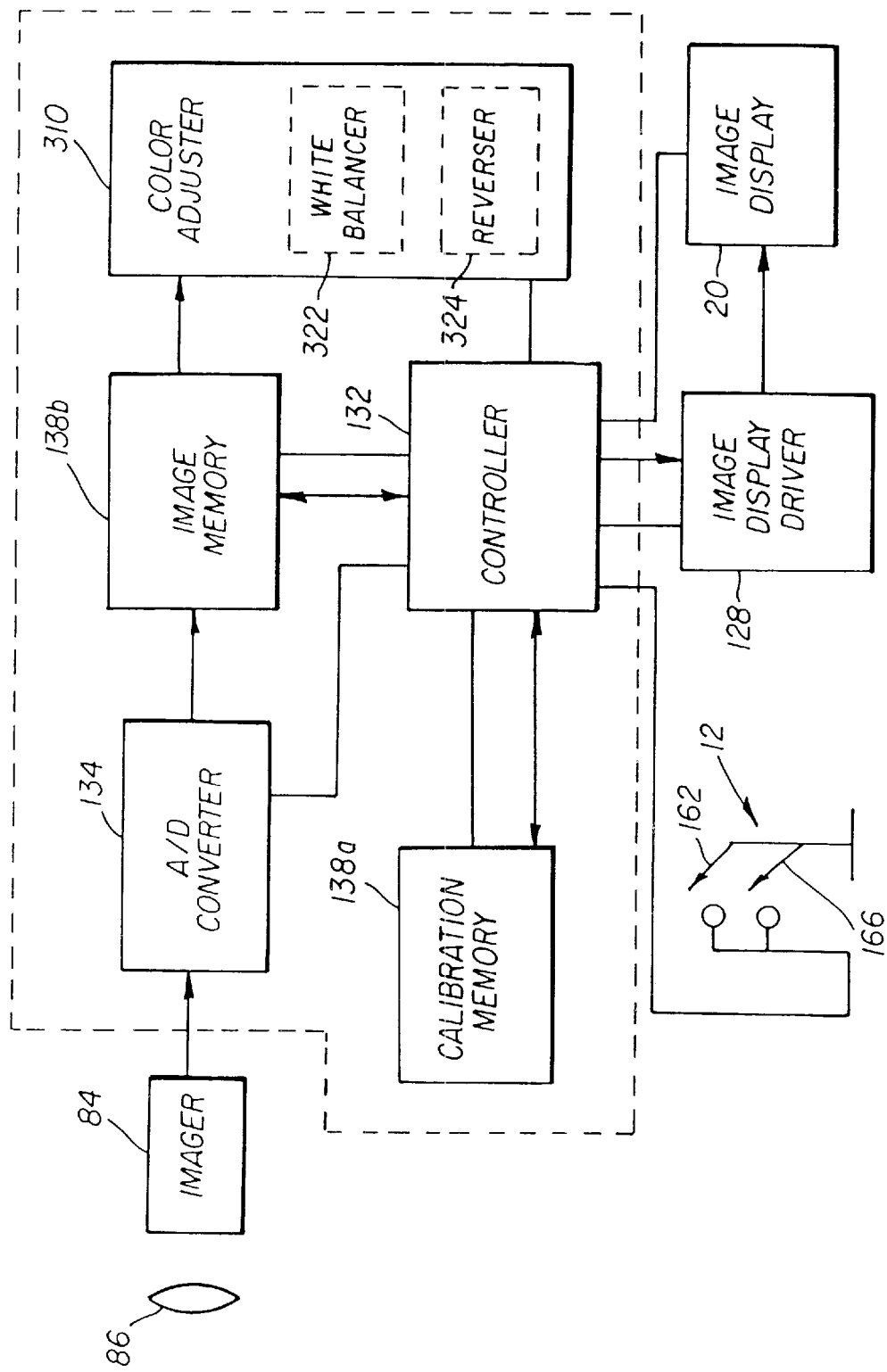
FIG. 15 is a simplified schematic diagram of a modification of the camera of FIG. 11.
Figure 16:
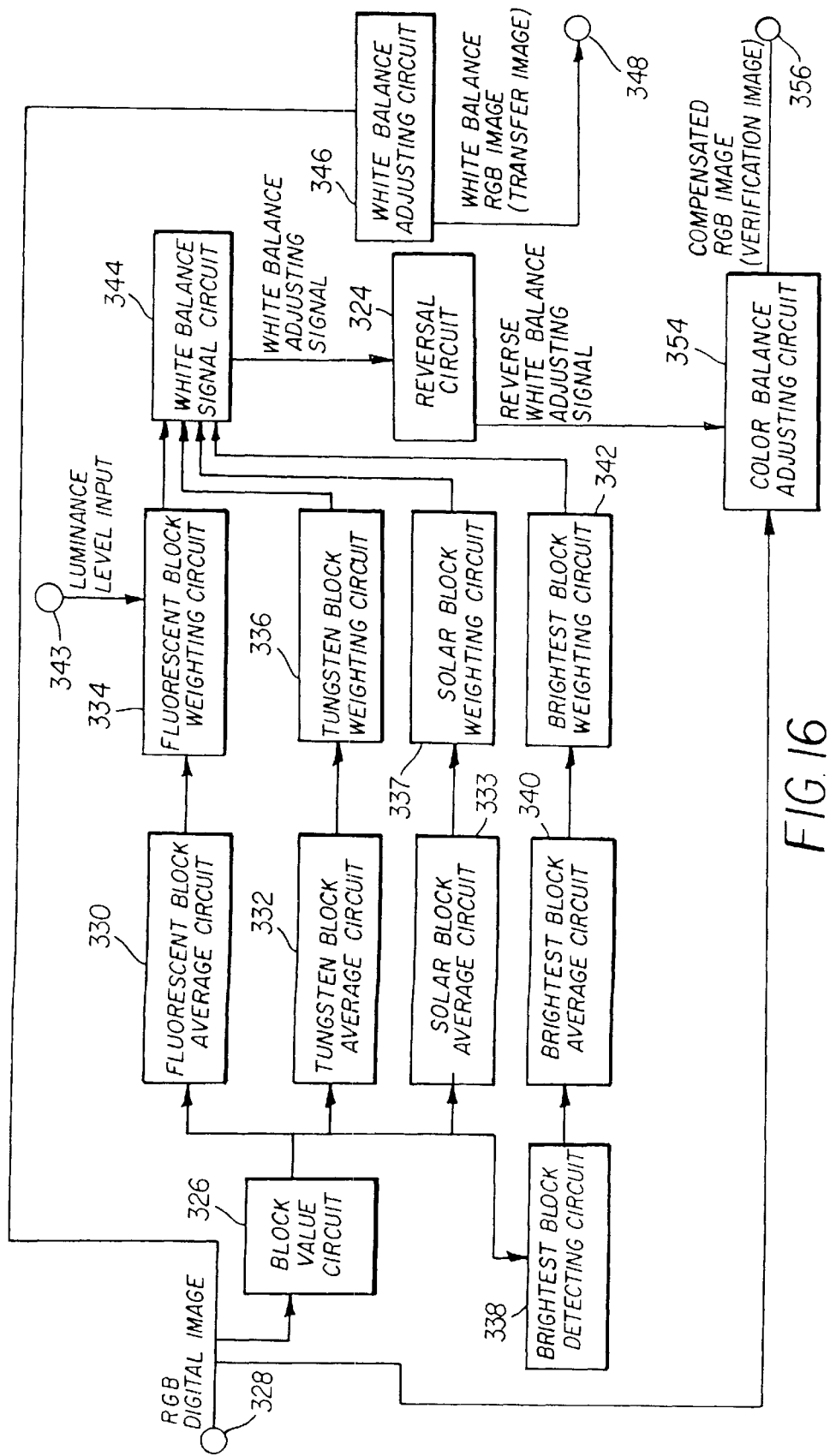
FIG. 16 is a detailed schematic of the color balancing circuit of the camera of FIG. 15.

An example of a suitable "brightest objects" type color detector 172 and its operation, are illustrated in FIGS. 13–14. After an electronic image is captured (24), digitized (26), and stored (288) in a frame store 289, a peak value detector 290 quantifies (292) the pixels and determines (294) highest pixel values. If values exceed a given threshold, for example, 240 in the example given above, a level adjuster 295 adjusts (296) the global "gain" (for example, the sensor exposure time, or alternatively the electronic amplification factor) of the electronic image unit 16 to a value of approximately one-half and the imager 84 captures (24) another image. This image is then converted (26) to digital and stored (288). The pixel data is a again examined (292) by the peak value detector 290. If the peak value detector 290 determines (294) that peak values do not exceed the threshold, they are grouped (298) into highlights (paxels) by the pixel accumulator 300, as above discussed. If the peak values exceed the threshold the gain is again reduced and the process repeated until acceptable data is obtained. The paxels delineated by the pixel accumulator 300 are integrated (302) in red, green, and blue by the integrator 304 to provide integrated average values for red, green, and blue of the highlight areas of the image. These average values are combined (306) by the color ratios calculator 308 so as to calculate ratios of red to blue and green to blue in the ratio circuitry. These ratios provide a color value that is compared (309) to reference ranges in the look-up table 270.

Other "brightest objects" type color detectors 284 are available. For example, another suitable color detector 172 of this type is disclosed in U.S. Pat. No. 5,659,357.

When the color value is fed from the color detector 172 into to the look-up table 270 and compared to values in the table, the look-up table 270 matches the color value to values for a predetermined set of reference illuminants, including the designated illuminant and one or more non-designated illuminants. Scene illuminant values in the look-up table 270 can be experimentally derived for a particular camera model by illuminating a neutral scene with standardized illuminants, recording the camera response, and calculating corrections.

The term "look-up table 270" refers to both a complement of logical memory in one or more computing devices and to necessary equipment and software for controlling and providing access to the logical memory. The look-up table 270 can have a stored set of precalculated final values or can generate values on demand from a stored algorithm or can combine these approaches. For convenience, the look-up table 270 is generally described here in terms of a store of precalculated values for the different scene illuminants. Like considerations apply to the other types of look-up table 270.

The values of the scene illuminants in the look-up table 270 can have a variety of forms, depending upon whether the values are difference adjustments that are used to directly control one or more components of the electronic imaging chain or are inputs to an algorithm that then generates such difference adjustments. In practice, use of one or the other is a matter of convenience and the constraints imposed by computational features of a particular camera 14 design.

For example, scene illuminant values can be obtained from a white balancing circuit used as a color detector 172. The white balance correction can be precalculated for different reference illuminants relative to a designated illuminant and provided in the look-up table as scene illuminant values. The white balance circuit is used, in this case, as a color detector 172 in the same manner as earlier described, to provide color values for comparison to values in the look-up table. The look-up table assigns small white balance corrections to the designated illuminant and matches larger corrections to one of a number of non-designated illuminants.

As above described, in a particular embodiment of the invention the designated illuminant is daylight at a correlated color temperature of 6500 degrees Kelvin, and there are two non-designated illuminants: a fluorescent lamp at a correlated color temperature of 3500 degrees Kelvin and a tungsten lamp at a correlated color temperature of 2900 degrees Kelvin. In this embodiment, the look-up table 270 correlates a range of color temperatures with each of the illuminants. These ranges can be derived by illuminating the verification imaging unit 16 of the camera 14 with a number of different sources for both fluorescent and tungsten (and daylight) and then combining the results for each.

The scene illuminant values are generally described herein as correlated color temperatures of the predetermined scene illuminants. These color temperatures are input into an algorithm that calculates required difference adjustments. This description is intended as an aid in understanding the general features of the invention. Scene illuminant values could be provided in this form, but it is generally more efficient to precalculate so as to relate the scene illuminant values to the required difference adjustments for a particular camera 14 using a particular type of archival media 22. As a step in this direction, the scene illuminant values are also sometimes described herein as color shifts of the scene illuminant correlated color temperature relative to the designated illuminant correlated color temperature. As a further step, the scene illuminant values are also sometimes described herein in relation to specific difference adjustments, such as color channel gains, to one or more components of the electronic imaging chain from the array imager 84 to the display 20.

The difference adjustments provide for a change in the color balance of the verification image that partially or completely overcomes the effect of adaptation of the human visual system to a particular scene illuminant. An attempt can be made to very closely match what the photographer perceives to be the same as the actual color cast that will be produced in a final archival image, but this is unnecessary for ordinary use. This approach is also problematic if the light striking the photographers eyes is different in color temperature than the scene illuminant for the archival image. This can occur, for example, with a camera lens system 86 having a narrow field of view used in lighting from a mixture of scene illuminants. A better approach, for ordinary use, is providing only an approximation of the color cast that will be produced in the archival image after photofinishing.

A currently preferred approach is matching a range of scene illuminants to a small number of reference illuminants in the look-up table 270. One of the reference illuminants can be the designated illuminant and other reference illuminants commonly encountered types of light sources. For ordinary indoor and outdoor use, at least one reference illuminant in the look-up table should have a correlated color temperature of greater than 5000 degrees Kelvin and should have color values for daylight illumination assigned to it and at least one reference illuminant in the look-up table should have a correlated color temperature of less than 5000 degrees Kelvin.

For example, in a particular embodiment, color values corresponding to color temperatures of 3500 to 4500 degrees Kelvin are matched to a CWF fluorescent illuminant at a correlated color temperature of 4500 degrees Kelvin, color values corresponding to color temperatures of less than 3500 degrees Kelvin are matched to a tungsten illuminant at a correlated color temperature of 2900 degrees Kelvin, and color values corresponding to color temperatures of greater than 4500 degrees Kelvin are matched to daylight at a correlated color temperature of 5500 degrees Kelvin.

In the just described approaches, color temperature ranges together map a continuous span of color temperatures. A discontinuous span can be provided instead, with missing ranges assigned to daylight or to a message (presented on the image display 20 or information display 150) that an approximate color balance cannot be shown in the verification image.

It is convenient for daylight balanced archival media 22 that flash illumination generally, or at least illumination from a flash unit 64 of the camera 14, be assigned to daylight by the look-up table 270. This can easily be done by having the camera 14 send a flash-on signal to the look-up table 270 when the flash 64 is used. The flash-on signal overrides the color value signal from the color detector 172 and assigns daylight as the scene illuminant. The reason for this is the close relationship between the correlated color temperatures of daylight and the strobe illumination provided by the flash unit 64. With a different archival capture media, such as tungsten balanced film, this relationship would not hold and the light emitted by the flash would have to be measured or, alternatively, the flash-on signal could again be used to assign daylight as the scene illuminant.

The scene illuminant values are used by a control system 130 including a controller 132 and an image processor 136 to control one or more components of the electronic imaging chain. The scene illuminant values provide difference adjustments for use either directly or indirectly by means of algorithms in the controller 132 or image processor 136 or both. The difference adjustments provide for no change, in the case of an illuminant assigned to daylight or another designated illuminant.

Referring again to FIGS. 14–15, in a particular embodiment, the scene illuminant values are sent from the look-up table 270 to the controller 132 and then to a channel gain adjuster 311 for conversion (313) to RGB channel gains. The channel gains are transmitted (315) to the imager 84. The controller tests (317) if switch S2 166 is closed. When this occurs, verification and archival images of the scene are captured (319). The electronic image is converted (26) to digital form and stored (288) in the frame store 289. The resulting digital image is sent (319) to the display driver and then is shown (36) on the display as the verification image. The display timer is started (321). The controller tests (323) whether the timer has run out and, if so, turns off (325) the display. The controller also tests (327) if the first switch S2 162 is closed, if so, the timer is also turned off (325) and the cycle repeats for the next exposure.

The amount of compensation to be provided, that is, the color shift, for channel gains or in some other form, can be determined in a variety of ways. The simplest is by trial and error using the camera 14 and standardized illuminants. Photofinishing color cast reduction can be taken into account by a second session of trial and error using final archival images produced using the camera 14 and standardized illuminants and the desired photofinishing processes.

If a great degree of accuracy is desired for the compensations, a transform that models human visual adaptation, such as the Von Kries transform, can be used to predict color values. The Von Kries transform converts XYZ tristimulus values for a user adapted to one illuminant to corresponding XYZ tristimulus values for the user adapted to a second illuminant. The Von Kries transform follows for conversion of tristimulus values for a first illuminant a to a second illuminant b.

In the Von Kries transform, by convention:

Y=100 and

X and Z are calculated from x,y chromaticity coordinates
The Von Kries transform states:

$$x+y+z=1 \text{ therefore } z=1-x-y$$

$$X=x(Y/y)=x(100/y)$$

$$Z=z(Y/y)=z(100/y)$$

The von Kries matrix (hereafter "vK") is:

$$\rho = [0.40024\ 0.70760\ -0.08081\,][X]$$

$$\gamma = |-0.22630\ 1.16532\ 0.04570|[Y]$$

$$\beta = \lfloor 0\ 0\ 0.91822\rfloor[Z]$$

The parameters $\rho$, $\gamma$, and $\beta$ are human cone response values. The conversion is $$\begin{bmatrix} X_a \\ Y_a \\ Z_a \end{bmatrix} = [vK]^{-1} \begin{bmatrix} \rho_a/\rho_b & 0 & 0 \\ 0 & \gamma_a/\gamma_b & 0 \\ 0 & 0 & \beta_a/\beta_b \end{bmatrix} [vK] \begin{bmatrix} X_b \\ Y_b \\ Z_b \end{bmatrix}$$

Illustrative Signalling: Reverse White Balance Correction

Referring now to FIGS. 15–20, in another embodiment the camera 14 does not match a color value to a predetermined look-up table value to provide inverse chromatic adaptation compensation. The camera 14 instead determines a color space vector that defines a white balance correction, determines a second color space vector that is in a reverse direction from the white balance correction, and then color balances the electronic image to a neutral point on the reverse color space vector. The change applied in this color balancing is referred to herein as a "reverse white balance correction".) Unless modified by an adjustment (discussed below), the reverse white balance correction is equal in magnitude to the reverse color space vector. The reverse white balance correction can be determined without first determining the white balance correction; but it is currently preferred to first calculate the white balance correction and then to calculate the reverse white balance correction, since this approach allows use of wide variety of known white balancing circuits.

The white balance correction is relative to a neutral point for the archival storage media 22. Thus, the application of the white balance correction to the electronic image, would color balance the electronic image to the correlated color temperature for the designated illuminant for the archival storage media 22, such that a gray subject has the color value of the neutral point (also referred to as "white point") of the designated illuminant on a color space diagram. That gray subject would appear uncolored or white to a viewer visually adapted to the designated illuminant.

Figure 17:
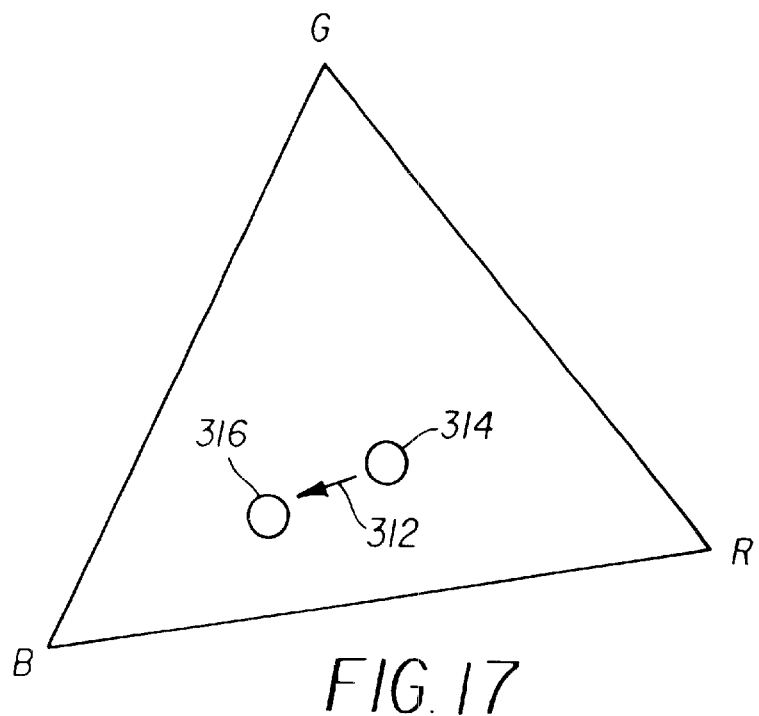
FIG. 17 is an RGB color space diagram illustrating white balancing in the camera of FIG. 15.
Figure 18:
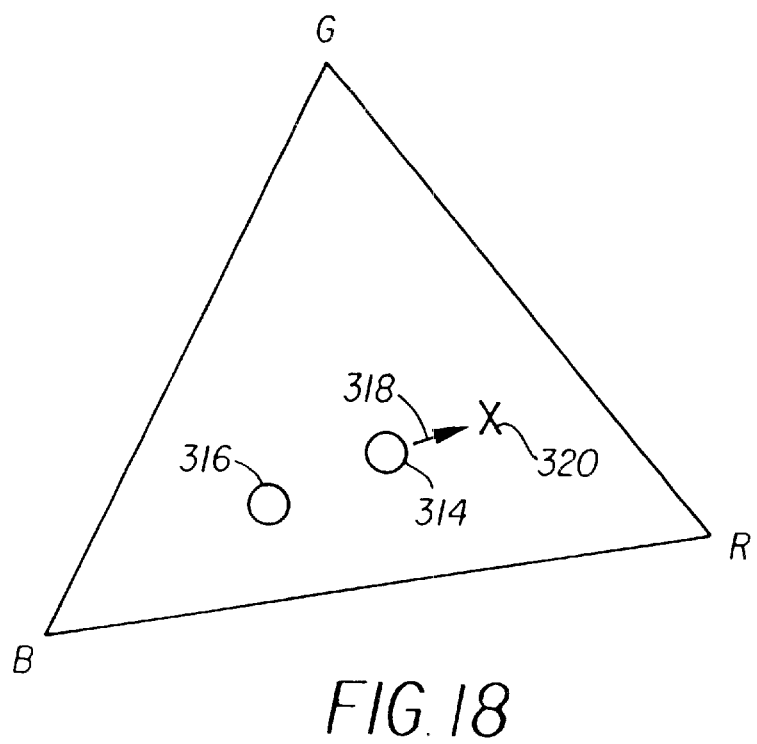
FIG. 18 is an RGB color space diagram illustrating color balancing in the camera of FIG. 15.

FIGS. 15–18 illustrate an example of this approach. A picture is exposed (on daylight balanced film) under tungsten illumination, without the camera 14 flash being used. The electronic imager 84 captures the scene image as an electronic image, which is then digitized by the A/D converter 134. The electronic image is transferred to memory 138b in the form of RGB (red, green, blue) code values. A white balancer accesses the code values and determines a white balance correction to provide a D55 white point. (D55 is a Commission Internationale de l'Eclairage (CIE) standard illuminant representing a type of daylight illumination, commonly known as "photographic daylight". Daylight film is thus balanced for D55 illumination and D55 is a designated illuminant for that film.) FIG. 17 shows, on an RGB color space diagram, what would result if the white balance correction determined by the color adjuster 310 were to be applied to the digital image. A neutral gray object would have R>>B averaged code values before white balancing, but R=G=B averaged code values after the white balance operation, since the B values are multiplied by a factor much greater than the R values. The image neutral point for the object would move, along a color space vector 312, from the tungsten white point 314 (indicated by a circle) to the D55 white point 316 (indicated by a circle). FIG. 18 shows what results when the reverse white balance correction is applied to the digital image. The image neutral point for the object is moved along the reverse color space vector 318, in the opposite direction of the white balance, to a new neutral point 320 (also referred to herein as the "compensation point" 320). In this case, the compensation point is at the terminus of the reverse color space vector 318. The color balancing drives the neutral point for the image, away from the D55 white point and the tungsten neutral point; and, as a result, causes a color cast that is apparent to an adapted viewer under the tungsten ambient illumination.

The camera has a color adjuster 310 that determines a color balance adjustment. In the embodiment shown in FIG. 15, the color adjuster 310 includes a white balance circuit 322 (also referred to as a "white balancer 322") and a reversal circuit 324. The specific white balance circuit 322 used is not critical. A variety of white balance circuits are known to those of skill in the art, and can be used in the camera 14, taking into account computing power, memory requirements, energy usage, size constraints and the like. Many white balance circuits simply adjust the balance of the RGB code values so that an average represents an achromatic color. This approach is not preferred, since the color balancing should be for the scene illuminant, not the overall color balance including the scene content. Preferred white balance circuits assess the color of the scene illuminant.

Figure 19:
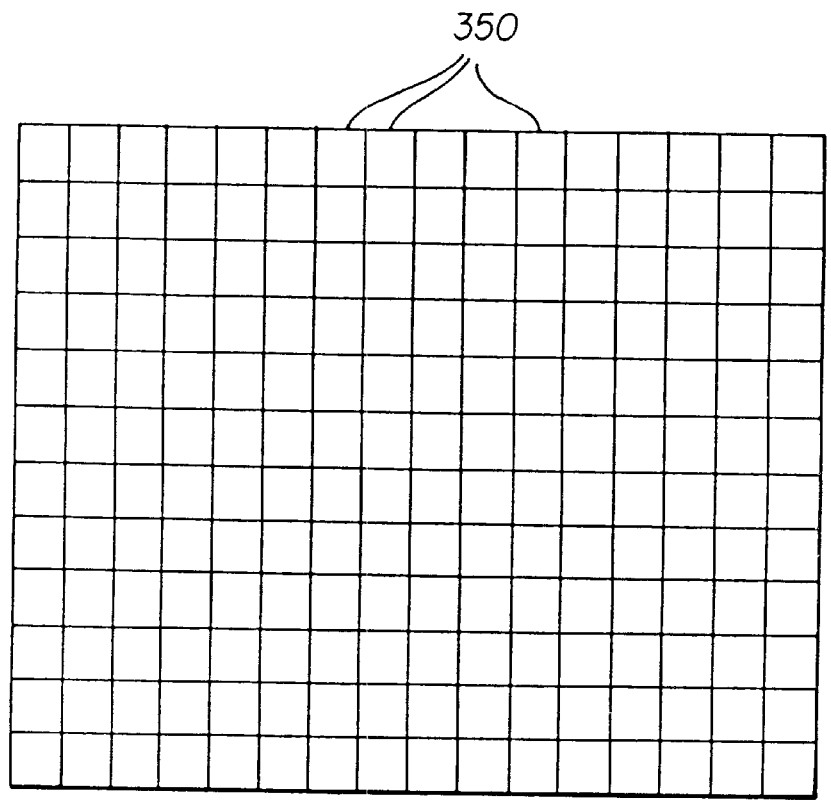
FIG. 19 is a diagram of the division of the electronic image into blocks for the white and color balancing of FIGS. 17–18.
Figure 20:
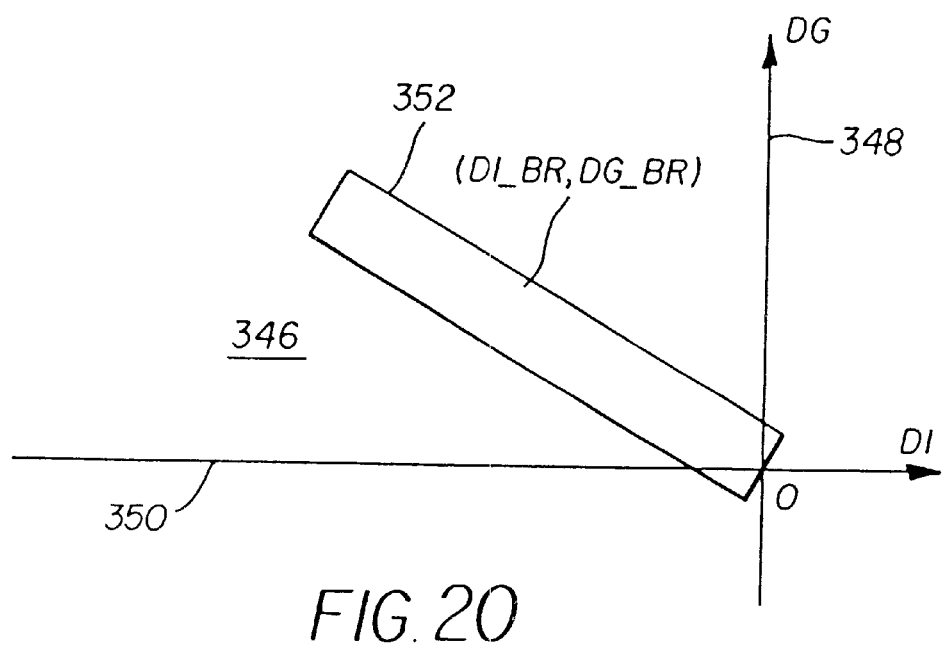
FIG. 20 is a diagram of the brightest block signal area in the DG–DI plane for the color and white balancing of FIGS. 17–18.

An example of a suitable white balance circuit of this type, is disclosed in U.S. Pat. No. 5,659,357. A similar circuit is shown in FIGS. 15–16 and 19–20. This white balance circuit 322 has a block representative value calculating circuit 326, into which an RGB digital image signal is inputted from an image signal input terminal 328. As shown in FIG. 19, the image signal is divided into a plurality of blocks 350 by the block representative value calculating circuit 326, then block representative values of the respective divided blocks are obtained. The blocks have a square shape and are regularly arranged according to a dividing method. The block representative value calculating circuit 326 obtains a value of the image signal included in the respective divided blocks as a block representative value. For example, an average value of the signals from all pixels (R, G, B) in the block is used as the RGB representative value. Alternatively, an average value of the signals from selected pixels within the block (such as, every fourth pixel of every fourth line) or a median or a mode of the image signal of the block, can be used as the representative RGB value.

The block representative values obtained by the block representative value calculating circuit 326 are processed in the fluorescent lamp block average value calculating circuit 330, the tungsten light block average value calculating circuit 332, the daylight light block average value calculating circuit 333, the brightest block searching circuit 338 and the brightest block average value calculating circuit 340 through predetermined procedures, respectively.

In a fluorescent lamp block average value calculating circuit 330, block representative values included in a fluorescent lamp white signal area are selected from among the block representative values obtained by the block representative value calculating circuit 326, and an average value and the number of the selected block representative values are obtained as a fluorescent lamp block average value and the number of fluorescent lamp blocks, respectively. The fluorescent lamp white signal area is defined as an area around which the image signals from white subjects irradiated by a fluorescent lamp are distributed. The fluorescent lamp block average value calculating circuit 330 counts the number of the selected block representative values to obtain the number of blocks the representative values of which are included in the fluorescent lamp white signal area (the number of fluorescent lamp blocks).

A tungsten light block average value calculating circuit 332 selects the block representative values belonging to a tungsten light white signal area from among all the block representative values, and obtains an average value of the selected block representative values (a tungsten light block average value) and the number of the selected blocks (the number of the tungsten light blocks). The tungsten light white signal area is defined as an area around which the image signals from white subjects irradiated by light of a tungsten lamp are distributed.

A daylight light block average value calculating circuit 333 selects the block representative values belonging to a daylight light white signal area from among all the block representative values, and obtains an average value of the selected block representative values (a daylight light block average value) and the number of the selected blocks (the number of the daylight light blocks). The daylight light white signal area is defined as an area around which the image signals from white subjects irradiated by daylight illumination are distributed.

The brightest block searching circuit 338 selects the brightest block of all the blocks in the image signal. The brightest block has the highest luminance of the blocks among which the R, G and B components of the block representative value indicate respective predetermined R, G and B threshold values or more. The brightest block searching circuit 338 outputs the representative value of the brightest block (the brightest block representative value). In a particular embodiment, the brightest block searching circuit 338 chooses the blocks the R, G, B components of which are larger than respective predetermined R, G and B threshold values, and selects a block having the highest luminance out of the chosen blocks as the brightest block in the image signal. The luminance L is defined by $$L=(2*G+R+B)/4$$

or by $$L=(6*G+3*R+B)/10$$

The luminance defined by an equation other than these above equations can be used. The brightest block searching circuit 338 outputs the representative value of the brightest block (the brightest block representative value) obtained by the selection to the brightest block average value calculating circuit 340.

The brightest block average value calculating circuit 340 obtains a brightest block signal area based on the brightest block representative values inputted from the brightest block searching circuit 338. An area around which the brightest block representative values of a predetermined color are distributed is defined as the brightest block signal area. A method for obtaining the brightest block signal area is described by reference to FIG. 20. An inputted brightest block representative value is plotted in the DG-DI plane 346. The values of DG 348 and DI 350 axes are defined by $$DG=(2*G-R-B)/4 \quad \text{equation (a)}$$

$$DI=(B-R)/2 \quad \text{equation (b)}$$

The values (DI-BR, DG-BR) in the DG-DI plane 346 are calculated from the values of the R, G, and B components of the brightest block representative value by the equations (a) and (b). The line segment linking the origin and the point (DI-BR, DG-BR) is set in the DG-DI plane 346. A rectangular area 352 including the line segment and having sides parallel to the line segment is defined as the brightest block signal area (FIG. 5). In this example, the length of the sides parallel to the line segment linking the origin and the point (DI-BR, DG-BR) is predetermined times as long as that of the line segment and the length of the sides perpendicular to the line segment is predetermined. Both lengths can be determined by trial and error.

The brightest block average value calculating circuit 340 selects the block representative values included in the brightest block signal area from among the block representative values inputted from the block representative value calculating circuit 326, and obtains an average value of the selected block representative values (a brightest block average value) and the number of the selected blocks (the number of the brightest blocks).

A fluorescent lamp block weighting circuit 334 calculates a fluorescent lamp block weighting factor based on inputted data from the fluorescent block averaging circuit 330. The fluorescent lamp block weighing circuit 334 multiplies the fluorescent lamp block average value and the number of the fluorescent lamp blocks by the fluorescent lamp block weighting factor to obtain a weighted fluorescent lamp block average value and a weighted number of the fluorescent lamp blocks. A subject luminance is inputted from a subject luminance input terminal 343 to the fluorescent lamp block weighting circuit 334 when the fluorescent lamp block average value and the number of the fluorescent lamp blocks are inputted to the fluorescent lamp block weighting circuit 334 from the fluorescent lamp block average value calculating circuit 330.

The fluorescent lamp block weighting circuit 334 calculates a fluorescent lamp block weighting factor based on the inputted data through a predetermined procedure. A example of a method for calculating this weighting factor is described below, where the subject luminance is denoted as BV, the fluorescent lamp block average value as (R F, G F, B F) and a saturation of the fluorescent lamp block average value as S F. The saturation S is defined by $$S=(DG*DG+DI*DI) \quad \text{equation (c)}$$

The DI and DG values for the fluorescent lamp block average value (R F, G F, B F) is obtained by the equations (a) and (b). The S F can be obtained by applying the above obtained DI and DG values to the equation (c).

According to this weighting factor determining method, a smaller fluorescent lamp block weighting factor W F is set up when the subject luminance is higher in order to prevent the color failure arising out of a white subject irradiated by a fluorescent lamp and green grass in sun light. A high subject luminance indicates a bright subject, suggesting that the subject is in sunlight rather than irradiated by a fluorescent lamp. The image signals derived from green grass in sunlight are possibly included in the fluorescent lamp white signal area rather than those from a white subject irradiated by a fluorescent lamp. When the subject luminance is high, the effect of the white balance adjusting for the subject irradiated by a fluorescent lamp is required to be diminished by decreasing the fluorescent lamp block weighting factor, which weights the fluorescent lamp block average value, to a small value near zero. The fluorescent lamp block weighting factor can be determined using predetermined threshold values of BV0, BV1, BV2 and BV3 by the following rule:

(1) If $BV<BV0$, then $WF=1.0$
(2) If $BV0 \leq BV<BV1$, then $WF=0.75$
(3) If $BV1 \leq BV<BV2$, then $WF=0.5$
(4) If $BV2 \leq BV<BV3$, then $WF=0.25$
(5) If $BV3 \leq BV$, then $WF=0.0$ where $BV0<BV1<BV2<BV3$.

In the above rule, the W F is determined only based on the subject luminance BV. The essence of this determining method is to set the fluorescent lamp block weighting factor W F at a small value when the subject luminance BV is high, and to set at 1, irrespective of values of the subject luminance when the saturation is sufficiently small. In addition, the fluorescent lamp block weighting factor can be set at a small value, irrespective of values of the BV when the saturation S F is very large. Instead of the above rule, the S F can be obtained using a specific function f (R F, G F, B F) of the variable fluorescent lamp block average value and subject luminance BV.

The fluorescent lamp block weighting factor W F obtained by this method enables the following: When the subject luminance BV is low, which suggests that the subject is possibly irradiated by a fluorescent lamp, the white balance adjusting removes the effect of the illumination with a fluorescent lamp. When the subject luminance BV is high, which suggests that the subject is possibly green grass in the daylight light, the white balance adjusting relating to light of a fluorescent lamp is diminished.

The fluorescent lamp block weighting circuit 334 multiplies the fluorescent lamp block average value and the number of the fluorescent lamp blocks by the fluorescent lamp block weighting factor determined.

A tungsten light block weighting circuit 336 calculates a tungsten light weighting factor based on the tungsten light block average value inputted from the tungsten light block average value calculating circuit 332 through a predetermined procedure, and multiplies the tungsten light block average value and the number of the tungsten light blocks by the tungsten light weighting factor to obtain a weighted tungsten light block average value and a weighted number of the tungsten light blocks.

A daylight light block weighting circuit 337 calculates a daylight light weighting factor based on the daylight light block average value inputted from the daylight light block average value calculating circuit 333 through a predetermined procedure, and multiplies the daylight light block average value and the number of the daylight light blocks by the daylight light weighting factor to obtain a weighted daylight/tungsten light block average value and a weighted number of the daylight light blocks.

The brightest block average value and the number of the brightest blocks are inputted to a brightest block weighting circuit 342 from the brightest block average value calculating circuit 340. The brightest block weighting circuit 342 obtains a brightest block weighting factor based on the brightest block average value, and multiplies the brightest block average value and the number of the brightest blocks by the brightest block weighting factor to obtain a weighted brightest block average value and a weighted number of the brightest blocks.

The above explained circuits of the block average value calculating circuits 330, 332, 333 and the block weighting circuits 334, 336, 337 can be used for white balance adjusting; but it is preferred that the balancing also take into account brightest blocks by including the brightest block searching circuit 338, brightest block average value calculating circuit 340, and brightest block weighting circuit 342.

Daylight and tungsten light block average values are inputted to the daylight and tungsten light block weighting circuits 336, 337, respectively. The daylight and tungsten light block weighting circuits 336, 337 determine daylight and tungsten light block weighting factors, respectively, based on the inputted data through predetermined procedures. For example, the daylight or tungsten light block average value can be denoted as (R D, G D, B D), and a saturation of the daylight or tungsten light block average value as S D. The saturation S D is obtained by the equation (c), as the aforementioned S F. According to this determining method, the daylight or tungsten light block weighting factor W D is set at a small value when the S D is large.

Another method for determining the daylight and tungsten light block weighting factor W D can be adopted, rather than the above rule. For instance, W D can be obtained using a specific function f (R D, G D, B D) of the variable daylight or tungsten light block average value (R D, G D, B D) instead of the above rule using the S D. The daylight and tungsten light block weighting factors obtained according to this method prevents excessive adjustment of white balance when the human eye cannot be thoroughly adapted to the circumstances as in a sunset.

The tungsten light block weighting circuits 336 multiplies the tungsten light block average value and the number of the tungsten light blocks by the tungsten light block weighting factor determined and the daylight light block weighting circuits 337 multiplies the daylight light block average value and the number of the daylight light blocks by the daylight light block weighting factor determined.

A brightest block average value and the number of the brightest blocks are inputted to the brightest block weighting circuit 342 from the brightest block average value calculating circuit 340. The brightest block weighting circuit 342 obtains a brightest block weighting factor based on the inputted data through a predetermined procedure.

For example, the brightest block average value is denoted as (R B, G B, B B), and a saturation of the brightest block average value as S B. The saturation S B is obtained by the equation (c), as the S F. This method for determining the brightest block weighting factor W B is determined by the following rule using predetermined threshold values of S0 B, S1 B:

(1) If $S\ B<S0\ B$, then $WB=1.0$
(2) IF $S0\ B \leq S\ B$ and $(B\ B \geq R\ B$ or $2*G\ B-R\ B-B\ B \leq 0)$, then $WB=0.0$
(3) If $S0\ B<S\ B \leq S1B$ and $(B\ B<R\ B$ and $2*G\ B-R\ B-B\ B>0)$, then $WB=1.0$
(4) IF $S1\ B<S\ B$ and $(B\ B<R\ B$ and $2*G\ B-R\ B-B\ B>0)$, then $WB=0.75$ where $S0\ B<S1\ B$.

In this rule, the brightest block weighting factor W B is set at zero when $B\ B \geq R\ B$ or $2*G\ B-R\ B-B\ B \leq 0$. The brightest block representative value satisfying the described conditions suggests that the image is possibly derived from the blue sky. Under these conditions, the white balance adjusting using a brightest block weighting factor of unity, which strongly reflects on the state of the brightest block, easily causes the color failure. The above described is an example of the methods for determining the brightest block weighting factor. The brightest block weighting factor can be appropriately determined depending on the conditions of use, such as what light sources are mainly used, what subjects are mainly imaged.

The brightest block weighting circuit 342 multiplies the brightest block average value and the number of the brightest blocks by the weighting factor determined A white balance adjusting signal calculating circuit 344 calculates a white balance adjusting signal based on the weighted values obtained by the fluorescent lamp block weighting circuit 334, the tungsten light block weighting circuit 336, the daylight light block weighting circuit 337, and the brightest block weighting circuit 342. The white balance adjusting signal calculating circuit 344 combines the weighted block average values proportionally to the ratio of the weighted numbers of the fluorescent lamp, daylight, and tungsten light and brightest blocks, and obtains the white balance adjusting signal based on the combined value. In this operation, a ratio of contribution of the fluorescent lamp, daylight, tungsten, and brightest blocks to the white balance adjusting signal (a ratio of combination) is first obtained by $$M\ F = W\ F*CNT\ F/(W\ F*CNT\ F + W\ D*CNT\ D + W\ B*CNT\ B) \quad \text{equation (d)}$$

$$M\ D = W\ F*CNT\ D/(W\ F*CNT\ F + W\ D*CNT\ D + W\ B*CNT\ B) \quad \text{equation (e)}$$

$$M\ B = W\ F*CNT\ B/(W\ F*CNT\ F + W\ D*CNT\ D + W\ B*CNT\ B) \quad \text{equation(f)}$$

where M F, M D and M B are ratios of combination of the fluorescent lamp blocks, the daylight/tungsten light blocks and the brightest blocks, respectively. CNT F, CNT D and CNT B are the numbers of the fluorescent lamp blocks, the daylight/tungsten light blocks and the brightest blocks, respectively. The W*CNT in each above equation is a weighted number of the blocks. The ratio of combination is a ratio of the weighted number of the blocks of a light source (one out of the fluorescent lamp, the daylight/tungsten light and the brightest light) to the number of all blocks.

A mixed signal (Rmix, Gmix, Bmix) is obtained based on the ratios of combination for the respective light sources by $$Rmix = M\ F*R\ F + M\ D*R\ D + M\ B*R\ B \quad \text{equation (g)}$$

$$Gmix = M\ F*G\ F + M\ D*G\ D + M\ B*G\ B \quad \text{equation (g)}$$

$$Bmix = M\ F*B\ F + M\ D*B\ D + M\ B*B\ B \quad \text{equation (g)}$$

The white balance adjusting signals of Radj and Badj are obtained based on the three components of the mixed signal by $$Radj = Gmix - Rmix$$

$$Badj = Gmix - Bmix$$

Instead of using the above mentioned Radj and Badj, MAX-Ranix, MAX-Gmix and MAX-Bmix can be used as the white balance adjusting signals after obtaining MAX=max (Rmix, Gmix, Bmix). The operator max (a, b, . . . ) means selecting a maximum value out of all values in the parentheses.

In this embodiment, the white balance adjusting can be influenced by the image signal information of the brightest block. Consequently, the white balance adjusting signal (and reverse white balance adjusting signal) can be appropriately determined for an image derived from a subject irradiated by a light source other than predetermined ones.

Referring again to FIG. 16, the calculation of the white balance adjusting signal is sent to reversal circuit 324, which calculates the reverse vector of the white balance adjusting signal using the following equations:

$$Radj(rev) = 1/Radj$$

$$Badj(rev) = 1/Badj$$

to provide the reverse white balance adjusting signal, that is, the reverse white balance correction.

The reverse white balance adjusting signal is sent to a color balance adjusting circuit 354 (also referred to as a color balance adjuster 354), which adjusts the color balance for an inputted image signal using the reverse white balance adjusting signal. The color balance adjuster 354 adds the color balance adjusting signals to the R and B components of all image pixels, respectively in order to adjust the color balance to provide a compensated image, that is a verification image that presents a compensated color cast. The color balance adjusting circuit 354 then outputs a compensated image, that is, the verification image, through a compensated signal output terminal 356.

As is the case in the other embodiments described, a photofinishing color cast correction or other adjustment can be added to this color adjusting procedure as a separate step or in combination with other modification of the electronic image. Such modifications can be accommodated by assigning a standard adjustment to all of the determinations or use of an appropriate look-up table for different adjustments. Such a look-up table can use input as to film type, color value, and the like to provide different photofinishing color cast reductions or other adjustments. Input can be manual or can use a film sensor or a combination of the two. It is highly preferred that any adjustment change the magnitude of the reverse white balance correction, but retain the compensation point on the reverse color space vector. This precludes shifts in hue that might confuse a user as to the source of a perceived color cast and also reflects actual photofinishing practice. For example, some photofinishing processes provide an eighty percent reduction in color cast, but no change in hue of the remaining color cast, in photofinished images from color negative film. This can be accommodated, in the camera, by calculating an eighty percent reduction in the magnitude of the reverse white balance correction and applying this modification, whenever color negative film is used in the camera, or at all times.

In the embodiment shown, an optional auto white balance adjusting circuit 346 adjusts the white balance for an inputted image signal using the white balance adjusting signal. The resulting white balance adjusted RGB image, that is, the transfer image, is outputted from a white balanced image signal output terminal 348.

The auto white balance adjusting circuit 346 applies the white balance adjusting signals to the R and B components of all image pixels, respectively in order to adjust the white balance and thus provide a transfer image for later electronic transfer. This copy can be displayed, if desired, and can be modified in the manner of other digital images used for electronic mail and other electronic transfer. For example, the electronic image can be stored as a compressed file in a particular format, such as an Exif/JPEG image file. If desired, the white balance correction parameters may be stored with the share image to allow reconversion to the non-balanced image.

Non-Illustrative Signalling

Referring now to FIGS. 22–27, 29, and 31, in particular embodiments, the camera 14 presents an indirect indication 360 that the archival image will have a color cast. In these embodiments, the camera 14 displays an electronic verification image that has a color balance that perceptibly matches the original scene or has a color balance that is independent of the original scene. The presence of a color cast in the photofinished archival image is shown by an indication 360 that is independent of the color balance of the verification image.

Figure 22:
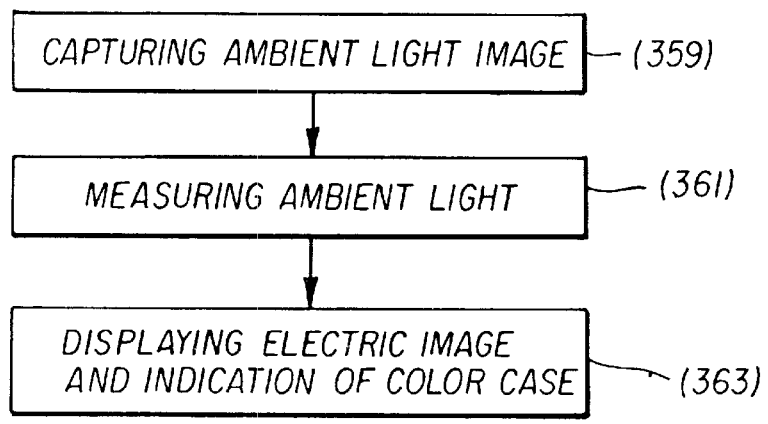
FIG. 22 is a diagram of an embodiment of the method of image capture.
Figure 23:
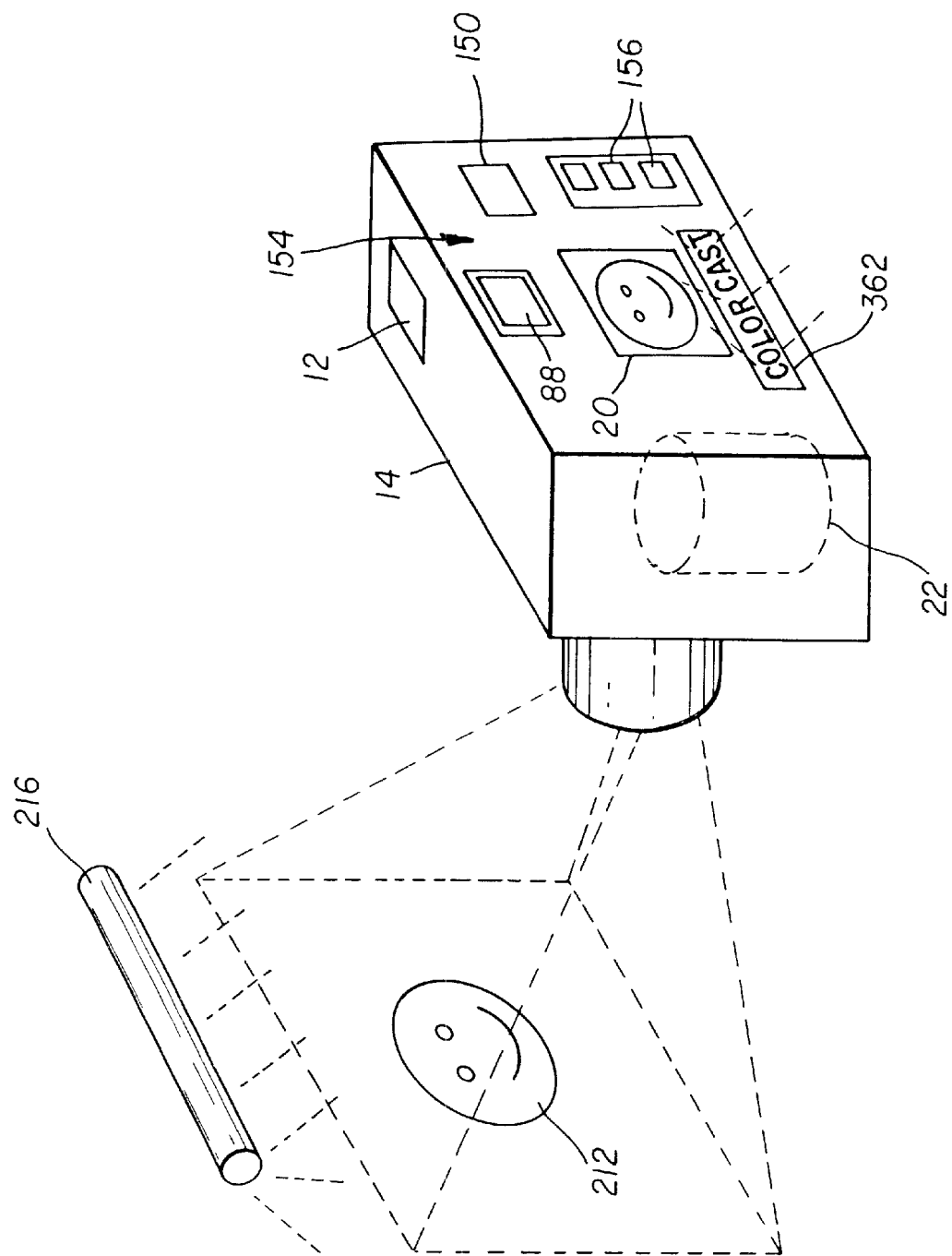
FIG. 23 is a semi-diagrammatical perspective view of another embodiment of the camera capturing a scene image illuminated by fluorescent lighting.

Referring to FIGS. 22–23, a camera 14 captures (350) a scene image that is illuminated by fluorescent lighting, which is a non-designated illuminant for the archival image capture media 22 (indicated by a dashed line in FIG. 23). The scene image is captured on the archival media 22 and as an electronic image that is processed as earlier described and shown on the display 20 as a verification image. The verification image has a color value that is unchanged relative to the detected color cast or has a color value that has been changed by white balancing. (The archival image is not subject to the white balancing.) A photographer adapted to ambient light having a color cast will not be able to perceive, in the verification image, the actual color cast that will appear in the archival image. The color cast due to the lighting is detected (361) by any of the above-described methods and an indication 360 of the presence of a color cast in the archival image after photofinishing is presented (363) along with the verification image.

In a preferred embodiment, the color detector averages red, green, and blue (RGB) signals from the electronic imager, and compares the intensities of the signals to determine a predominant color: red, green, blue, or white/neutral in a combination of the RGB signals. The user interface responsively provides an indication that signals the user as to that predominant color, unless the predominant color is below a cut-off, in which case a white/neutral color is signalled to the user. A currently preferred cut-off is 60 percent of a total intensity of the combined RGB signals. The white/neutral balance can be communicated by the lack of a "red", "green", or "blue" signal. This approach has the advantage of being simple and will signal a color cast in a scene due to ambient light and an large amount of one color in scene content. This approach can be modified to provide comparisons among the red, green, and blue signals, and different ratios of those signals to allow determinations of predominant colors other than red, green, and blue.

The indication 360 can be presented on a separate indication display 362 or can be superimposed (photomontaged) into the verification image presented on the image display 20. In either case, the indication 360 can be an undifferentiated patch of color at a wavelength at least approximately corresponding to the color value of the ambient illumination, or an alphanumeric message or a non-alphanumeric indicia. Algorithms for presenting indicia on a display 20 or for photomontaging the indication 360 into an image are well known to those of skill in the art. For example, a very simple algorithm replaces pixels of the verification image with pixels of the indication 360 (see FIG. 23).

Figure 24:
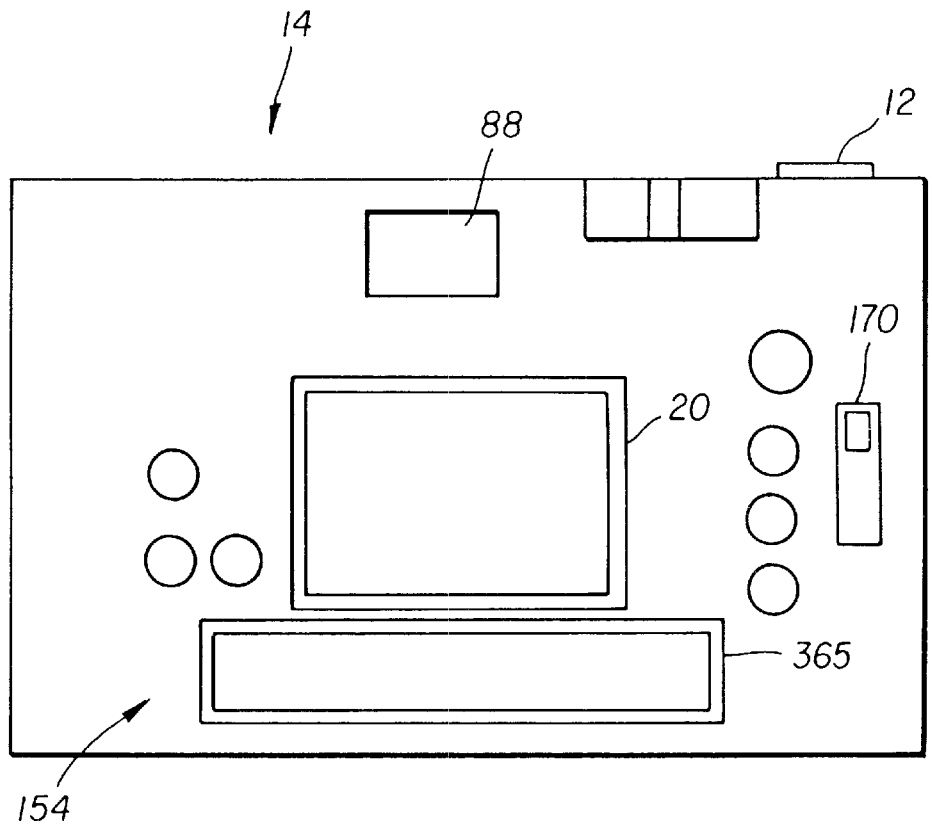
FIG. 24 is a rear view of another embodiment of the camera.
Figure 25:
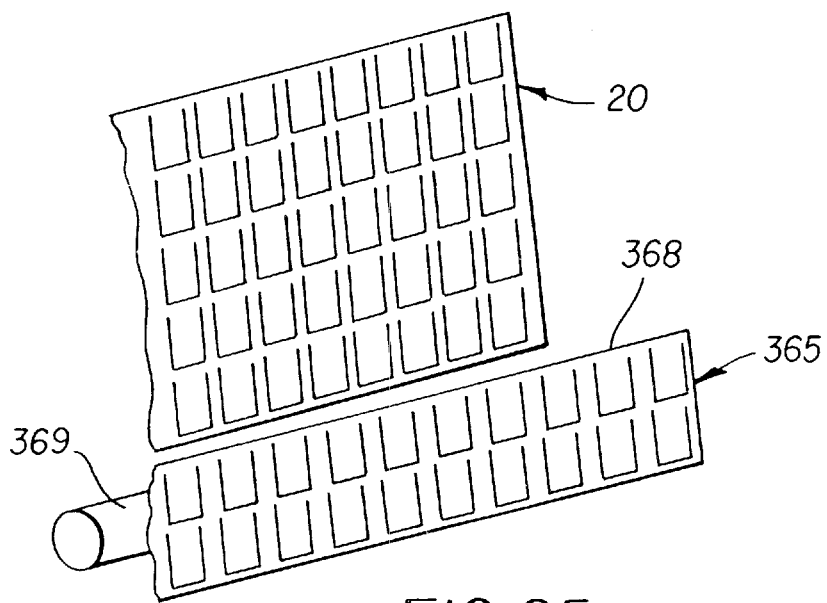
FIG. 25 is a perspective view of the image display and combined indication and information display of the camera of FIG. 24.
Figure 29:
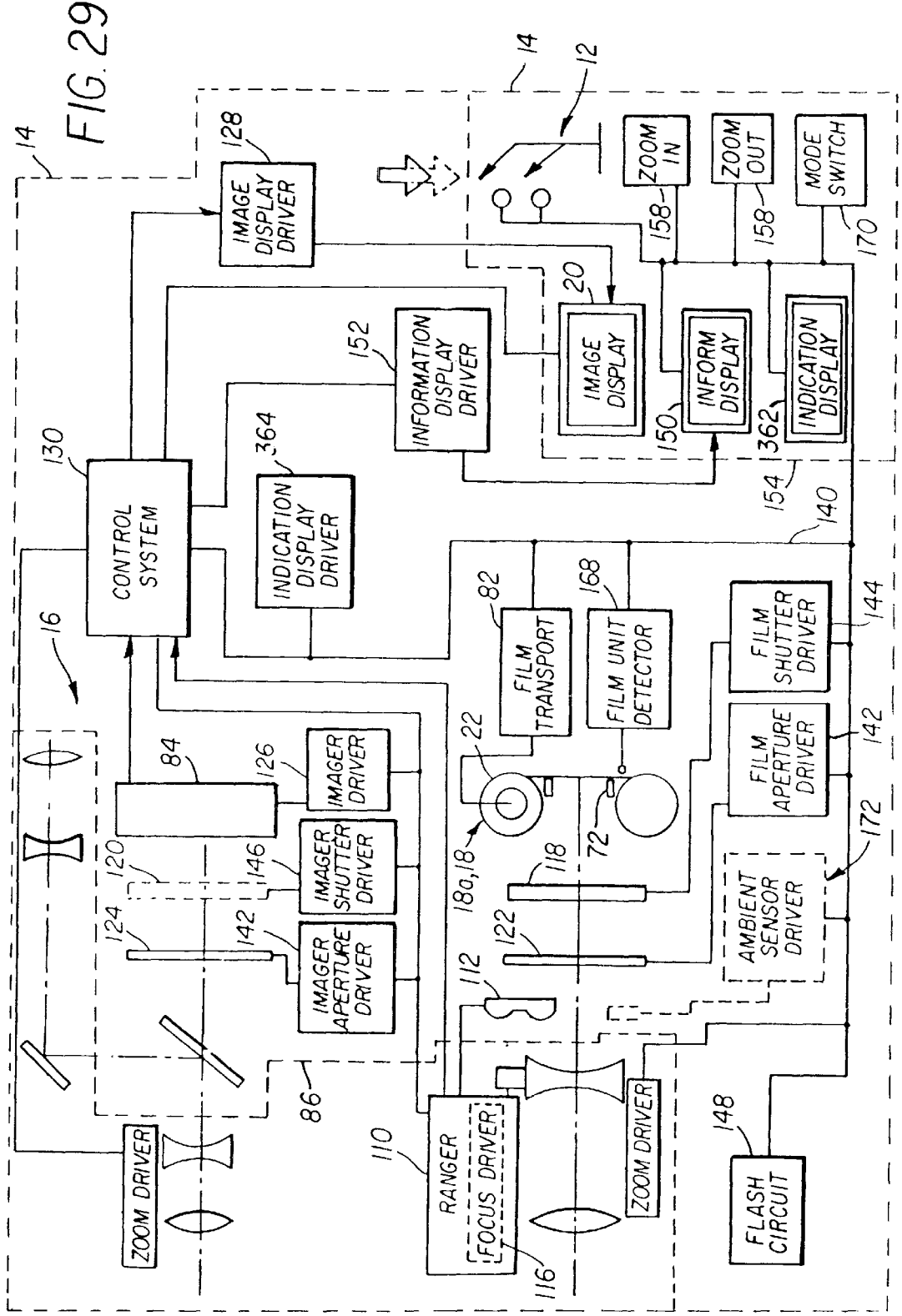
FIG. 29 is a partial enlargement of the camera diagram of FIG. 3 modified to include an indication display and an indication display driver.

FIG. 29 illustrates a partial enlargement of the camera diagram of FIG. 3 modified to include an indication display 362 and an indication display driver 364, which is connected by a signal line 366 to the controller 132. FIG. 23 shows the outside of the same camera 14 and illustrates a separate indication display 362 bearing the words "COLOR CAST" and having dashed lines radiating outward. These words and the dashed lines are alternative representations of an alphanumeric indication 360 and a color patch indication 360, respectively. The relative locations of the image display 20, information display 150, and indication display 362 can be varied to meet spatial and esthetic needs of particular camera designs. The shape and size of the indication display 362 can be varied. In the embodiment shown in FIG. 26, the indication display 362 surrounds the image display 20 and shows a color patch indicating the color cast expected in the archival image. The indication display 362 can use the same kinds of components as the image display 20. The selection of components for the indication display 362 is not critical. For example, FIGS. 24–25 illustrate a camera 14 having an OLED or other self-emissive display 20 for the image display 20 and a second information and indication display 365 using an LCD 368 backlighted by a lamp 369.

Figure 26:
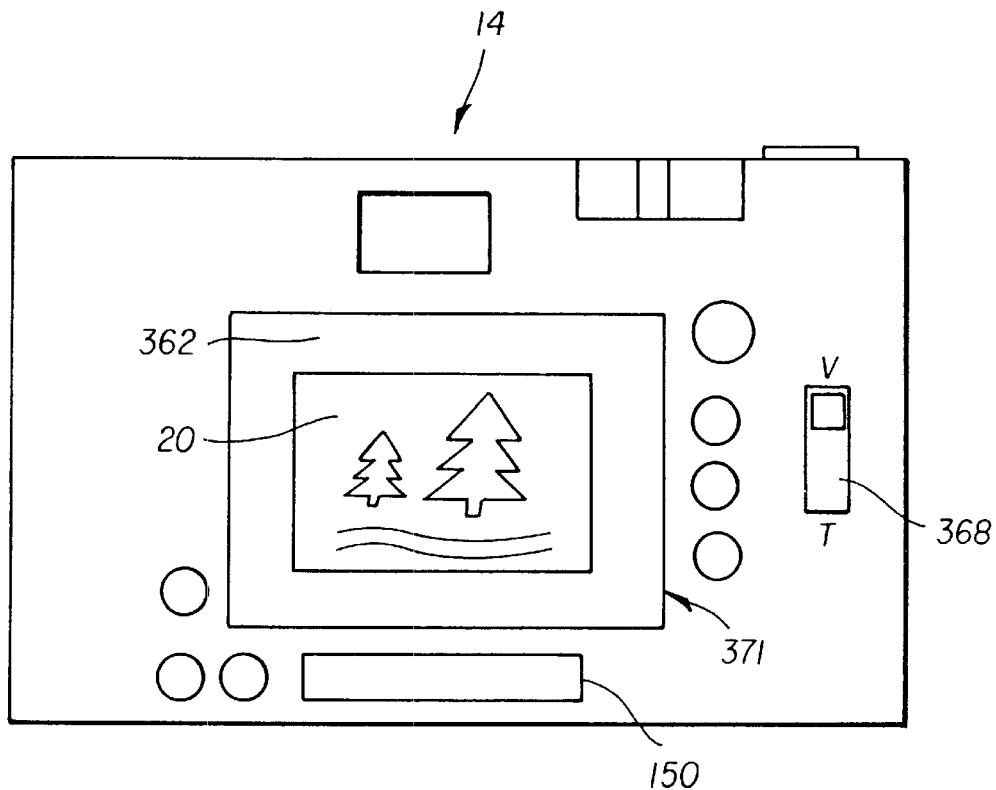
FIG. 26 is a rear view of still another embodiment of the camera showing the verification image and indication display.
Figure 27:
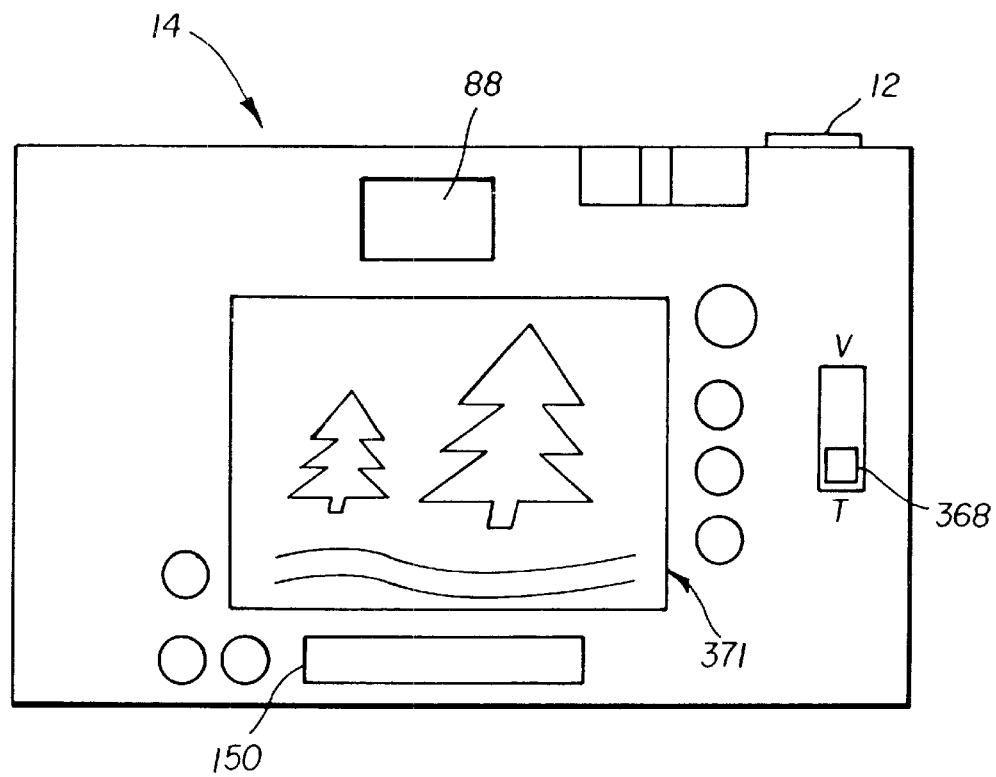
FIG. 27 is the same view as FIG. 26, but showing the transfer image.
Figure 31:
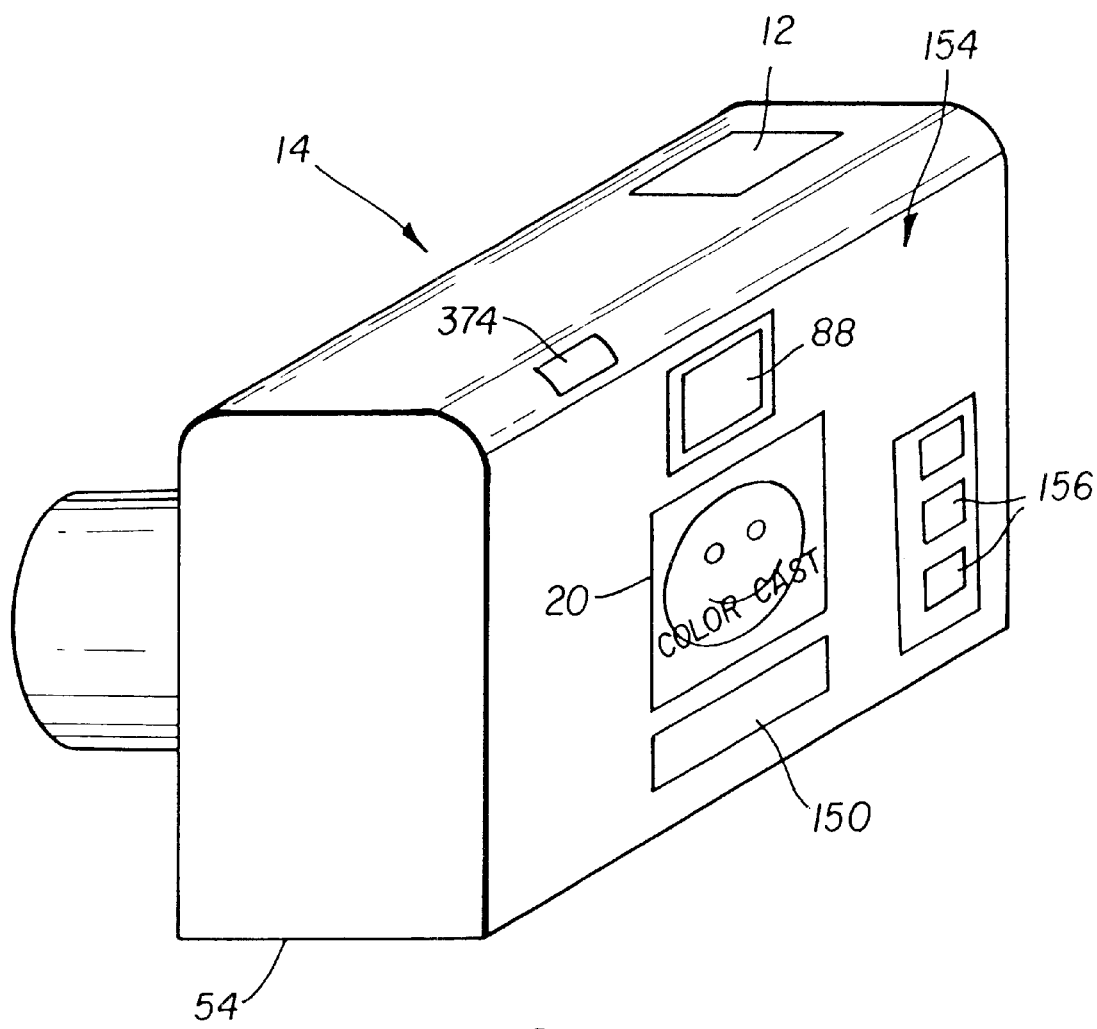
FIG. 31 is a perspective view of a modification of the camera of FIG. 21 which operates in accordance with FIG. 30.

The embodiment shown in FIG. 23 has an indication display 362 in addition to an image display 20 and an information display 150. The indication display 362 can, alternatively, be combined with the information display 150, as shown in FIGS. 24–25, or with the image display 20, as shown in FIG. 31. The color cast indication 360 is presented in the same manner, as a color patch or indicia, in all of these alternatives. The camera 14 shown in FIG. 31 has an alphanumeric indication 360, the words "COLOR CAST", photomontaged onto the verification image. FIG. 26 has a color patch that surrounds the verification image, such that the image and indication 360 displays are first and second parts of a continuous, pixellated panel 371. In this case, both the color patch and the verification image are presented on the image display 20. Algorithms for photomontaging text or a color patch with the verification image for presentation on a single display 20 are well known to those of skill in the art. The camera 14 shown in FIGS. 26–27 also prepares a transfer image. A switch 368, operatively connected to the controller 132, allows the user to selectively display 20 the verification image (indicated by a "V") and surrounding color patch or the transfer image alone (indicated by a "T").

User Interface Ambient Light Detector

Referring now to FIGS. 30–33, the above-described cameras 14 can be modified to include a user interface ambient light detector 370 positioned at the user interface 154 so as to detect ambient light at the photographer's eyes when the image is viewed on the display, rather than the ambient light when the scene was captured. The user interface ambient light detector 370 faces a different direction than the imager 84 or a separate light sensor 172 used to determine exposure settings (here referred to as the "scene ambient detector 172"). The user interface ambient light detector 370 is particularly advantageous for cameras 14 that change the color balance of electronic images to provide an illustrative color cast signal, since the verification image can be modified to overcome user visual adaptation specifically at the time the image is viewed.

Figure 32:
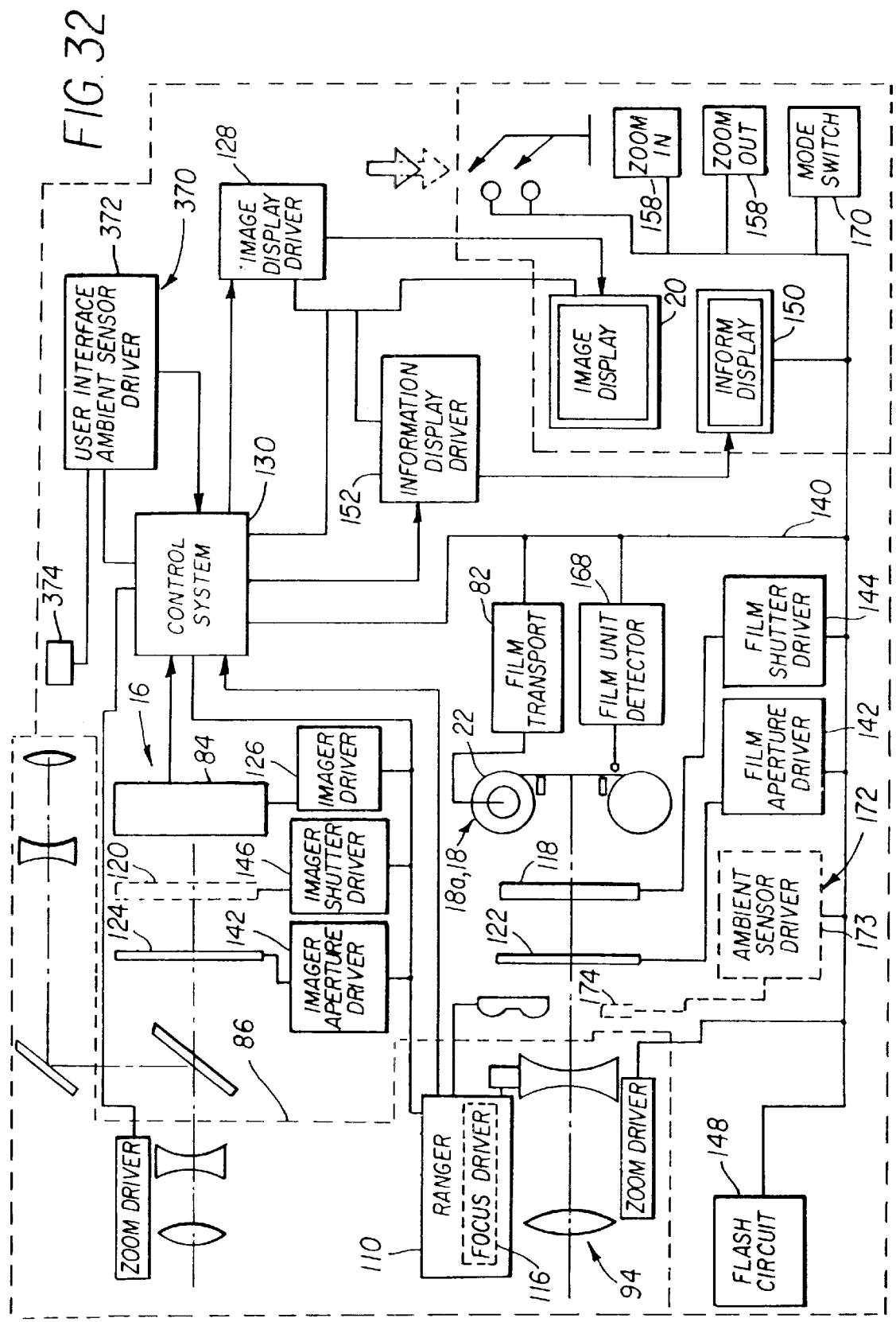
FIG. 32 is a schematic diagram of the camera of FIG. 31.

FIGS. 31–32 show a camera 14 having a user interface ambient light detector 370. The detector 370 has a user interface ambient sensor driver 372 and one or more sensors 374. The sensor driver 372 is illustrated, in FIG. 32, as being separate from the ambient sensor driver 173, but these function can be combined in a single sensor driver (not illustrated). The user interface ambient light detector 370 is necessarily separate from the imager 84. The sensor or sensors 374 of the user interface ambient light detector 370 can be located within the viewfinder 88, but are preferably independent of the optical system 86 and closer to the image display 20 than the taking lens opening 175. In particular embodiments, the sensor 374 is mounted at the upper rear of the camera body 54, as shown in FIG. 31 to help ensure to help ensure accurate measurement of ambient light at the user interface and the user's eye. Within these limitations, the user interface ambient light detector 370 can use a single element sensor or multiple element sensor in the same manner as already discussed in relation to the scene ambient detector 172. The camera 14 can also use a second imager as the sensor 374 of a user interface ambient light detector 370. This second imager can have a much lower resolution than the imager 84 used in the electronic image capture unit 16.

Figure 30:
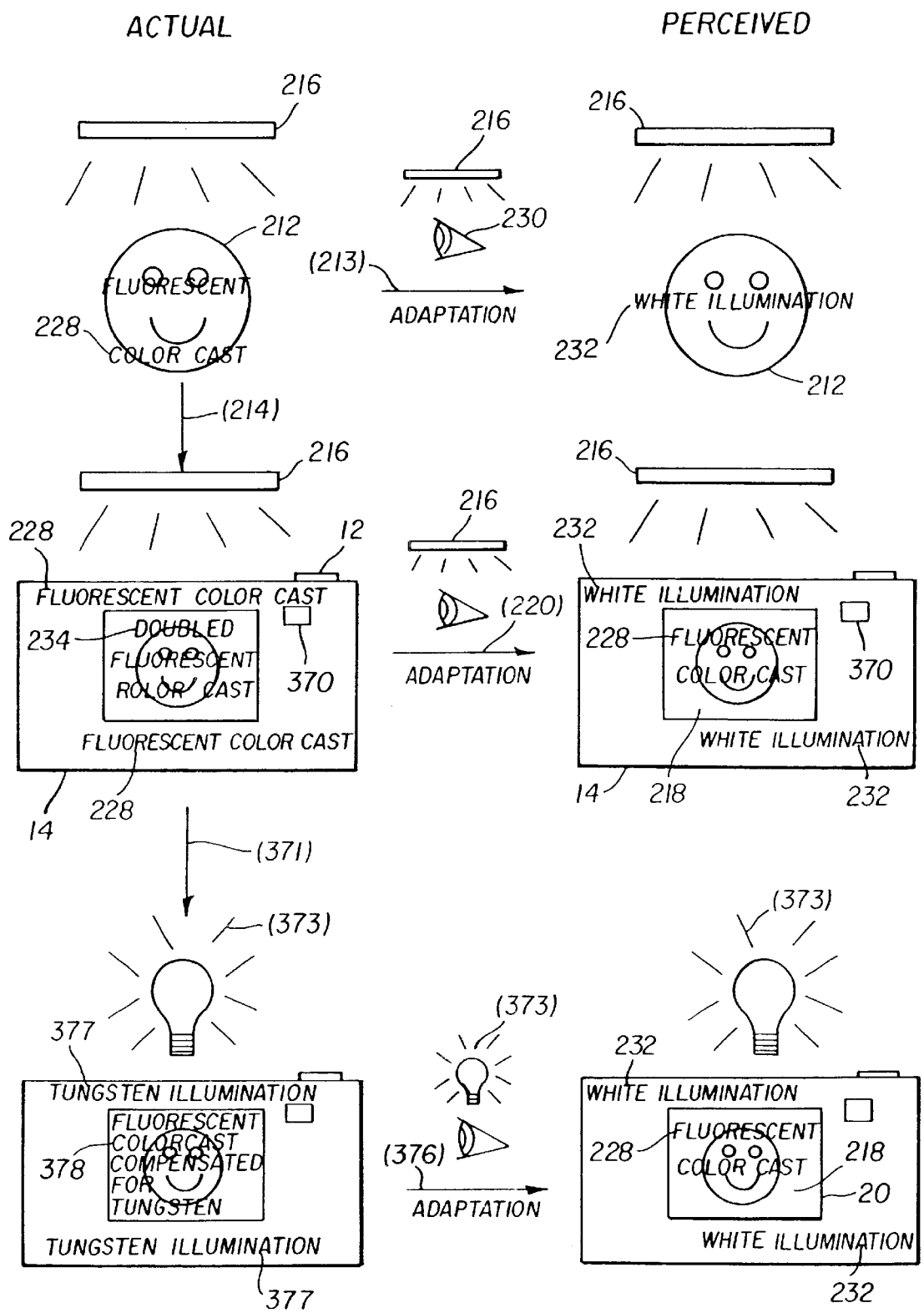
FIG. 30 is a diagram of the operation of an embodiment of the camera which provides an illustrative color cast signal adjusted for ambient lighting at the time the image is displayed.

FIG. 30 illustrates the use of a camera 14 having a user ambient light detector 370. A user views (213) the subject 212 and captures (214) an image in fluorescent lighting. The user then views (220) the verification image 218 in the same fluorescent lighting as the capturing (214). After a change (371) to tungsten lighting (indicated by a symbol of a tungsten lamp 373), the user views (376) the verification image 218 again. Since the lighting conditions are the same, the ACTUAL and PERCEIVED columns of FIG. 30 resemble those shown in FIG. 8 for capture and immediate viewing in fluorescent illumination. FIG. 8 does not show delayed viewing in tungsten illumination. For the camera of FIG. 8, the results would be suboptimal; since the user's adaptation to tungsten illumination would be uncompensated. In FIG. 30, in contrast, the camera 14 provides compensation for lighting conditions at the time of viewing of the verification image. Thus, following the change (375) in ambient illumination, the camera is illuminated by tungsten lighting ("TUNGSTEN ILLUMINATION" 377) and the verification image shows a color cast compensated for the tungsten illumination (indicated by "FLUORESCENT COLOR CAST COMPENSATED FOR TUNGSTEN" 378) and the user sees the same fluorescent color cast 228 as in other ambient lighting conditions. FIG. 30 is illustrative. The camera 14 operates in the same manner for other illuminants, within the limits imposed by predetermined reference illuminants and other camera features, as earlier discussed. For example, viewing of the verification image in daylight would provide resembling those shown for daylight viewing of the delayed verification image in FIG. 8.

The verification image is provided as a copy of the stored image in memory. The copy is color balanced to meet current ambient lighting and is displayed to the user when a switch is actuated, preferably on a selective basis by the user. After display, that is, when the camera user changes modes or turns off the camera, the color balanced copy is discarded. The stored image is retained, independent of the verification image, until transferred or deleted by the user.

The user interface ambient light detector 370 provides a color value that is used, in the same manner as above-described, to provide a modification of the electronic image that overcomes visual adaptation of the user. It is highly preferred that the user interface ambient light detector 370 is used to provide current ambient lighting information each time an electronic image is displayed, so that a chromatic adaptation inverse compensation can be correctly applied for every viewing of the electronic image on the display 20. In such an embodiment, the camera 14 has a single verification image that is modified for immediate viewing or later viewing based on ambient lighting conditions during viewing. A chromatic adaptation inverse compensation can also be applied to transfer images or any other images shown on the display 20, in the same manner.

Figure 33:
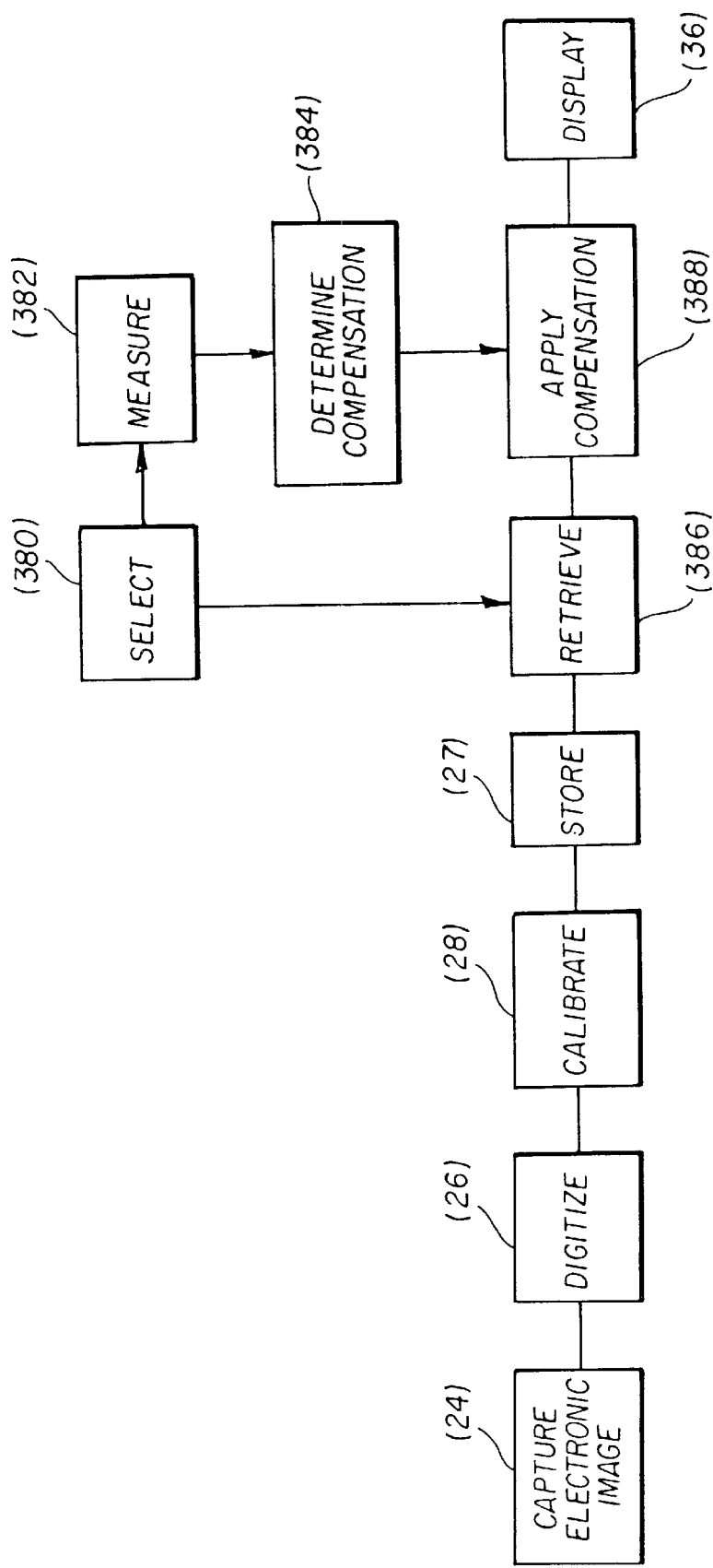
FIG. 33 is a diagrammatical view of electronic capture and display in the camera of FIG. 31.

Referring now to FIG. 33, a scene image is captured (24) as an electronic image, digitized (26), calibrate (28) to input and output, and stored (27). When the user selects (380) (for example, by use of the mode switch 170 shown in FIG. 32), the user interface ambient detector 370 is actuated and a color value is measured (382). A color balance compensation is determined (384). The electronic image is retrieved (386) from storage, is color balanced (388) to provide chromatic adaptation inverse compensation, and is displayed (36). The switch 170 is deactuated by a timer or the user and display is ceased.

The compensation for the color cast can be determined using either of the above-described procedures for using a look-up table of predetermined values or reverse white balancing. It is currently preferred that the camera 14 have a second imager and use the above-described "brightest objects" reverse white balancing approach illustrated in FIGS. 15–20.

Figure 34:
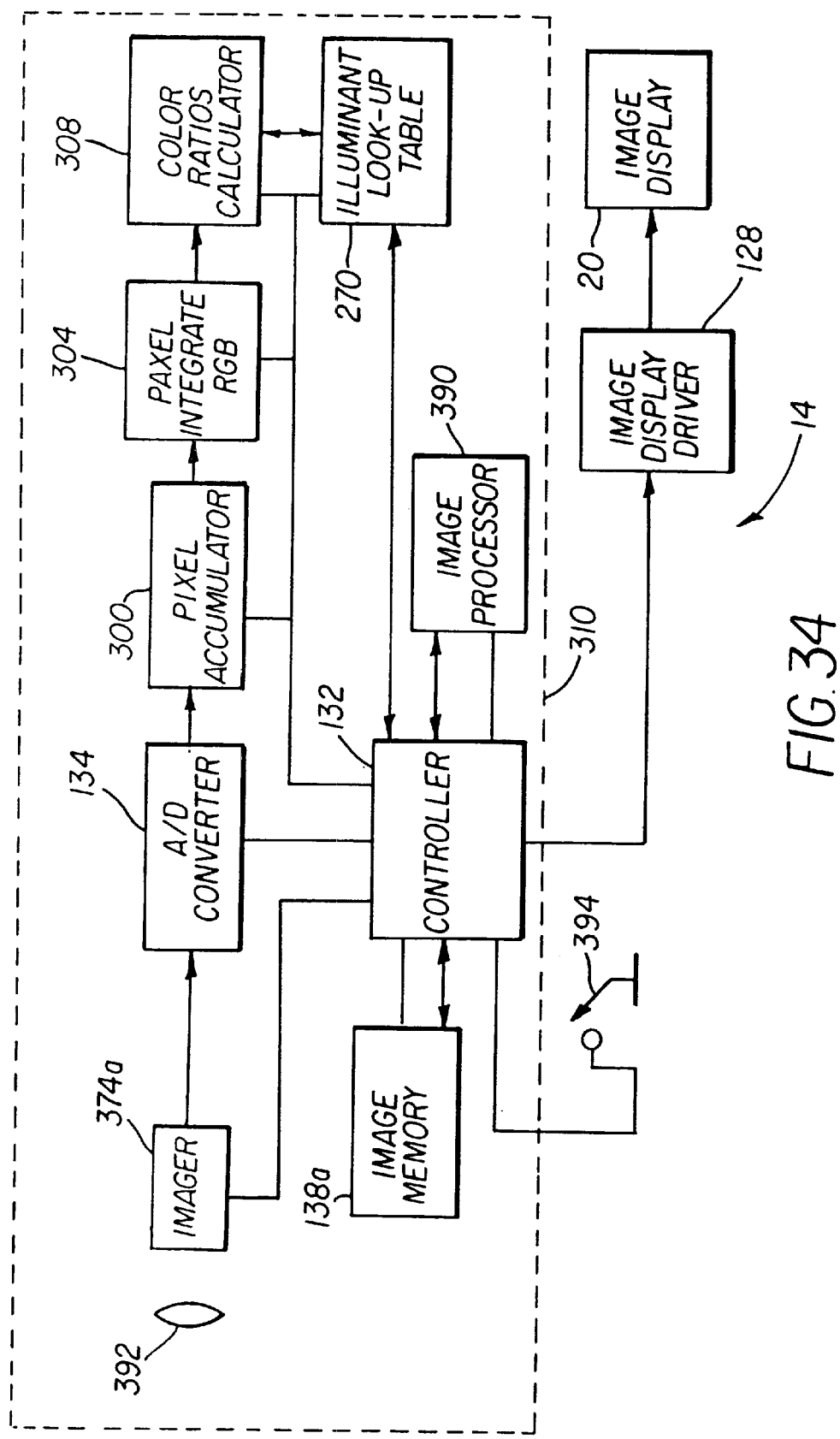
FIG. 34 is a diagrammatical view of the user interface ambient light detector and related features of an embodiment of the camera.

Referring now to FIG. 34, the camera 14 can alternatively have a color adjuster 310 that has similar features to the ambient detector 172 shown in FIG. 13. In the camera of FIG. 34, the color adjuster 310 is indicated by a dashed line. The color adjuster 310 uses a second imager 374a as a sensor. A lens system 392 directs light to the second imager 374a. The electronic image captured by the second imager 374a is directed through an A/D converter 134, pixel accumulator 300, paxel integrator 304, and color ratios calculator 308. The color adjuster also has a scene illuminant value look-up table 270, controller 132, and image memory 138a. These components are utilized in the manner already described in relation to the camera of FIG. 13; with the exception that, in the embodiment shown in FIG. 34, an image processor 390 is used to apply image modifications to an electronic image held in memory 289 when a switch 394 is actuated. (For clarity, some features shown in FIG. 13, such as the peak value detector, are not shown in FIG. 34; but can be included and utilized as earlier described.) A channel gain adjuster 311, used in FIG. 13, is unnecessary here, since the image adjustments provided by the controller 132 act on a stored electronic image rather than modifying gains applied at the imager. As elsewhere herein, components providing a like function, such as the A/D converter 134, can be duplicated for different uses or a single set of components can be controlled so as to provided different functions as needed. The camera 14 shown in FIG. 13 can also be modified to include the features shown in FIG. 34 for showing images retained in memory. The channel gain adjuster can be eliminated and the image processor used for modification of all images, if desired.

The user interface ambient light detector 370 can be used to detect ambient luminance at the user interface 154 and to adjust the luminance of the image display 20 in response. Variable output displays that can provide this feature are known to those of skill in the art.

The invention has been described in detail with particular reference to certain preferred embodiments thereof, but it will be understood that variations and modifications can be effected within the spirit and scope of the invention.

What is claimed is:

1. A camera for capturing a multicolor image of a multicolor scene, comprising:

a color detector detecting red, green, and blues signals from the multicolor scene and/or a captured multicolor image of the scene, and determining from said signals a predominant color in the captured image and/or multicolor scene; and a display showing red when said predominant color is red, blue when said predominant color is blue, green when said predominant color is green, and white/neutral when said predominant color is white/neutral, whereby one is alerted to color predominance.

2. The camera of claim 1 wherein said predominant color is white/neutral unless one of said red, green, and blue signals exceeds 60 percent of a total intensity of a combination of the red, green, and blue signals.

3. The camera of claim 1 further comprising a second display showing said captured image.

4. The camera of claim 3 wherein said display showing the predominant single color is adjacent to said display showing said captured image.

5. The camera of claim 3 wherein said display showing the predominant single color surrounds said display showing said captured image.

6. The camera of claim 3 wherein said displays are first and second parts of a continuous, pixellated panel.

7. A method in a camera for showing a predominant color in a multicolor scene and/or a captured multicolor captured image of the scene, comprising the steps of:

detecting red, green, and blue signals from the multicolor scene and/or the multicolor captured image;

determining from said signals a predominant color in the captured image and/or multicolor scene, and displaying red when said predominant color is red, blue when said predominant color is blue, green when said predominant color is green, and white/neutral when said predominant color is white/neutral.

8. The method of claim 7 wherein said predominant color is white/neutral unless one of said red, green, and blue signals exceeds 60 percent of a total intensity of a combination of the red, green, and blue signals.

9. The method of claim 7 further comprising displaying said captured image concurrent with said displaying of said predominant single color.

10. A camera for showing a predominant color in a multicolor scene and/or a captured multicolor captured image of the scene, comprising:

means for detecting red, green, and blue signals from the multicolor scene and/or the multicolor captured image;

means for determining from said signals a predominant color in the captured image and/or multicolor scene; and means for displaying red when said predominant color is red, blue when said predominant color is blue, green when said predominant color is green, and white/neutral when said predominant color is white/neutral.

11. The camera of claim 10 wherein said predominant color is white/neutral unless one of said red, green, and blue signals exceeds 60 percent of a total intensity of a combination of the red, green, and blue signals.

12. The camera of claim 10 further comprising means for displaying said captured image concurrent with said displaying of said predominant single color.

13. A camera comprising:

an electronic imager capturing a multicolor light images as a multicolor electronic image having red, blue, and green pixels;

a color detector determining a predominant color in said electronic image; and a user interface showing one of red, blue, green, and white/neutral as an indication of said predominant color.

14. The camera of claim 13 further comprising a body supporting said electronic imager, color detector, and user interface.

15. The camera of claim 14 wherein said user interface includes an image display mounted on said body, said image display showing said electronic image; and an indication display mounted on said body, said indication display showing said indication.

16. The camera of claim 15 wherein said indication display emits light at the wavelength of said predominant color.

17. The camera of claim 15 wherein said displays are first and second parts of a continuous, pixellated panel.

18. A camera comprising:

an electronic imager capturing a multicolor light image as a multicolor electronic image;

a color detector determining a predominant color in said electronic image; and a user interface emitting light of said predominant color.

19. The camera of claim 18 wherein said color detector detects red, green, and blue signals in said multicolor electronic image and determines a predominant color from said red, blue, and green signals.

20. The camera of claim 18 further comprising a second display showing said capture image.

21. The camera of claim 20 wherein said display emitting said predominant color is adjacent to said display showing said captured image.

22. The camera of claim 20 wherein said display emitting said predominant color surrounds said display showing said captured image.

23. The camera of claim 20 wherein said displays are first and second parts of a continuous, pixellated panel.

* * * * *

UNITED STATES PATENT AND TRADEMARK OFFICE
CERTIFICATE OF CORRECTION

| | | |
|---|---|---|
| PATENT NO. | : 6,505,002 B2 | Page 1 of 1 |
| APPLICATION NO. | : 09/747557 | |
| DATED | : January 7, 2003 | |
| INVENTOR(S) | : Roger A. Fields | |

It is certified that error appears in the above-identified patent and that said Letters Patent is hereby corrected as shown below:

Title Page, Item (54) and in the Specification, column 1, line 2, in the second line of the title, insert --OF-- after "PREDOMINANT COLOR"

Signed and Sealed this
Eighth Day of July, 2014

Michelle K. Lee
*Deputy Director of the United States Patent and Trademark Office*